United States Patent
Schiele

(10) Patent No.: US 9,925,982 B2
(45) Date of Patent: Mar. 27, 2018

(54) METHOD FOR ACTUATING A VEHICLE POWERTRAIN

(71) Applicant: ZF Friedrichshafen AG, Friedrichshafen (DE)

(72) Inventor: Peter Schiele, Kressbronn (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 15/342,616

(22) Filed: Nov. 3, 2016

(65) Prior Publication Data

US 2017/0120919 A1 May 4, 2017

(30) Foreign Application Priority Data

Nov. 3, 2015 (DE) .................... 10 2015 221 516
May 20, 2016 (DE) .................... 10 2016 208 751

(51) Int. Cl.
| | |
|---|---|
| *B60W 10/115* | (2012.01) |
| *B60W 30/18* | (2012.01) |
| *B60W 10/06* | (2006.01) |
| *F16H 3/66* | (2006.01) |

(Continued)

(52) U.S. Cl.
CPC ...... *B60W 30/18072* (2013.01); *B60W 10/06* (2013.01); *B60W 10/115* (2013.01); *F16H 3/66* (2013.01); *F16H 2003/442* (2013.01); *F16H 2061/0496* (2013.01); *F16H 2200/0065* (2013.01); *F16H 2200/2012* (2013.01); *F16H 2200/2041* (2013.01); *F16H 2200/2046* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS 8,398,522 B2 3/2013 Bauknecht et al.
8,652,004 B2 2/2014 Herbeth et al.
(Continued)

FOREIGN PATENT DOCUMENTS

| DE | 102008000429 A1 | 9/2009 |
|---|---|---|
| DE | 102010000857 A1 | 7/2011 |
| DE | 102011005284 A1 | 9/2012 |

(Continued)

OTHER PUBLICATIONS

German Search Report DE102016208751.7, dated Feb. 23, 2017, (7 pages).

*Primary Examiner* — Dirk Wright
(74) *Attorney, Agent, or Firm* — Dority & Manning, P.A.

(57) ABSTRACT

A method for operating a vehicle drive train includes operating the vehicle drive train with a drive unit switched on, with the drive unit connected to an output by a transmission, and with a positive-locking shifting element open. In response to a coasting operating state request for the vehicle drive train and a rotational speed of a transmission output being greater than a threshold, the drive unit is switched off and power flow between the drive unit and the output is interrupted by opening at least one of a plurality of frictional-locking shifting elements. The method also includes closing the positive-locking shifting element during the coasting operating state and no later than a leave coasting operating state request.

16 Claims, 17 Drawing Sheets

(51) Int. Cl.
*F16H 3/44* (2006.01)
*F16H 61/04* (2006.01)

(56) References Cited

U.S. PATENT DOCUMENTS 9,500,262 B2 11/2016 Arnold et al.
2015/0166064 A1 6/2015 Mitsuyasu et al.

FOREIGN PATENT DOCUMENTS

DE 102013202710 A1 8/2014
WO WO -2005084995 A1 * 9/2005 ............. B60K 17/26

* cited by examiner

| | C | D | B | E | A | F | | |
|---|---|---|---|---|---|---|---|---|
| "1" | | △◉○ | | | △□○ | ◉□○ | 4,70 | 1,65 |
| "2" | △◉○ | | | | △□○ | ◉□○ | 2,84 | 1,49 |
| "3" | | | △◉○ | | △□○ | ◉□○ | 1,90 | 1,38 |
| "4" | | | | △◉○ | △□○ | ◉□○ | 1,38 | 1,38 |
| "5" | | | ◉△□ | ○◉○○ | ○△□ | | 1,00 | 1,24 |
| "6" | ◉△□ | ◉△□ | | ○◉○○ | ○△□ | | 0,80 | 1,16 |
| "7" | | △□ | | ○◉○○ | ○△ | | 0,70 | 1,21 |
| "8" | □○ | △□ | □ | ○◉○○ | ○△ | | 0,58 | 1,21 |
| "R" | | ○ | ○ | | | ○ | -3,80 | Total 9,81 |

Fig. 2

METHOD FOR ACTUATING A VEHICLE POWERTRAIN

FIELD OF THE INVENTION

The invention relates generally to a method for actuating a vehicle drive train.

BACKGROUND

A multi-speed transmission with nine forward gears and one reverse gear is known from DE 10 2008 000 429 A1. The multi-speed transmission includes four planetary gear sets, eight rotatable shafts and six shifting elements. The first and second planetary gear sets form a shiftable upstream gear set, while the third and fourth planetary gear sets constitute a so-called "main gear set." The carriers of the first and second planetary gear sets are coupled with each other by one of the rotatable shafts, which is connected to an element of the main gear set. The ring gear of the first planetary gear set is coupled with the sun gear of the second planetary gear set by an additional shaft of the rotatable shafts, which is detachably connectable to a drive shaft by a clutch.

The sun gear of the first planetary gear set is attachable by an additional shaft of the rotatable shafts through a brake to a housing of the multi-speed transmission and is connectable to the drive shaft by a clutch. The ring gear of the second planetary gear set is attachable to the housing by a shaft through a brake. In turn, an additional shaft of the rotatable shafts is connected to at least one element of the main gear set and is attachable to a housing by the brake. An additional shaft of the rotatable shafts is connected to an additional element of the main gear set and is connectable to the drive shaft by a shifting element designed as a clutch, while an output shaft is connected to at least one additional element of the main gear set. At least two of the shifting elements of the multi-speed transmission are formed as positive-locking shifting elements, which are switched off only during upshifts.

In order to save fuel, in addition to so-called "start-stop systems," vehicles are increasingly equipped with so-called "coasting functions," by which, during travel, an internal combustion engine is switched off and is decoupled from the rest of the drive train. During such an activated coasting mode function, the existing kinetic energy of a motor vehicle is used for locomotion, instead of being lost in the form of towing capacity. In hybrid vehicles, this coasting mode function is already widely used, but the coasting function is also increasingly being used in conventional vehicles with internal combustion engine. In contrast to start-stop systems, in which the engine is only switched off during the standstill of a vehicle, with an activated coasting mode function, the shutdown of an engine designed as an internal combustion engine takes place already during the rolling operating state of a vehicle.

SUMMARY OF THE INVENTION

Exemplary aspects of the present invention provide a method for operating a vehicle drive train with a transmission, which is designed with at least one positive-locking shifting element and a multiple number of frictional-locking shifting elements, by which a coasting mode of a vehicle designed with the vehicle drive train can be activated and deactivated in a simple manner with a high degree of spontaneity.

The method in accordance with exemplary aspects of the invention is provided for operating a vehicle drive train with a drive unit, with an output and with a transmission arranged in the power flow between the drive unit and the output. The transmission is designed with at least one positive-locking shifting element and a multiple number of frictional-locking shifting elements, through which the multiple number of gear wheel pairings of a gear set of the transmission can be switched on and off for the presentation of various transmission ratios of the transmission. Thereby, only one part of the transmission ratios can be presented through the positive-locking shifting element.

In accordance with exemplary aspects of the invention, upon a request to present a coasting operating state of the vehicle drive train, during which the drive unit is switched off and the power flow between the drive unit and the output is interrupted in the area of the transmission, starting from an operating state of the vehicle drive train, at which the drive unit is switched on and is connected to the output by the transmission, and a rotational speed of a transmission output is greater than a threshold, and upon the presence of an operating state of the transmission, at which the positive-locking shifting element is opened, the power flow between the drive unit and the output in the area of the transmission is separated by opening at least one frictional-locking shifting element. In addition, it is provided that the positive-locking shifting element is closed no later than upon the presence of a request to leave the coasting operating state and for presenting a requested operating state of the vehicle drive train, at which the drive unit is switched on and the power flow between the drive unit and the output is established by engaging a transmission ratio in the area of the transmission, for the presentation of which the positive-locking shifting element is to be transferred into the closed operating state.

With the procedure in accordance with exemplary aspects of the invention, a coasting operating state reducing the fuel consumption of a vehicle can be presented with little effort, and an operating state of the vehicle drive train, requested by a request to deactivate or leave the coasting operating state, particularly in the area of the transmission, can be realized or achieved with a high degree of spontaneity, since, during the activated coasting operating state in accordance with exemplary aspects of the invention, as a function of the progression of operating states of the vehicle drive train, a so-called "gear tracking" is carried out, through which, upon leaving the coasting operating state, the transmission ratio to be presented as a function of the current operating state of the vehicle drive train is engaged in the transmission within short operating times. Thereby, upon a request to leave the coasting operating state, a check is made as to whether an operating state of the vehicle drive train is requested, for the presentation of which the positive-locking shifting element is to be transferred into a closed operating state or is to be held in it. Upon a positive test result, the positive-locking shifting element, present in the open operating state, for increasing the actuation spontaneity of the transmission and thus a vehicle that is designed with it is closed no later than upon the presence of such a request.

If, upon the presence of a request to present a coasting operating state before the switching off of the drive unit, the positive-locking shifting element is closed, in a simple manner, the option exists of realizing a hydraulic supply of the transmission by a main transmission pump driven by the drive unit and designing an optionally electrically driven auxiliary pump with lower performance. Thereby, the option in turn exists of reducing the manufacturing costs of the transmission and the need for installation space and the load of the vehicle electrical system. In addition, the positive-locking shifting element is already in the closed operating state upon an exit from the coasting operating state in the direction of an operating state of the vehicle drive train or transmission, as the case may be, at which the positive-locking shifting element is to be transferred into the closed operating state, by which the transmission can be operated with a high degree of spontaneity and a requested operating state of the vehicle drive train can be presented within short operating times.

Alternatively, it may also be provided that, upon the presence of a request to present a coasting operating state after switching off the drive unit, the positive-locking shifting element is closed, whereas, upon entry into the coasting operating state, the vehicle drive train can also be operated with a high degree of spontaneity, since the so-called "engine stop release" can take place immediately upon entry into the coasting operating state. In addition, upon an exit from the coasting operating state or upon an exit from the coasting operating state, the vehicle drive train and the transmission can also be operated with a high degree of spontaneity, if, upon an exit from the coasting operating state, the vehicle drive train and the transmission are to be transferred into an operating state at which the positive-locking shifting element is to be transferred into or held in the open operating state.

If, prior to closing the positive-locking shifting element, the gear set of the transmission is transferred, through the actuating of a multiple number of frictional-locking shifting elements, into an at least partially blocked operating state, in which a transmission input shaft is held in a torque-proof manner and a transmission output shaft connected to the output is rotatable, a defined operating state of the transmission is established, starting from which the positive-locking shifting element can be transferred into its closed operating state with little effort.

With an advantageous variant of the method in accordance with exemplary aspects of the invention, the gear set of the transmission is held in the at least partially blocked operating state at least until the rotational speed of the drive unit is less than a threshold value. Consequently, a rapid engine coastdown is achieved with minimum effort, and a resonance rotational speed range during the engine coast-down, which impairs driving comfort, is passed through within short operating times. Furthermore, an undesirable increase in the rotational speed of the transmission input and the transmission input shaft is prevented through a too early withdrawal of the blocking operating state of the gear set of the transmission during the switching off of the drive unit, which, under certain circumstances, causes a change in load in the vehicle drive train by crossing the progressions of the rotational speed of the drive unit and the transmission input.

In order to, between shifting element halves of the positive-locking shifting element present in the open operating state, generate a differential rotational speed required for closing the positive-locking shifting element, with an additional advantageous variant of the method in accordance with exemplary aspects of the invention, the transfer capacity is varied by at least one of the shifting elements actuated for at least the partial blocking of the gear set. With this measure, for example, so-called "tooth-on-tooth positions" in the area of the positive-locking shifting element to be switched on can be disbanded with little effort upon the presence of a rotational speed of the drive unit greater than zero in a simple manner.

If, with an activated coasting operating state and with a switched-off drive unit, a converter lock-up clutch provided between the transmission and the drive unit for bridging a hydrodynamic torque converter is transferred into a closed operating state, a synchronous rotational speed of the transmission input rotational speed corresponding to the operating state of the vehicle drive train to be presented can be adjusted in a defined manner by a possible rotational speed guidance of the rotational speed of the drive unit. Furthermore, upon the specification of the target rotational speed of the drive unit, a so-called "converter slip" present in the area of a hydrodynamic torque converter with an open converter lock-up clutch is not to be taken into account, by which the actuating effort of the vehicle drive train is low.

The vehicle drive train and the transmission can be operated with a high degree of spontaneity if, upon the presence of a request to deactivate the coasting operating state, the positive-locking shifting element is transferred into its open operating state or is left in it, and if the operating state of the transmission to be presented as a function of a current progression of operating states of the vehicle drive train, with a deactivated coasting operating state, can be established only in the open state of the positive-locking shifting element.

By an additional variant of the method in accordance with exemplary aspects of the invention, an increase in spontaneity upon an exit from the coasting operating state is achieved by the fact that, with a power flow interrupted in the area of the transmission between the drive unit and the output, all of those frictional-locking shifting elements are transferred into a closed operating state, which, in the closed operating state, permit a rotation of the transmission output shaft. By such a procedure, with a correspondingly formed transmission, which features, for example, a structural design that is the same as the multi-speed transmission described above and known from the state of the art, a multitude of shifting elements is transferred into the closed operating state. At that point, a requested operating state in the transmission upon leaving the coasting operating state can be presented to the desired extent within the desired short operating times mainly by the fact that there are fewer shifting elements to be transferred from their open operating state into their closed operating state than shifting elements already present in the closed operating state to be switched off or open. As such, this is advantageous, since closed frictional-locking shifting elements can be transferred into their open operating state more rapidly than open frictional-locking shifting elements can be transferred into their closed operating state.

The transmission can be operated with further improved spontaneity during an exit from the coasting operating state if, with an activated coasting operating state of the vehicle drive train, actuating forces of the frictional-locking shifting elements are reduced to a level at which the frictional-locking shifting elements still feature a slip-free operating state and from which shifting elements can be completely switched on or off within short operating times. In the case of an exit from the coasting operating state, shifting elements subjected to reduced pressure, starting from the lower actuating pressure level, can be switched off or emptied, and thus opened more rapidly, within short operating times. Simultaneously, the shifting elements to be switched on in the full extent for presenting the operating state, which is to be established after the deactivating of the coasting operating state, can be transferred from the reduced pressure level into the completely switched-on operating state more rapidly than fully open shifting elements.

With a variant of the method in accordance with exemplary aspects of the invention, actuating forces of the shifting elements, which are to be held in or transferred into the closed operating state for the presentation of the operating state of the vehicle drive train requested after the leaving of the coasting operating state of the vehicle drive train, are raised to the level corresponding to the level for presenting the requested operating state, while the additional frictional-locking shifting elements are open. Thus, in turn, the requested operating state of the transmission can be presented in the requested or desired extent within short operating times.

With an additional variant of the method in accordance with exemplary aspects of the invention that can be carried out with low actuating effort, an interruption of the power flow between the drive unit and the output in the area of the transmission is detected if a deviation between the rotational speed of the transmission input shaft and the product arising from the rotational speed of the transmission output shaft and the transmission ratio engaged in the transmission at the current operating point of the vehicle drive train is greater than a limit value.

With an additional advantageous variant of the method in accordance with exemplary aspects of the invention, the current operating state of the vehicle drive train and the transmission ratio to be engaged upon leaving the coasting operating state in the transmission are determined during the activated coasting operating state, whereas, in each case, at least the shifting elements that are to be switched on to present the transmission ratio to be engaged upon leaving the coasting operating state in the transmission are held in an operating state prepared for switching on the shifting elements. By such a so-called "gear tracking" with the procedure characterizing the activated coasting operating state, it is achieved with little effort that a transmission, upon leaving the coasting operating state within short operating times, can be transferred into the operating state that is thereby requested, and thus can be operated with a high degree of spontaneity.

With an additional advantageous variant of the method in accordance with exemplary aspects of the invention, upon the presence of a request to deactivate the coasting operating state and an accompanying request to present a transmission ratio in the transmission, which can be engaged upon a closed operating state of the positive-locking shifting element and by at least one additional positive-locking shifting element in the transmission, a synchronization transmission ratio is initially engaged in the transmission, for the presentation of which the positive-locking shifting element is to be closed or held in the closed operating state, and the additional positive-locking shifting element is to be opened or held in the open operating state. In order to realize a subsequent change to the transmission ratio starting from the synchronization transmission ratio in the direction of the requested transmission ratio, a frictional-locking shifting element is to be switched off and the additional positive-locking shifting element is to be closed. Thus, both the positive-locking shifting element and the additional positive-locking shifting element, starting from defined operating states of the transmission, can be transferred from an open into a closed operating state within short operating times and with little control and regulating effort.

With an advantageous variant of the method in accordance with exemplary aspects of the invention, discontinuities in the progression of an output rotational speed are avoided by the fact that the frictional-locking shifting element to be opened for separating the frictional connection between the drive unit and the output in the area of the transmission, upon a request to leave the coasting operating state, is only switched on if a blocking state of the gear set of the transmission is canceled.

For the further improvement of the actuating spontaneity of the transmission, it can be provided that, upon the presence of a request to deactivate the coasting operating state, a check is made as to whether a transmission ratio to be engaged during the activated coasting operating state, as a function of the current operating state of the vehicle drive train in the transmission, corresponds to a transmission ratio that is to be engaged in the transmission as a function of the event requesting the deactivation of the coasting operating state. Upon the determination of a deviation, the transmission ratio in the transmission requested by the event is engaged. With little effort, this prevents the fact that, immediately after the exit from the coasting operating state, the operating state requested and established by the deactivation of the coasting operating state is immediately left again in the course of the further change to the transmission ratio, and the ultimately requested operating state is established in the transmission immediately upon the exit from the coasting operating state.

With an additional advantageous variant of the method in accordance with exemplary aspects of the invention, a restart of the drive unit is carried out upon leaving the coasting operating state, under consideration of a specification of the rotational speed on the side of the transmission. The power flow between the drive unit and the output in the area of the transmission is only established if the rotational speed of the drive unit exceeds the synchronous rotational speed of the transmission input shaft corresponding to the rotational speed of the transmission output shaft. The synchronous rotational speed is adjusted if the requested transmission ratio is engaged in the transmission. Thereby, any undesired rotational speed crossing between the rotational speed of the drive unit and the rotational speed of the transmission output shaft and any accompanying change in load in the vehicle drive train, which impairs driving comfort to an undesired extent, can be avoided.

Upon the presence of a request to activate the coasting mode function, starting from an operating state of the transmission, for the presentation of which the positive-locking shifting element is closed, with an advantageous variant of the method in accordance with exemplary aspects of the invention, the closed additional positive-locking shifting element is transferred into an open operating state, by which undesirably high drag losses in the area of the transmission is avoided in a simple manner.

With an advantageous variant of the method in accordance with exemplary aspects of the invention, through the at least partial engagement of a transmission ratio in the transmission, for the presentation of which the additional positive-locking shifting element is to be transferred into the open operating state and at least the transfer capacity of one of the frictional-locking shifting elements is to vary, the additional positive-locking shifting element is transferred into an at least approximately load-free operating state and opened upon reaching the at least approximately load-free operating state.

By this variant of the procedure in accordance with exemplary aspects of the invention, upon an activated coasting mode function, through a corresponding actuation of the transmission, a closed positive-locking shifting element is initially transferred into an operating state that is at least approximately load-free and is required for opening the positive-locking shifting element and for avoiding any undesired load shock upon opening the positive-locking shifting element, and is subsequently opened, by which a high degree of driving comfort can be ensured with little effort.

With an advantageous variant of the method in accordance with exemplary aspects of the invention, drag torques and component loads that arise in the area of the transmission, which in turn arise (among other things) from the differential rotational speeds in the area of the bearing points of the transmission, through the transition of the transmission into the operating state in which the power flow between the drive unit and the output is interrupted through the opening of a frictional-locking shifting element and a transmission output shaft operatively connected to the output is rotatable, are reduced to the desired extent.

If, with an activated coasting operating state, starting from a fully open operating state, the frictional-locking shifting element to be actuated for the engagement of the transmission ratio that unburdens the additional positive-locking shifting element is initially transferred into an operating state at which the transfer capacity of the frictional-locking shifting element is equal to zero and, starting from which, the raising of the actuating force causes an immediate increase in transfer capacity, and subsequently the transfer capacity of the frictional-locking shifting element is raised to a level that unburdens the additional positive-locking shifting element, the additional positive-locking shifting element can be transferred into an at least approximately load-free operating state, with little control and regulating effort, without causing discontinuities in the progression of any torque applied in the area of the output of the vehicle drive train.

Upon the presence of a request to activate the engine start-stop function of the vehicle drive train with a simultaneously switched-off drive unit, upon an additional variant of the method in accordance with exemplary aspects of the invention, starting from an operating state of the vehicle drive train, during which a coasting mode function of the vehicle drive train is activated, by which the switched-off drive unit is decoupled from the output and an additional positive-locking shifting element is open, and during which the rotational speed of the output is greater than a defined rotational speed, at which a differential rotational speed between the shifting element halves of the opened additional positive-locking shifting element is within a rotational speed range, within which the additional positive-locking shifting element can be transferred into a closed operating state, the additional positive-locking shifting element is actuated at the latest upon reaching the defined rotational speed in the closing direction.

The coasting operating state of the vehicle drive train can be deactivated in a simple manner with a high degree of spontaneity, and the engine start-stop function of the vehicle drive train can be activated within short operating times, since the additional positive-locking shifting element that is to be switched on and is present in the open operating state during a rolling process of a vehicle designed with the vehicle drive train, during which the additional positive-locking shifting element to be switched on achieves (at least temporarily) an a least approximately synchronized operating state, can be transferred into the closed operating state to the desired extent without additional measures.

In order to avoid high loads in the area of the additional positive-locking shifting element to be switched on, with a variant of the method in accordance with exemplary aspects of the invention, the actuation of the positive-locking shifting element in the closing direction is terminated if, during vehicle standstill, the open operating state of the additional positive-locking shifting element is determined.

With an additional advantageous variant of the method in accordance with exemplary aspects of the invention, the coasting mode function can be deactivated with the desired high degree of spontaneity, if, upon an activated coasting mode function, the current operating state of the vehicle drive train and the transmission ratio to be engaged by activating the engine start-stop function in the transmission during restart of the drive unit to be switched off are determined, whereas, in each case, at least the shifting elements, which are to be switched on for presenting the transmission ratio to be engaged upon leaving the coasting mode function in the transmission, are held in an operating state prepared for switching on the shifting elements.

If the sequence of the shifting elements to be successively actuated for the partial blocking of the gear set is selected as a function of the present progression of the operating states of the vehicle drive train, the coasting operating state, upon a corresponding request, can be activated with a high degree of spontaneity, and the vehicle drive train can be transferred into the operating state to be established through the request to deactivate the coasting operating state within short operating times and thus with a high degree of spontaneity.

With an additional advantageous variant of the method in accordance with exemplary aspects of the invention, actuating forces of the shifting elements, which are frictional-locking shifting elements to be held or transferred for the presentation of the closed operating state after leaving the coasting operating state of the vehicle drive train and through the activation of the engine start-stop function, are raised to the level corresponding to this, while the additional frictional-locking shifting elements are open. Thus, in turn, the requested operating state of the transmission can be presented in the requested or desired extent within short operating times.

With an additional advantageous variant of the method in accordance with exemplary aspects of the invention, upon the presence of a request to activate the engine start-stop function and an accompanying request to present a transmission ratio in the transmission, which can be engaged by switching on the additional positive-locking shifting element in the transmission, and upon the detection the open operating state of the additional positive-locking shifting element, a synchronization transmission ratio is initially engaged in the transmission, for the presentation of which the positive-locking shifting element is present in the open operating state. In order to realize a subsequent change to the transmission ratio starting from the synchronization transmission ratio in the direction of the requested transmission ratio, a frictional-locking shifting element is to be switched off and the additional positive-locking shifting element is to be closed. Thus, the additional positive-locking shifting element, starting from defined operating states of the transmission, can be transferred from an open into a closed operating state within short operating times and with little control and regulating effort.

If the request to activate the coasting mode function, with a simultaneously activated engine start-stop function, is triggered upon exceeding a defined threshold value of the rotational speed of the output, an undesirably high increase in the drag torque internal to the transmission is limited in a simple manner.

Alternatively or in addition to this, with advantageous variants of the method in accordance with exemplary aspects of the invention, the request to activate the coasting mode function, with a simultaneously activated engine start-stop function, is triggered upon the exceeding of the defined threshold value of the rotational speed of the output that is longer than a predefined period of time or after traversing a driving distance that is longer than a defined driving distance, by which excessive rotational speeds in the transmission and, for example, the running dry of the bearing units of the transmission are permanently avoided with little effort.

The additional positive-locking shifting element is transferred through the at least partial engagement of the transmission ratio in the transmission, for the presentation of which the positive-locking shifting element is to be transferred into the open operating state and at least the transfer capacity of one of the frictional-locking shifting elements is to vary, into an at least approximately load-free operating state and is opened upon reaching the at least approximately load-free operating state, in order to activate the coasting operating state with high transmission drag torques, starting from an operating state of the vehicle drive train, in which the engine start-stop function is activated and the additional positive-locking shifting element is closed, with the desired high degree of spontaneity, and to transfer the additional positive-locking shifting element into its open operating state within short operating times.

If, with an activated coasting mode function, starting from a value equal to zero, the transfer capacity of the frictional-locking shifting element to be actuated for the engagement of the transmission ratio that unburdens the additional positive-locking shifting element is raised to a level that unburdens the additional positive-locking shifting element, the additional positive-locking shifting element can be transferred into an at least approximately load-free operating state, with little control and regulating effort, without causing discontinuities in the progression of any torque applied in the area of the output of the vehicle drive train.

With an additional variant of the method in accordance with exemplary aspects of the invention, upon the detection of the open operating state of the additional positive-locking shifting element, the frictional-locking shifting element is transferred into its open operating state and, thereby, the power flow between the drive unit and the output in the area of the transmission is interrupted in a simple manner, and the coasting mode of the vehicle drive train is activated with a high degree of spontaneity.

Upon the presence of a request to activate a coasting mode function of the vehicle drive train and upon a simultaneously activated engine start-stop function, with an additional advantageous variant of the method in accordance with exemplary aspects of the invention, the additional positive-locking shifting element is open, while the drive unit is left in its both decoupled and switched-off operating state.

By the procedure in accordance with exemplary aspects of the invention, upon an activated coasting mode function, a closed positive-locking shifting element is transferred into its open operating state, by which, in coasting mode, only small losses and burdens in the transmission arise.

If the sequence of the shifting elements to be successively actuated for the partial blocking of the gear set is selected as a function of the present progression of the operating states of the vehicle drive train, the coasting operating state, upon a corresponding request, can be deactivated with a high degree of spontaneity, and the vehicle drive train can be transferred into the operating state to be established through the request to deactivate the coasting operating state within short operating times and thus with a high degree of spontaneity.

With an additional variant of the method in accordance with exemplary aspects of the invention, a request to activate the engine start-stop function, starting from an operating state of the vehicle drive train, during which the transmission, based on a previous request to activate the coasting mode function, is currently transferred into the direction of an operating state requested for the presentation of the coasting mode function, is realized with a high degree of spontaneity by the fact that the closed additional positive-locking shifting element is left in its closed operating state and through the request to activate the coasting mode function, actuated shifting elements are actuated in an extent required for the presentation of the operating state of the transmission to be presented through the request to activate the engine start-stop function.

In contrast to this, a request to activate the engine start-stop function, starting from an operating state of the vehicle drive train, during which the transmission, based on the previous request to activate the coasting mode function, is currently transferred into the direction of an operating state requested for the presentation of the coasting mode function, with an additional advantageous variant, the already open additional positive-locking shifting element is transferred into its closed operating state and shifting elements actuated through the request to activate the coasting mode function are actuated in an extent required for the presentation of the operating state of the transmission to be presented through the request to activate the engine start-stop function, in order to realize the request with a high degree of spontaneity.

In order to be able to transfer the additional positive-locking shifting element in its closed operating state in the requested extent within short operating times, with an additional advantageous variant of the method in accordance with exemplary aspects of the invention, a transmission ratio in the transmission is initially engaged for closing the additional positive-locking shifting element, for the presentation of which the additional positive-locking shifting element is to be held in the open operating state and at least one frictional-locking shifting element is to be closed, whereas, subsequently, a transmission ratio requested by the engine start-stop function is engaged in the transmission by the closing of the additional positive-locking shifting element and the simultaneous opening of the frictional-locking shifting element, and whereas, during the change to the transmission ratio, a differential rotational speed between the shifting element halves of the additional positive-locking shifting element is guided to a level required for closing the positive-locking shifting element.

Upon a request to present a coasting operating state of the vehicle drive train, during which the drive unit is switched on and the power flow between the output in the area of the transmission is interrupted, with an additional variant of the method in accordance with exemplary aspects of the invention, the switched-on drive unit is separated from the output by opening one of the shifting elements, which is held in the closed operating state for the presentation of the operating state present prior to the request to decouple the switched-on drive unit. Subsequent to this, the shifting elements are activated as a function of the current progression of operating states of the vehicle drive train, with a decoupled, switched-on drive unit, in such a manner that the shifting elements to be switched on for the presentation of the transmission ratio to be engaged in the transmission upon the presence of a request to decouple the switched-on drive unit at the output are, at the point in time of the request, already partially in the switched-on operating state, and the switched-on drive unit is connected to the output by closing one additional shifting element of the additional shifting elements and the transmission ratio requested as a function of the current operating state of the vehicle drive train is engaged in the transmission.

A coasting operating state reducing the fuel consumption of a vehicle can be presented with little effort and an operating state of the vehicle drive train requested through a request to deactivate or leave the coasting operating state, particularly in the area of the transmission, can be realized or achieved with a high degree of spontaneity, since, during the activated coasting operating state in accordance with exemplary aspects of the invention, as a function of the progression of operating states of the vehicle drive train, a so-called "gear tracking" is carried out, by which, upon leaving the coasting operating state, the transmission ratio to be presented as a function of the current operating state of the vehicle drive train can be engaged in the transmission within short operating times.

With this variant, the drive unit is present prior to the activation of the coasting operating state, during the activated coasting operating state and after the deactivation of the coasting operating state in the switched-on operating state. Thereby, in a manner favorable for installation space and costs, the transmission can be supplied with hydraulic fluid by a main transmission pump, which is driven starting from the transmission input shaft, across the entire operating range of the vehicle drive train, without an additional electrically driven auxiliary pump, which requires installation space and increases the manufacturing costs of the transmission, to be provided for this purpose.

With an advantageous variant of the method in accordance with exemplary aspects of the invention, upon the presence of a request to present the coasting operating state, starting from an operating state of the transmission, for the presentation of which the additional positive-locking shifting element is closed, the closed additional positive-locking shifting element is transferred into an open operating state. By this procedure, it is achieved that drag torques in the transmission arising with a decoupled drive unit from the closed operating state of the additional positive-locking shifting element that impair the gain in efficiency caused by the activation of the coasting operating state, and rotational speeds that encumber the components of the transmission to an undesired extent, which are smaller in the open operating state of the positive-locking shifting element, are avoided.

In order to be able to realize a request to deactivate the coasting operating state with a spontaneity that is as high as possible, upon the presence of a request to present the coasting operating state, starting from an operating state of the transmission, for the presentation of which the positive-locking shifting element is open, the positive-locking shifting element is transferred into its closed operating state, if a progression of operating states of the vehicle drive train is determined, during which a subsequent request to couple the switched-on drive unit or to deactivate the coasting operating state triggers an engagement of a transmission ratio in the transmission, for the presentation of which the positive-locking shifting element is to be switched on. In a simple manner, it can be avoided that, upon a coasting exit triggered by a load request on the driver's side, a downshift in the transmission is requested, during which a claw shifting element is to be switched on. This is made possible with little effort in that the positive-locking shifting element is transferred into its closed operating state already during the coasting operating state of the vehicle drive train.

If the positive-locking shifting element is closed, if the rotational speed of the output is less than a threshold value, the actuation of the positive-locking shifting element is based on a speed-dependent strategy for claw conditioning that can be carried out with little effort. Thus, for example, the open positive-locking shifting element, upon a coasting entry starting from an operating state of the vehicle drive train, at which, in the transmission, a high gear with a low transmission ratio in the lower speed range of the vehicle is engaged, is advantageously transferred into its closed operating state, since, upon a deactivation of the coasting operating state, a downshift in the direction of a lower gear with a higher transmission ratio value is triggered in the transmission in any event. In contrast to this, in the higher speed ranges of a vehicle, the last-described procedure can be disruptive and disadvantageous, since, at that point, upon a coasting exit or upon a deactivation of the coasting operating state, the positive-locking shifting element is not to be held in the closed operating state for the presentation of the operating state of the transmission or the vehicle drive train that is then requested.

In general, through the speed-dependent selection as to whether the positive-locking shifting element is switched on upon an entry into the coasting operating state or is left in the open operating state, a high dynamic is achieved both during a coasting entry and during a coasting exit, since, during the activated coasting operating state, the positive-locking shifting element is transferred into its closed operating state only if it is detected that the positive-locking shifting element is to be closed, upon a deactivation of the coasting operating state, for the presentation of the requested operating state of the vehicle drive train.

If, during the switching-on process of the positive-locking shifting element, a clutch, which is arranged in the power flow of the vehicle drive train between the drive unit and the transmission, is open, and the rotational speed of a transmission input shaft is guided by actuating at least one of the frictional-locking shifting elements in the direction of zero, in order to generate, between the shifting element halves of the positive-locking shifting element present in the open operating state, a differential rotational speed required for closing the positive-locking shifting element, within a defined differential rotational speed range, a stalling of the drive unit is prevented with little effort if, for synchronizing the positive-locking shifting element, the rotational speed of the transmission input of the transmission is to be guided essentially in the direction of zero.

This procedure is particularly advantageous if the clutch is a converter lock-up clutch allocated to a hydrodynamic torque converter.

In order to generate a load-free operating state of the positive-locking shifting element that is at least approximately required for closing the positive-locking shifting element, with an additional advantageous variant of the method, the transfer capacity is varied by at least one frictional-locking shifting element. With this measure, for example, so-called "tooth-on-tooth positions" in the area of the positive-locking shifting element to be switched on can be disbanded with little effort upon the presence of a rotational speed of the drive unit greater than zero in a simple manner.

In addition to varying the transfer capacity of the frictional-locking shifting element, the option also exists of varying the rotational speed of the drive unit in order to disband a tooth-on-tooth position in the area of the positive-locking shifting element to be switched on. In turn, as an addition or alternative to this, it may also be provided that the transfer capacity of the clutch is varied between the drive unit and the transmission, in order to impart a disturbance torque to the transmission and to tear the blockage in the area of the positive-locking shifting element to be switched on.

Furthermore, it is also possible that, during the switching-on process of the positive-locking shifting element to be switched on in the area of the positive-locking shifting element, a positive connection between the shifting element halves to be brought into engagement with one another has already been adjusted, but the positive-locking shifting element has not yet achieved its fully closed operating state and the closing process, despite a corresponding actuation in the closing direction, cannot be carried out to the desired extent. Upon such an event, in turn, the torques hindering the conclusion of the switching-on process of the positive-locking shifting element and applying at the positive-locking shifting element can be reduced by varying the transfer capacity of at least one frictional-locking shifting element, and the complete insertion movement in the area of the positive-locking shifting element can be realized to the desired extent. Such torques hindering the closing process of the positive-locking shifting element arise, for example, from drag torques or other influences, which can be reduced through the above procedures to the desired extent, in order to operate a vehicle drive train with high dynamics and to ensure availability upon clamped claw shifting elements.

The vehicle drive train and the transmission can be operated with a high degree of spontaneity if, upon the presence of a request to present a neutral operating state of the transmission, at which the power flow is to be interrupted in the area of the transmission through a corresponding actuation of the shifting elements and at which the positive-locking shifting element is to be opened, the transmission is, in the coasting mode of the vehicle drive train for the engagement of a transmission ratio, prepared in that the positive-locking shifting element is held in its closed operating state and an actuating logic of the shifting elements is selected, by which a neutral operating state of the transmission is presented, in which the positive-locking shifting element is present in its closed operating state.

In addition to improving the actuating spontaneity, with the last-described variant of the method in accordance with exemplary aspects of the invention, it is achieved that a requested neutral operating state of the transmission is realized with operating procedures that are already known, by which the development and implementation of additional operating routines, which require the additional resources on the hardware side, are not required. Furthermore, with this variant of the method in accordance with exemplary aspects of the invention, a gear disengagement process that can be carried out within short operating times is provided, during which, initially, the power flow is fully degraded, before the positive-locking shifting element is disengaged for the presentation of the neutral gear requested through the request of the neutral operating state of the transmission.

The coasting operating state can be deactivated in a simple manner and with a high degree of spontaneity if, with an activated coasting operating state and a decoupled switched-on drive unit, and upon the presence of an operating state of the vehicle drive train, in which the positive-locking shifting element is closed and, starting from which, upon a request to couple the drive unit in the transmission, a transmission ratio is to be engaged, for the presentation of which both the additional positive-locking shifting element and the positive-locking shifting element are to be closed, the additional positive-locking shifting element is closed upon reaching an a least approximately synchronized operating state.

With a variant of the method in accordance with exemplary aspects of the invention that can be carried out with little control and regulating effort, the additional positive-locking shifting element during a progression of operating states of the vehicle drive train, during which the rotational speed of the output and/or the rotational speed of the transmission input approaches a rotational speed that corresponds to the synchronous rotational speed, which is adjusted upon a request to deactivate the coasting operating state and a request that arises from this to couple the switched-on drive unit in the transmission through closing the additional positive-locking shifting element, with a simultaneously closed positive-locking shifting element, is closed if a differential rotational speed between the shifting element halves of the additional positive-locking shifting element present in the open operating state is within a defined differential rotational speed window.

With an additional advantageous variant of the method in accordance with exemplary aspects of the invention, the rotational speed of the transmission input, during a progression of operating states of the vehicle drive train, during which the switched-on drive unit is operated at the level of the idle speed and the synchronous rotational speed of the transmission input, which is adjusted with a transmission ratio engaged in the transmission through the closed positive-locking shifting element and through the additional closing of the additional positive-locking shifting element, is greater than the idle speed of the drive unit, is raised through a positive engine intervention starting from the idle speed in the direction of the synchronous rotational speed, by which the vehicle drive train can be operated with a high degree of spontaneity upon a corresponding request.

In order to determine the synchronization point of the opened additional positive-locking shifting element to the extent required within short operating times, with an advantageous variant of the method in accordance with exemplary aspects of the invention, the transfer capacity of a shifting element between the drive unit and the transmission, during the determination of the synchronization point of the opened additional positive-locking shifting element, is guided to a defined level, at which the rotational speed of the drive unit and the rotational speed of the transmission input at least approximately correspond to each other.

With an additional advantageous variant, the shifting element between the drive unit and the transmission is at least partially open during the closing of an additional positive-locking shifting element, in order to, during unfavorable progressions of operating states of the vehicle drive train, avoid any lugging of the drive unit with little effort.

For an operation of the vehicle drive train characterized by a high degree of spontaneity, with an additional variant of the method in accordance with exemplary aspects of the invention, it is provided that, during progressions of operating states of the vehicle drive train, during which events changing the rotational speed of the output, such as an actuation of a service brake of the vehicle, take place, and the synchronization process of the additional positive-locking shifting element to be switched on changes and a request to couple the switched-on drive unit is triggered, a transmission ratio is initially engaged in the transmission, for the presentation of which the additional positive-locking shifting element is open. Subsequent to this, a transmission ratio is engaged in the transmission, for the presentation of which a closed frictional-locking shifting element is to be switched off and the additional positive-locking shifting element is to be closed.

Thus, in a simple manner, during progressions of operating states, during which the synchronous feed of the additional positive-locking shifting element is influenced during gear tracking by measures changing external effects, such as a brake intervention, a load request or another output rotational speed, gear tracking is not necessarily carried out or is cut short back in the direction of the actual gear, and the frictional connection between the drive unit and the transmission is built up. The operating state of the vehicle drive train (and, in particular, of the transmission) that is thereby requested is initially realized through the engagement of a so-called "supporting or synchronization gear" in the transmission and a subsequent traction downshift, while the additional positive-locking shifting element is switched on.

If, during progressions of operating states of the vehicle drive train, during which events changing the rotational speed of the output take place and the synchronization process of the additional positive-locking shifting element to be switched on changes, such transmission ratios are preliminarily engaged in the transmission, that the synchronization point of the additional positive-locking shifting element to be switched on can be reached on the basis of the current rotational speed of the output, the transmission input and the drive unit and the current gradients of the progressions of such rotational speeds, and the additional positive-locking shifting element is transferred into its closed operating state in the at least approximately synchronized operating state, the additional positive-locking shifting element can, without any further measures, be transferred into its closed operating state within short operating times with a high degree of spontaneity. Through this situational adjustment of each prepared synchronization gear in transmission, in particular during a rolling process of a vehicle, several rotational speed windows can be selected, within which the additional positive-locking shifting element to be switched on features its synchronization point.

If the vehicle drive train is formed in the area between the drive unit and the transmission with a hydrodynamic torque converter and a converter lock-up clutch allocated to the torque converter, the converter lock-up clutch is to be actuated as a function of the present operating state of the vehicle drive train and also as a function of the requested operating state of the vehicle drive train and the transfer capacity of which (if applicable) is to vary, in order to carry out a change to the operating state of the vehicle drive train with a high degree of spontaneity, without thereby impairing driving comfort.

Thus, for example, it is particularly advantageous if the transfer capacity of the converter lock-up clutch is, prior to a switching-on process of the additional positive-locking shifting element or the additional positive-locking shifting element, adjusted to a level at which, in the area of the converter lock-up clutch, only a small slip is present, or the converter clutch is operated without any slip, in order to minimize discontinuities in the progression of a differential rotational speed between the shifting element halves of the positive-locking shifting elements. In the event that rotational irregularities in the area of the drive unit distort the differential rotational speed signal of the positive-locking shifting elements, the transfer capacity of the converter lock-up clutch is reduced to such an extent that the rotational speed of the drive unit and the rotational speed of the transmission input essentially correspond to each other, but rotational speed oscillations of the drive unit are not imparted on the transmission input in the full extent and, during a slip operation of the converter lock-up clutch, are introduced into the transmission only in dampened form.

This procedure is based on the finding that rotational speed oscillations and varying differential rotational speeds between the rotational speed of the drive unit and the rotational speed of the transmission input cause undesired vibrations in the progression of the differential rotational speed of the positive-locking shifting elements, which prevent a comfortable and load-free engagement of the positive-locking shifting element.

During the closing process of the positive-locking shifting element or the additional positive-locking shifting element during unfavorable progressions of operating states of the vehicle drive train, it is possible that a torque impairing the engagement or closing process of the positive-locking shifting elements applies at the positive-locking shifting elements, if the converter lock-up clutch is present in the closed operating state or near its closed operating state.

In order to carry out the closing process to the desired extent within short operating times, and simultaneously with a high degree of driving comfort, the transfer capacity of the converter lock-up clutch can be adjusted during the switching-on process of one of the positive-locking shifting elements in such a manner that the converter lock-up clutch is operated with slip and the torque applied at the positive-locking shifting element to be closed applies at the positive-locking shifting element in an amount favoring the closing of the positive-locking shifting element. In a simple manner, this procedure offers the possibility of at least partially reducing the torque applied after the claw shift at the additional positive-locking shifting element to be closed through an opening of the converter lock-up clutch. In contrast to this, through the closing of the converter lock-up clutch, the torque applied in the area of the positive-locking shifting element or the additional positive-locking shifting element is rather increased, while an opening of the converter lock-up clutch reduces the respectively applied torque. Thus, upon a corresponding actuation of the converter lock-up clutch, the probability that a so-called "claw clamping" will arise is reduced. Thereby, increased availability of the transmission during an activated coasting operating state is ensured.

If an operating state of the vehicle drive train is requested through a request to deactivate the coasting operating state of the vehicle drive train, in which the additional positive-locking shifting element is closed, in a first phase of the target rotational speed guidance of the additional positive-locking shifting element to be closed, the converter lock-up clutch is held in its closed operating state. This ensures that the rotational speed of the transmission input essentially corresponds to the rotational speed of the drive unit. Shortly prior to reaching the synchronous rotational speed of the additional positive-locking shifting element to be closed, it is necessary to transfer the torque converter lock-up clutch into its open operating state, in order to reduce to the desired extent, the torque applied at the additional positive-locking shifting element to be closed with the assistance of the differential rotational speed in the area of the hydrodynamic torque converter, or to dampen the torque applied at the additional positive-locking shifting element to be closed during the engagement process to an extent favorable for the switching-on process of the additional positive-locking shifting element, by which, in turn, less claw clamping is caused and the availability of the transmission during the coasting operating state is increased.

Both the characteristics specified in the claims and the characteristics specified in the subsequent embodiments of the object under the invention are, by themselves alone or in any combination with one another, suitable for providing additional forms for the object under the invention.

BRIEF DESCRIPTION OF THE DRAWINGS

Additional benefits and advantageous embodiments of the object under the invention arise from the claims and the embodiments described below, with reference to the drawing in terms of principle, whereas, for the sake of clarity, the same reference signs are used for structurally and functionally identical components.

The following is shown:

FIG. 2 a shifting diagram of the automatic transmission in accordance with FIG. 1;

DETAILED DESCRIPTION

Figure 1:
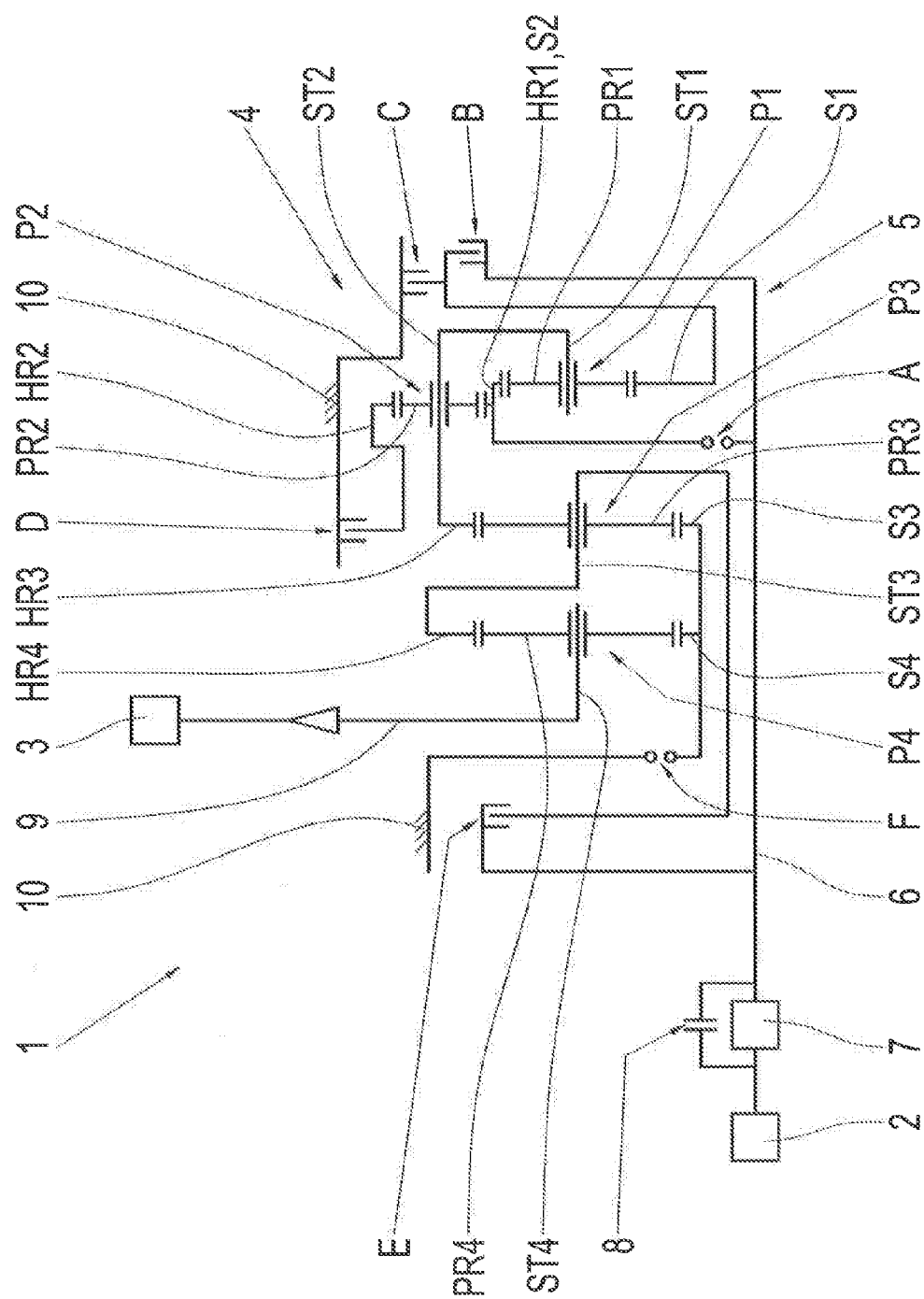
FIG. 1 a schematic view of a vehicle drive train with an automatic transmission designed as a 9-speed transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a highly schematic view of a vehicle drive train 1 with a drive unit 2, with an output 3 and with a transmission 4 arranged in the power flow between the drive unit 2 and the output 3. The transmission 4 includes the six shifting elements A through F, whereas, in the present case, the shifting elements B, C, D and E are formed as frictional-locking shifting elements, while the shifting elements A and F are positive-locking shifting elements. Thereby, the shifting elements C, D and F constitute so-called "brakes," while the shifting elements B, E and A are designed as clutches. In general, by the shifting elements A through F, several gear wheel pairings of a gear set 5 of the transmission 4 can be switched on and off for the presentation of various transmission ratios "1" through "9" listed in FIG. 2 for forward travel and one transmission ratio "R" for reverse travel, whereas only one part of the transmission ratios "1" through "7" can be presented for forward travel by the positive-locking shifting element A in conjunction with the additional shifting elements B through E.

FIG. 2 shows a shifting diagram of the transmission 4, whereas, in the shifting diagram, the shifting elements A through F are held in or are transferred into the closed operating state for the presentation of one of the transmission ratios of "1" through "R," which are marked by a circle, while the respective additional shifting elements A through F are to be transferred into their open operating state or held in it. In addition, in the penultimate column of the shifting diagram, the transmission ratio value corresponding to the transmission ratio "1" through "R" engaged in the transmission 4 is indicated, while, in the last column of the shifting diagram, the gear step present between two transmission ratios adjacent to each other is indicated. Thereby, the first transmission ratio "1" features the transmission ratio value of 4.70 for forward travel, while the second transmission ratio "2" that can be engaged in the transmission 4 has a transmission ratio value of 2.84 for forward travel. Between the first transmission ratio "1" for forward travel and the second transmission ratio "2" for forward travel, the transmission features a gear step of 1.65. As a whole, given the design, the transmission 4 has an overall spread of 9.81.

In addition, the shifting elements A through F, which must be held in the closed operating state during an activated coasting operating state of the vehicle drive train 1, as a function of the particular operating state of the vehicle drive train 1, are marked by a square, while a so-called "coasting clutch," which is held in the open operating state during the coasting operating state and, upon an exit from the coasting operating state, is transferred into its closed operating state in order to, in the requested extent, couple the drive unit 2 with the output 3 in the area of the transmission 4, is marked with a square arranged within a circle. Thereby, the shifting logic in the activated coasting operating state of the vehicle drive train 1 that is characterized by squares and squares arranged within circles constitutes a so-called "standard logic." Thus, for example, upon a coasting operating state under the use of the standard shifting logic during an operating state of the vehicle drive train 1, in which, upon an exit from the coasting operating state in the transmission 4, the second transmission ratio "2" is to be engaged for forward travel, the frictional-locking shifting element C is the coasting clutch, while the positive-locking shifting elements A and F are present in the closed operating state.

As an alternative to this, also in accordance with a first variant of the shifting logic, the transmission 4 can be actuated upon an activated coasting operating state, whereas the shifting elements A through F to be held in the closed operating state are marked by a triangle, while the coasting clutch is the shifting element F or E, which is marked by a triangle arranged within a circle.

In addition, it is also possible that the transmission 4 is operated upon an activated coasting operating state in accordance with a second variant of the shifting logic, whereas each of the shifting elements to be held in the closed operating state is marked by a hexagon, and the respective shifting element E, D, C, B constituting the coasting clutch is marked by a hexagon arranged within a circle.

In principal, the range of transmission ratios including the transmission ratios "1" through "9" for forward travel can be functionally divided into three transmission ratio sub-ranges. Thereby, a first transmission ratio sub-range includes the transmission ratios "1" through "4," for the presentation of which both the positive-locking shifting element A and the positive-locking shifting element F are held in or are transferred into the closed operating state, and each of the frictional-locking shifting elements D, C, B or E is also to be closed. The second transmission ratio sub-range subsequent to this includes the transmission ratios "5" through "7," for the presentation of which only the positive-locking shifting element A along with two additional frictional-locking shifting elements B and E or C and E or D and E, as the case may be, are to be held in the closed operating state. The third transmission ratio sub-range in turn subsequent to the second transmission ratio sub-range includes the transmission ratios "8" and "9" for forward travel, which are engaged through the simultaneous closing of the three frictional-locking shifting elements C, D and E or D, B and E, as the case may be, in the transmission 4.

For changes to the transmission ratio in the transmission 4 within a transmission ratio sub-range, only one frictional-locking shifting element D, C, B or E or B, C, D or C, B, as the case may be, is to be switched off, and another frictional-locking shifting element E, B, C, D or D, C, B or B, C is to be switched on. In contrast to this, upon a change to the transmission ratio in the transmission 4, upon which a transmission ratio of one of the transmission ratio sub-ranges is to be disengaged and a transmission ratio of one additional transmission ratio sub-range in the transmission 4 is to be engaged, the switching on or off of at least one of the positive-locking shifting elements A or F is to be carried out, which is realized during a normal driving mode of the vehicle drive train 1 by conventional shifting routines.

However, if the vehicle drive train 1 is in its coasting operating state and if, in the manner described in more detail below, the transmission 4 is actuated, as a function of the current operating state of the vehicle drive train, to the effect that, upon a coasting exit, the requested operating state of the vehicle drive train 1 through the switching on of only one of shifting elements A through F can be presented in short operating times and thus with a high degree of spontaneity, the procedures described in more detail below are to be carried out as a function of the operating state.

On the transmission input side, the transmission 4 is in operative connection with the drive unit 2 by a hydrodynamic torque converter 7. In the present case, a so-called "converter lock-up clutch" 8, the transfer capacity of which is varied as a function of the operating state in a known manner, is allocated to the hydrodynamic torque converter 7, in order to minimize losses in the area of hydrodynamic torque converter 7. On a transmission output side, the transmission 4 with a transmission output shaft 9 is in operative connection with the output 3.

In the present case, the transmission 4 includes four planetary gear sets P1 through P4, whereas the first and second planetary gear sets P1 and P2, which are preferably designed as negative planetary gear sets, form a shiftable upstream gear set, while the third planetary gear set and the fourth planetary gear sets P3 and P4 form a so-called "main gear set." In the present case, a sun gear S3 of the third planetary gear set P3 is connected in a torque-proof manner to a sun gear S4 of the fourth planetary gear set P4. In the closed operating state of the positive-locking shifting element F, the two sun gears S3 and S4 are connected in a torque-proof manner to a fixed-housing component 10, and rotate freely in the open operating state of the positive-locking shifting element F. The sun gear S3 meshes with planetary gears PR3, which are rotatably arranged on a planetary carrier ST3 of the third planetary gear set P3. Furthermore, the planetary gears PR3 are engaged with a ring gear HR3 of the third planetary gear set P3. The sun gear S4 of the fourth planetary gear set P4 in turn meshes with planetary gears PR4, which are rotatably arranged on a planetary carrier ST4, which is rotatably coupled with the transmission output shaft 9. In addition, the planetary gears PR4 are engaged with a ring gear HR4 of the fourth planetary gear set P4, which in turn is connected in a torque-proof manner to the planetary carrier ST3 of the third planetary gear set P3.

The planetary carrier ST3 of the third planetary gear set P3 can be brought into operative connection with the transmission input shaft 6 by the shifting element E. The ring gear HR3 of the third planetary gear set P3 is connected in a torque-proof manner to a planetary carrier ST2 of the second planetary gear set P2, which in turn is operatively connected in a torque-proof manner with a planetary carrier ST1 of the first planetary gear set P1. Planetary gears PR2 rotatably mounted on the planetary carrier ST2 mesh both with a ring gear HR2 and with a sun gear S2 of the second planetary gear set P2, whereas the ring gear HR2 is connectable in a torque-proof manner with the fixed-housing component 10 by the frictional-locking shifting element D. The sun gear S2 of the second planetary gear set P2 is in turn connected in a torque-proof manner to a ring gear HR1 of the first planetary gear set P1, which meshes with planetary gears PR1, which in turn are engaged with a sun gear S1 of the first planetary gear set P1. The sun gear S1 is connectable in a torque-proof manner to the fixed-housing component by the frictional-locking shifting element C, and can be brought into operative connection with the transmission input shaft 6 by the frictional-locking shifting element B. In addition, in the closed operating state of the shifting element B, the sun gear S1 is connected in a torque-proof manner to the ring gear HR1 of the first planetary gear set P1 by the positive-locking shifting element A.

In order to operate, with a high degree of spontaneity, the vehicle drive train 1 with a fuel consumption of the drive unit 2 that is as small as possible, the vehicle drive train 1 is operated as a function of the operating state in the manner described in more detail below on the basis of the views in accordance with FIG. 3 through FIG. 17.

Figure 3:
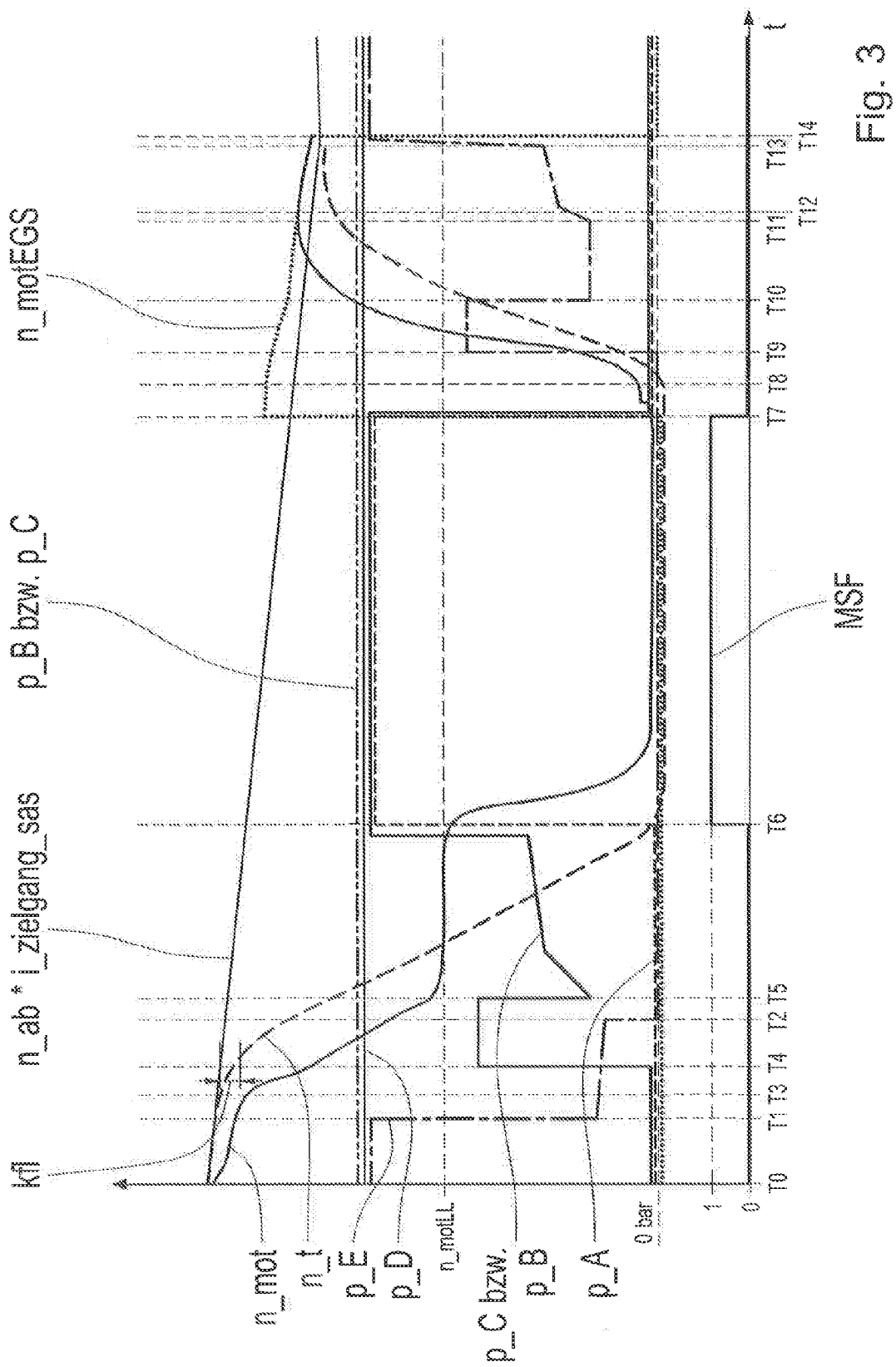
FIG. 3 several progressions of different operating variables of a vehicle drive train including the automatic transmission in accordance with FIG. 1 over time t, which is transferred into a coasting operating state in accordance with a request, which is in turn deactivated at a later point in time.

FIG. 3 through FIG. 6 show several progressions of different operating variables of the vehicle drive train 1 over time t, whereas, at a point in time T0 characterized more specifically in FIG. 3, the vehicle drive train 1 is in an operating state at which the eighth transmission ratio "8" or the ninth transmission ratio "9" is engaged in the transmission 4 for forward travel, and a rotational speed n_mot of the drive unit 2 is greater than an idle speed n_motLL of the drive unit 2. At the point in time T0, a request to present a coasting operating state of the vehicle drive train 1 is issued, during which the drive unit 2 is switched off and the power flow between the drive unit 2 and the output 3 is interrupted in the area of the transmission 4. Thereby, the request to activate the coasting operating state is issued starting from an operating state of the vehicle drive train 1, at which the drive unit 2 is switched on and is connected to the output 3 by the transmission 4. Furthermore, the rotational speed n_ab of the output 3 is greater than a threshold value, which is greater than zero. Upon an engaged eighth or ninth transmission ratio "8" or "9" for forward travel, the positive-locking shifting element A is open.

For activating the coasting operating state, from the point in time T1, through a corresponding lowering of the actuating pressure p_E in the manner shown in FIG. 3 up to a point in time T2, the frictional-locking shifting element E is transferred into its open operating state, and, thereby, the power flow between the drive unit 2 and the output 3 is separated in the area of the transmission 4.

In addition, from the point in time T0, the rotational speed n_mot of the drive unit 2 is guided, to the extent shown, increasingly in the direction of the idle speed n_motLL. The lowering of the transfer capacity of the frictional-locking shifting element E causes the fact that, from a point in time T3, which is between the points in time T1 and T2, the rotational speed n_t of the transmission input shaft 6, which is also referred to as the turbine rotational speed, deviates from the product of the rotational speed n_ab of the output 3 and the transmission ratio i_zielgang_sas engaged in the present case in the transmission at the point in time T0. If the deviation between the turbine rotational speed n_t and the transmission ratio i_zielgang_sas exceeds a threshold value kfl, in the present case, the separated power flow between the drive unit 2 and the output 3 in the area of the transmission 4 is detected. In the present case, this is the case at a point in time T4, which is between the points in time T3 and T2.

At the point in time T4, with a ninth transmission ratio "9" for forward travel engaged in the transmission 4, the actuating pressure p_C of the frictional-locking shifting element C is, in the manner shown in FIG. 3 in ideal form, raised stepwise to the level of a rapid filling pressure and is left at such level up to a point in time T5. Subsequently, at the point in time T5, the actuating pressure p_C is lowered to an intermediate pressure level and is raised in a ramp-like manner over two successive pressure ramps up to a point in time T6, at which the frictional-locking shifting element C features a slip-free operating state. At the point in time T6, the actuating pressure p_C is raised to a level at which the frictional-locking shifting element C is fully closed.

If, at the point in time T0, the eighth transmission ratio "8" is engaged in the transmission 4 for forward travel, between the points in time T4 and T6, instead of the actuating pressure p_C, an actuating pressure p_B of the frictional-locking shifting element B is adjusted in the last-described manner in order to transfer the frictional-locking shifting element B, in addition to the frictional-locking shifting elements C and D, into the closed operating state.

In the closed operating state of the frictional-locking shifting elements C, D and B, the gear set 5 of the transmission 4 features a partially blocked operating state, in which the transmission input shaft 6 is held in a torque-proof manner and the transmission output shaft 9 connected to the output 3 is rotatable. In the present case, in such operating state of the transmission 4, the raising of the actuating pressure p_A of the positive-locking shifting element A takes place, by which the positive-locking shifting element A is transferred into its closed operating state. Simultaneously, the drive unit 2 is switched off, such that the rotational speed n_mot of the drive unit 2 is reduced in the direction of zero. The request corresponding to this arises from a progression MSF, which jumps from the value of 0 to 1 at the point in time T6, and thus activates the engine-stop release. Thus, at the point in time T6, the coasting operating state requested at the point in time T0 is activated to the desired extent.

In the present case, the coasting operating state is requested by a request on the driver's side, for example by an accelerator release and an actuation of the service brake that is preferably on the driver's side. Additionally or alternatively, it is also possible that the coasting operating state is requested by a higher-level driving strategy, if a performance request on the driver's side does not take place and it is also determined that a driving route that is specified, for example, by a navigation system, can be driven through, at least in sections, in coasting mode and with low fuel consumption.

In the present case, in the manner shown in FIG. 3, the vehicle drive train 1 remains in the coasting operating state until a point in time T7. At the point in time T7, for example, the driver once again actuates the accelerator pedal, and requests a corresponding performance on the part of the drive unit 2. Such a performance request on the driver's side causes the fact that the progression MSF jumps from a value of one to a value of zero, and the engine stop-release is deactivated. This in turn leads to the fact that the drive unit 2 is switched on, and the rotational speed n_mot of the drive unit 2 increases from the point in time T7. In order to prevent an uncontrolled increase in the engine rotational speed n_mot, a specification of the engine target rotational speed is issued, which is carried out according to the progression n_motEGS. Through the activation of the specification of the engine target rotational speed, at the point in time T7, the engine rotational speed n_mot is raised in the direction of a level that is above the rotational speed of the transmission input shaft 6 that arises from the product of the output rotational speed n_ab and the transmission ratio i_zielgang_sas to be engaged in the transmission 4 at the point in time T7.

Since the vehicle drive train 1 is in an operating state at the point in time T7, at which, upon a deactivated coasting operating state in the transmission 4, the transmission ratio in the transmission 4 engaged at the point in time T0 (that is, the ninth transmission ratio "9" or the eighth transmission ratio "8" for forward travel) is to be engaged, at the point in time T7, the actuating pressure p_A of the positive-locking shifting element A is reduced, and the positive-locking shifting element A is transferred into its open operating state at the point in time T7. Simultaneously, the actuating pressure p_C or the actuating pressure p_B of the frictional-locking shifting element C or B is lowered to zero, in order to raise the blocking state established between the points in time T4 and T6 of the gear set 5.

With an increasing rotational speed n_mot of the drive unit 2 and a disbanding of the blocking state of the gear set 5, the turbine rotational speed n_t increases from a point in time T8 following the point in time T7, and follows the progression of the rotational speed n_mot of the drive unit 2. From a point in time T9 following the point in time T8, in the manner shown in FIG. 3, the actuating pressure p_E of the frictional-locking shifting element E is prepared during a rapid filling phase continuing until a point in time T10 and a filling equalization phase for switching on that is subsequent to this and continues until a point in time T11. From the point in time T9, the drive unit 2 is in the rotational speed control mode.

At the point in time T11, the frictional-locking shifting element E features an operating state, at which the transfer capacity of the frictional-locking shifting element E is essentially equal to 0, and a further raising the actuating pressure p_E has the consequence of an immediate increase in the transfer capacity of the frictional-locking shifting element E. From the point in time T11, the actuating pressure is raised over a pressure ramp p_E continuing up to a point in time T12. In the present case, at the point in time T11, the actuating pressure p_E of the frictional-locking shifting element E is raised over the first pressure ramp subsequent to the filling equalization phase, if the progression of the rotational speed n_mot of the drive unit 2 for the presently considered traction mode of the vehicle drive train 1 has reached or even exceeded the progression n_ab*i_zielgang_sas and a differential rotational speed Nd_Syn between the shifting element halves of the shifting element E is near the synchronous rotational speed or is less than or equal to a threshold value, as the case may be.

In contrast to this, the actuating pressure p_E of the shifting element E to be switched on, to an extent that is not shown in more detail, in the coasting mode of the vehicle drive train 1, is raised from the point in time T11 over the first pressure ramp subsequent to the filling equalization phase, if the progression of the rotational speed n_mot of the drive unit 2 is below the progression n_ab*i_zielgang_sas or matches this, and a differential rotational speed Nd_Syn between the shifting element halves of the shifting element E is near the synchronous rotational speed or is less than or equal to a threshold value, as the case may be.

Subsequent to this, the actuating pressure p_E of the frictional-locking shifting element E is further increased over an additional pressure ramp, the gradient of which is smaller than the pressure ramp between the points in time T11 and T12 At the end of the second pressure ramp (that is, in the present case, at the point in time T13), the frictional-locking shifting element E is present in a slip-free operating state and the turbine rotational speed n_t corresponds to the product of the output rotational speed n_ab and the transmission ratio i_zielgang_sas that is requested at the point in time T7 and is to be engaged in the transmission 4, which in the present case corresponds either to the ninth transmission ratio "9" or the eighth transmission ratio "8."

The engine rotational speed n_mot is guided by the specification of the engine target rotational speed on the transmission side to a level above the progression n_ab*i_zielgang_sas, in order to, during the establishment of the power flow between the drive unit 2 and the output 3, avoid, in the area of the transmission 4, any undesired rotational speed crossing between the rotational speed n_mot of the drive unit 2 and the turbine rotational speed n_t arising from the transmission ratio to be engaged in the transmission 4 and the output rotational speed n_ab. A rotational speed crossing between the engine rotational speed n_mot and the progression n_ab*i_zielgang_sas causes an undesired change in load in the vehicle drive train 1, which impairs driving comfort to an undesired extent.

At the point in time T14, the actuating pressure p_E of the frictional-locking shifting element p_E is the closing pressure level, and the operating state of the vehicle drive train 1 requested at the point in time T7 is established to the desired extent at the point in time T14. After the point in time T14, at which the coasting operating state of the vehicle drive train 1 is terminated, sequential gearshifts that may be requested can be carried out in the transmission 4 to the desired extent.

Figure 4:
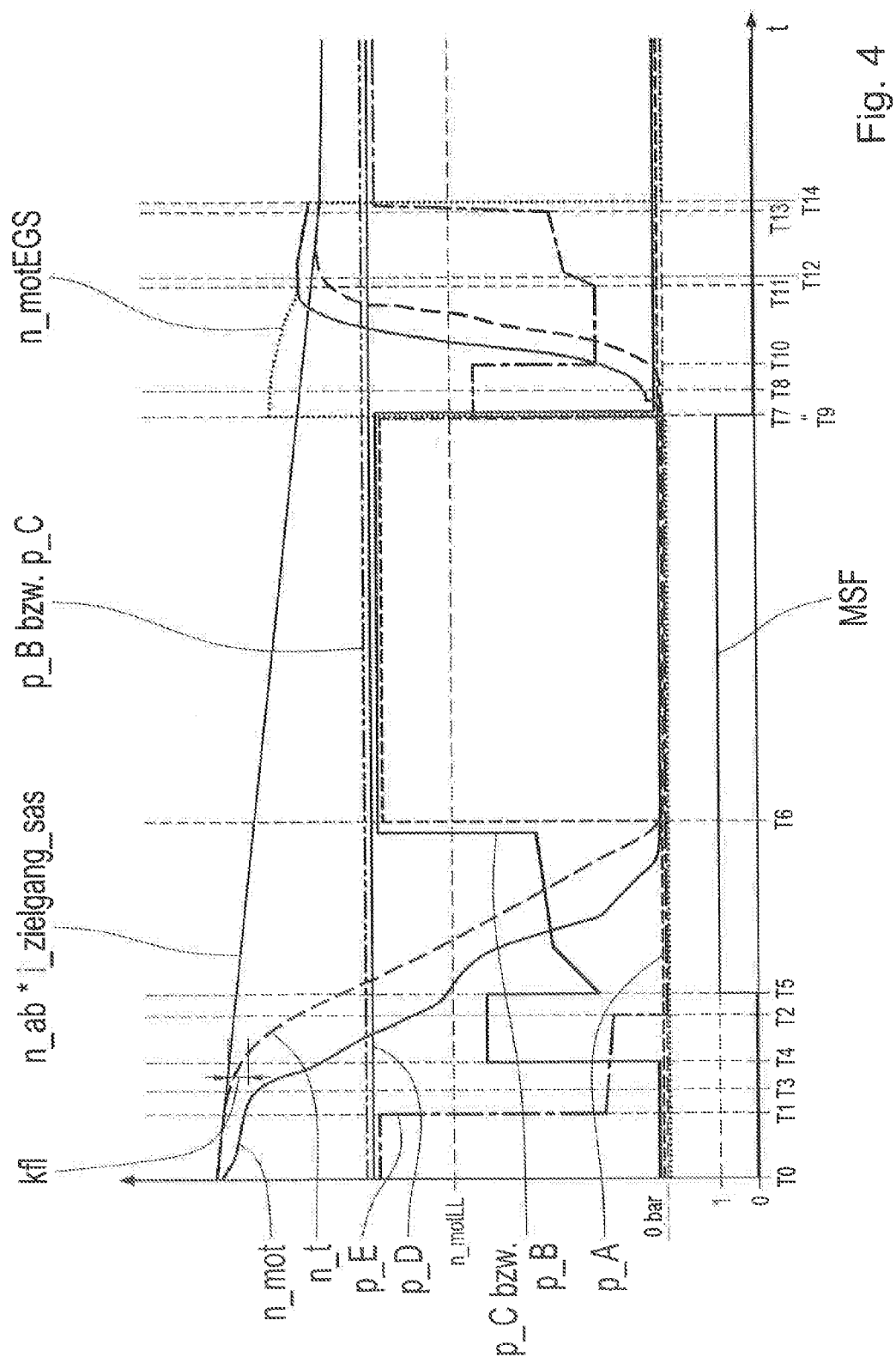
FIG. 4 a view corresponding to FIG. 3 of the progressions of the operating variables that are adjusted during a progression of operating states essentially corresponding to the progression of operating states underlying the progressions in accordance with FIG. 3, whereas a switching-off process of a drive unit of the vehicle drive train is started already from the point in time from which the request to activate the coasting operating state is present.

The progression of operating states of the vehicle drive train underlying the progressions shown in FIG. 4 is differentiated from the progression of operating states of the vehicle drive train 1 underlying the progressions of the different operating parameters of the vehicle drive train 1 shown in FIG. 3 by the fact that, during the progression of operating states in accordance with FIG. 4, already at the point in time T5 (that is, in the present case, at the end of the rapid filling phase of the shifting element C or B, as the case may be), the rotational speed n_mot of the drive unit 2 is lowered in the direction of zero. In contrast to this, during the progression of operating states in accordance with FIG. 3, only at the point in time T6, at which the actuating pressure p_C or p_B, as the case may be, is raised to the closing pressure level, the engine rotational speed n_mot of the drive unit 2 is lowered in the direction of zero.

The procedure in accordance with FIG. 3 offers the option of realizing a hydraulic supply of the transmission 4 through a main transmission pump driven by the drive unit 2 by the transmission input shaft 6, which pump is not more specifically shown in the drawing, and having to design an electrically powered auxiliary pump of the transmission 4 with lower performance. In contrast to this, during the progression of operating states of the vehicle drive train 1, from the point in time T5, the hydraulic supply of the transmission 4 is no longer completely assumed by the main transmission pump; rather, it is increasingly assumed by the electrically driven auxiliary pump of the transmission 4, which is why it must be accordingly dimensioned for the realization of the procedure in accordance with FIG. 4.

Furthermore, during the progression of operating states of the vehicle drive train 1 underlying FIG. 4, the positive-locking shifting element A is not transferred into its closed operating state at the point in time T6. Since, through the request to deactivate the coasting operating state of an operating state of the vehicle drive train 1 in the transmission 4, which is present at the point in time T7, the eighth transmission ratio "8" or the ninth transmission ratio "9" is to be engaged for forward travel, for the presentation of which the positive-locking shifting element A is to be transferred into or held in the open operating state, the positive-locking shifting element A is left in its open operating state at the point in time T7 and, in contrast to the progression of operating states of the vehicle drive train 1 in accordance with FIG. 3, is not to be transferred only into its open operating state at the point in time T7.

Thus, the procedure described in FIG. 4, as compared to the procedure illustrated in FIG. 3, has the advantage that, at the point in time T6 in the transmission 4, through the partially blocked operating state of the gear set 5, tooth-on-tooth positions that may be present in the area of the positive-locking shifting element A are not to be disbanded only through a corresponding variation of the transfer capacity of one of the three simultaneously closed shifting elements C, D or B, and, in the area of the positive-locking shifting element A, a differential rotational speed favorable for its switching on will be established between the shifting element halves of the positive-locking shifting element A. In addition, at the point in time T7, at which the positive-locking shifting element A is transferred into its open operating state during the progression of operating states underlying FIG. 3, any tension conditions in the area of the positive-locking shifting element A are not increased by the corresponding actuation of the transfer capacity of the shifting element C or B that is also to be switched off at that point, before the positive-locking shifting element A can be transferred into its open operating state for the presentation of the ninth transmission ratio "9" or the eighth transmission ratio "8" for forward travel.

In addition, the actuation of the frictional-locking shifting element E, which is to be transferred into its closed operating state for the establishment of the frictional connection between the drive unit 2 and the output 3, already from the point in time T7, at which the request to deactivate the coasting operating state of the vehicle drive train 1 is issued, can be transferred into its closed state with a higher degree of spontaneity than is possible during the progression of operating states of the vehicle drive train 1 underlying FIG. 3.

In contrast to this, the procedure described in FIG. 3 (that is, transferring the positive-locking shifting element A into its closed operating state already at the point in time T6), as compared to the procedure illustrated in FIG. 4, offers advantages with respect to the spontaneity of the vehicle drive train 1, if a request to deactivate the coasting operating state of the vehicle drive train 1 requests an operating state of the vehicle drive train 1 at which, in the area of the transmission 4, one of the transmission ratios "7" through "1" is to be engaged for forward travel, for the presentation of which the positive-locking shifting element A is be transferred into or held in its closed operating state, since, at the point in time T7, it is already in the closed operating state.

Figure 5:
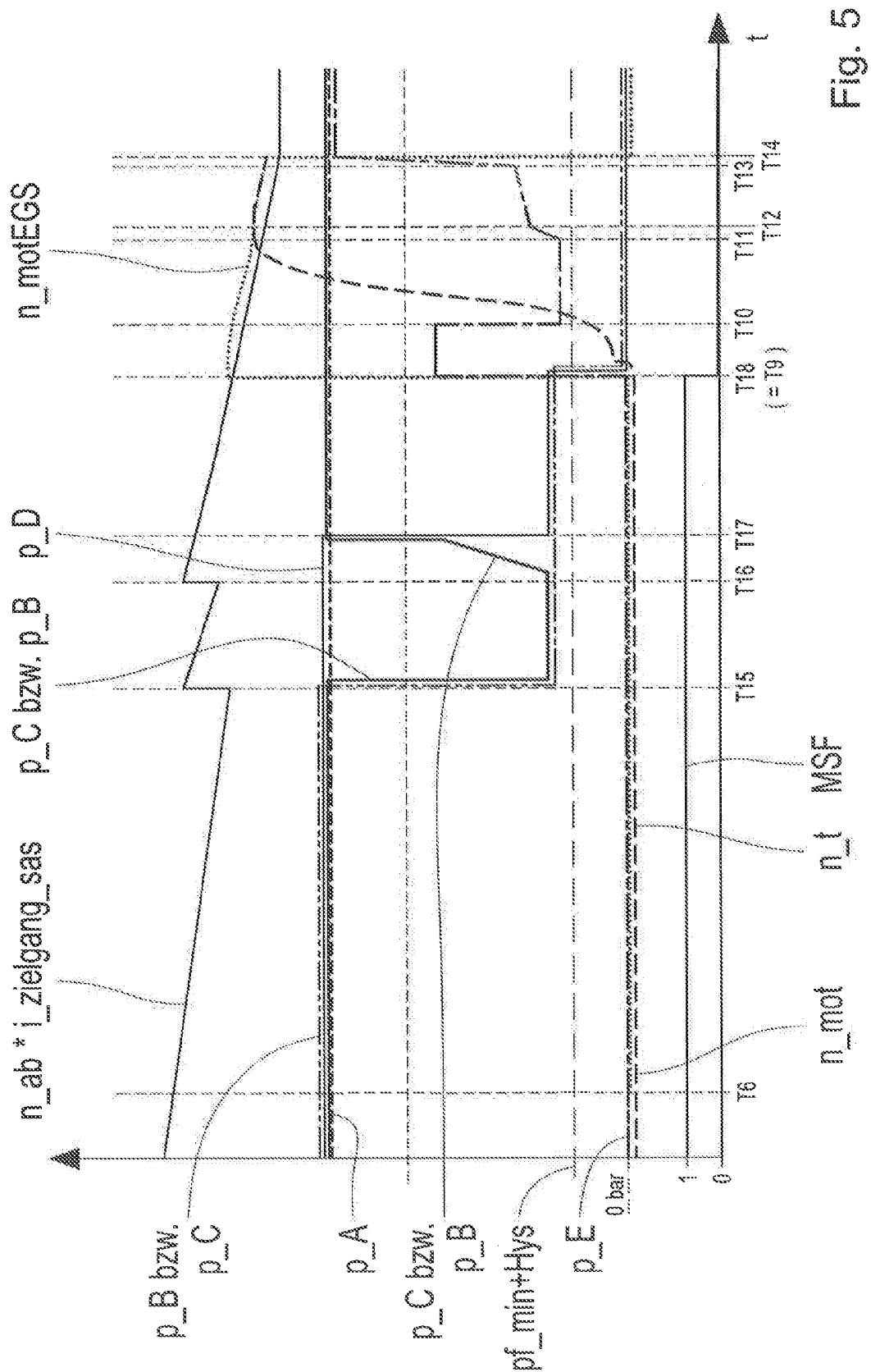
FIG. 5 the progressions of the operating variables, with an activated coasting operating state and an exit from the coasting operating state, in the direction of an operating state of the vehicle drive train, at which a positive-locking shifting element is transferred into or held in the closed operating state.

FIG. 5 shows the progressions of the operating parameters of the vehicle drive train 1 in accordance with FIG. 3 and FIG. 4 during a progression of operating states of the vehicle drive train 1 after the point in time T6, at which the vehicle drive train 1 is already present in the coasting operating state. Up to a point in time T15, a higher-level driving strategy detects that, upon a possible exit from the coasting operating state of the vehicle drive train 1 in the transmission 4, the eighth transmission ratio "8" or the ninth transmission ratio "9" is to be engaged for forward travel. At the point in time T15, with an activated coasting operating state of the vehicle drive train 1, the driving strategy determines that, upon an exit from the coasting operating state, the seventh transmission ratio "7" is to be engaged for in the transmission 4 for forward travel. In the manner described in FIG. 3, the positive-locking shifting element A has been transferred into its closed operating state already at the point in time T6.

On the basis of the determination of the driving strategy, that, from the point in time T15, the seventh transmission ratio "7" is to be engaged in the transmission 4 for forward travel, for the increase in the spontaneity of the transmission 4, either the actuating pressure p_B of the frictional-locking shifting element B or the actuating pressure p_C of the frictional-locking shifting element C is lowered at the point in time T15, while the actuating pressure p_D of the frictional-locking shifting element D is left at the closing pressure level of the shifting element D. Thereby, the actuating pressure p_B or the actuating pressure p_C of the frictional-locking shifting element B or C is above a pressure value pf_min+Hys plus an offset value depending on a hysteresis by one offset value, which presents an actuating threshold, above which the frictional-locking shifting elements B, C, and D feature, with an activated coasting operating state, a slip-free operating state.

The pressure level pf_min+Hys plus a corresponding offset value corresponds to a pressure level above a transfer pressure level of the frictional-locking shifting elements B, C and D. This ensures that, during the activated coasting operating state, through the subjecting to such a pressure level of the respective actuating pressure p_B, p_C or p_D, the frictional-locking shifting elements B, C and D are still in the closed operating state, but with significantly lower transfer capacity. This offers the advantage, that upon the presence of a fault, the risk of the redundancy of the gear set 5 of the transmission 4 is reduced, since, upon the application of a corresponding torque, the shifting elements B, C, D are transferred from this into a slip mode in the desired extent, and thus any braking torque applied in the area of the transmission output shaft 9 can be limited in a simple manner.

The spontaneity of the vehicle drive train 1 is increased, particularly in the area of the transmission 4, by the fact that, upon a corresponding request to deactivate the coasting operating state of the vehicle drive train 1 after the point in time T15, only the frictional-locking shifting element E is to be closed, and the vehicle drive train 1 can be made available, within short operating times t, with the operating state requested through the request to deactivate the coasting operating state.

In the present case, the vehicle drive train 1 remains in the coasting operating state even after the point in time T15. At a subsequent point in time T16, the driving strategy determines that the progression n_ab*i_zielgang_sas has reached a value at which a possible request to deactivate the coasting operating state in turn requests an operating state of the vehicle drive train 1, for the establishment of which the sixth transmission ratio "6" or the fifth transmission ratio "5" is to be engaged in the area of the transmission 4. For this reason, at the point in time T16, the actuating pressure p_C or the actuating pressure p_B, as the case may be, of the frictional-locking shifting element C or the frictional-locking shifting element B, as the case may be, is raised to the shown extent from the pressure level above the threshold value pf_min+Hys plus an offset value that takes into account a hysteresis, in the direction of the closing pressure level, in the manner shown in FIG. 5, while the actuating pressure p_D of the frictional-locking shifting element D is, at the point in time T17, at which the actuating pressure p_C or p_B, as the case may be, reaches the closing pressure level, lowered to a pressure level above the threshold value pf_min+Hys plus offset.

In the present case, at a point in time T18, a request to deactivate the coasting operating state of the vehicle drive train 1 is issued, whereas the exit takes place from the coasting operating state of the vehicle drive train 1 in the direction of an operating state of the vehicle drive train 1, at which either the sixth transmission ratio "6" or the fifth transmission ratio "5" is to be engaged in the transmission 4 for forward travel. Since, already at the point in time T18, the shifting elements A through D are prepared for the presentation of such a requested operating state of the vehicle drive train 1 and in particular of the transmission 4, from the point in time T18, only the frictional-locking shifting element E is to be transferred into its closed operating state in the requested extent in the manner shown in FIG. 5.

From the point in time T18, the progression of the actuating pressure p_E of the frictional-locking shifting element E, the progression n_motEGS of the EGS specification of the engine target rotational speed and the progression of the rotational speed n_mot of the drive unit 2 essentially match the sections of such progressions shown in FIG. 3 from the point in time T9. Therefore, for the sake of clarity, with respect to the actuation of the shifting element E and the actuation of the drive unit 2, from the point in time T18, reference is made to the preceding description in FIG. 3 and the procedure described therein regarding the actuation of the shifting element E and the drive unit 2 from the point in time T9. In general, from the point in time T9 or from the point in time T18, as the case may be, the exit from the coasting operating state, with a simultaneous restart of the drive unit 2, and in turn a likewise simultaneously carried out rotational speed guidance, are carried out in the area of the drive unit 2.

Figure 6:
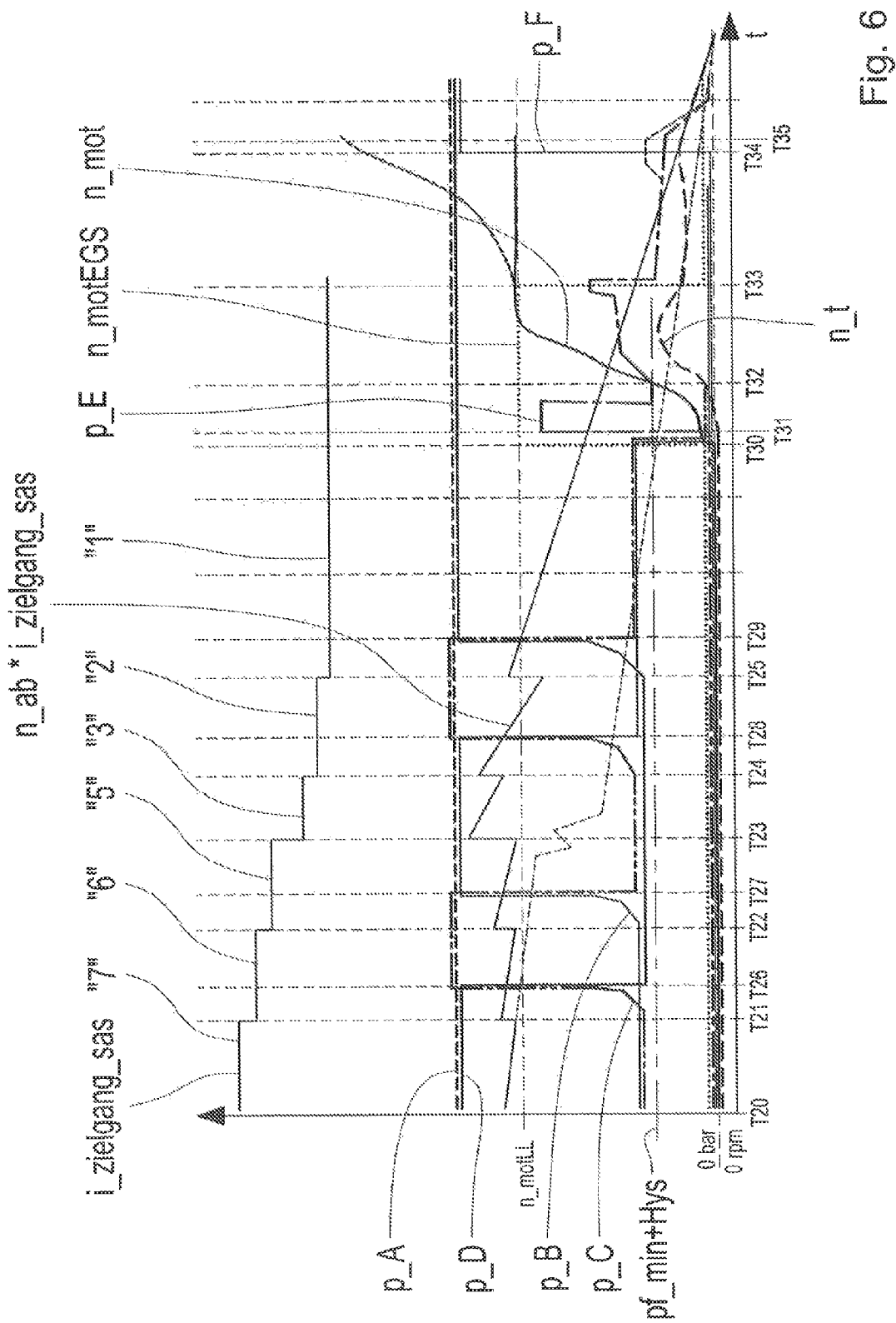
FIG. 6 the progressions of the operating parameters of the vehicle drive train, with an activated coasting operating state, which is deactivated just prior to vehicle standstill.

FIG. 6 shows the various progressions of the operating parameters of the vehicle drive train 1 from a point in time T20, which is between the points in time T15 and T16 in accordance with FIG. 5 and at which the coasting operating state of the vehicle drive train is 1 is activated. If, at the point in time T20, a request to deactivate the coasting operating state is issued, the seventh transmission ratio "7" for forward travel is to be engaged in the area of the transmission 4. The positive-locking shifting element A is closed due to the applied actuating pressure p_A. Simultaneously, the frictional-locking shifting element D is present in the closed operating state, which is subjected to an actuating pressure p_D featuring the closing pressure level, while the frictional-locking shifting element C is subjected to an actuating pressure p_C, which is above the pressure value pf_min plus the offset value by one offset value.

With an increasing operating time t, upon a further activated coasting operating state of the vehicle drive train 1, at the points in time T21, T22, T23, T24 and T25, it is determined by the so-called "coasting clutch logic" by a gear tracking increasing the spontaneity upon an exit from the coasting operating state of the vehicle drive train 1, that the sixth transmission ratio "6," the fifth transmission ratio "5," the third transmission ratio "3," the second transmission ratio "2" or the first transmission ratio "1" is to be engaged in the transmission 4. Therefore, at the point in time T26, the actuating pressure p_D is lowered to the level above the pressure limit pf_min+Hys plus offset value, while the actuating pressure p_C is raised to the closing pressure level. To the same extent, after the point in time T22, at a point in time T27, the actuating pressure p_B of the frictional-locking shifting element B is guided to the closing pressure level, while the actuating pressure p_C of the frictional-locking shifting element C is lowered to the pressure level above the pressure limit pf_min+Hys plus the offset value. In the present case, there is no change to the clutch logic, while, at a point in time T28 following the point in time T24, the actuating pressure p_C in turn is raised to the closing pressure level, and the actuating pressure p_B of the frictional-locking shifting element B is lowered to the pressure level above the pressure limit pf_min+Hys plus the offset value, whereby the transmission 4 is prepared for the engagement of the second transmission ratio "2" for forward travel.

From a point in time T29 following the point in time T25, the transmission 4 is prepared for the engagement of the first transmission ratio "1" for forward travel by the fact that the actuating pressure p_D of the positive-locking shifting element D is raised to the closing pressure level, while the actuating pressure p_C of the frictional-locking shifting element C is lowered to the pressure level above the pressure limit pf_min+Hys plus the offset value.

The last-described procedure results from the fact that, with the considered operating state of the vehicle drive train 1, upon an activated coasting operating state, the vehicle speed is continuously lowered, and it is determined by the coasting clutch logic that, with an increasing operating time t, the gear in the transmission to be engaged upon leaving the coasting operating state changes, and a smaller gear or a smaller transmission ratio is to be engaged. Since, for the presentation of the transmission ratios "4" through "1" for forward travel, the additional positive-locking shifting element F is to be transferred into the closed operating state, prior to the engagement of the transmission ratios "3" through "1" in the area of the transmission 4, synchronization gears corresponding to the transmission ratios "3" through "1" or the synchronizing transmission ratios "5," "6" or "7," as the case may be, are to be engaged.

This means that, upon a request to deactivate the coasting operating state and an operating state of the vehicle drive train that is established for this, at which the third transmission ratio "3" is to be engaged in the transmission 4 for forward travel, the fifth transmission ratio "5" is initially engaged in the transmission 4, and subsequently a downshift, starting from the fifth transmission ratio "5," is carried out in the direction of the third transmission ratio "3," during which, with an already closed positive-locking shifting element A, the additional positive-locking shifting element F, in accordance with the request, can also be transferred into its closed operating state with little effort.

With a second transmission ratio "2" for forward travel to be engaged through a request to deactivate the coasting operating state in the transmission 4, the sixth transmission ratio "6" is initially engaged in the transmission 4 for forward travel, and, subsequently, the downshift is carried out starting from the sixth transmission ratio "6" in the direction of the second transmission ratio "2," during which the additional positive-locking shifting element F is also switched on at the already closed shifting element A. In addition, it is provided that the seventh transmission ratio "7" is initially engaged in the transmission 4, and, subsequently, the downshift is carried out starting from the seventh transmission ratio "7" in the direction of the first transmission ratio "1," if, through a request to deactivate the coasting operating state of the vehicle drive train 1 in the area of the transmission 4, the first transmission ratio "1" is to be engaged. At that point, at the already closed positive-locking shifting element A, the additional positive-locking shifting element F can also be transferred into its closed operating state to the desired extent.

In the present case, at a point in time T30, the request to deactivate the coasting operating state takes place in the area of the transmission 4, at which the first transmission ratio "1" is to be engaged in the transmission 4 for forward travel. In order to transfer the additional positive-locking shifting element F into its closed operating state to the desired extent, from the point in time T29, the frictional-locking shifting element D and the positive-locking shifting element A are correspondingly subjected to their actuating pressures p_D and p_A featuring the closing pressure level. At the point in time T30, the actuating pressures p_C and p_B are lowered to zero, and the frictional-locking shifting elements C and B are transferred into their open operating states. In addition, the drive unit 2 is switched on, which is why, from the point in time T30, the progression of the rotational speed n_mot of the drive unit 2 increases as a function of the EGS specification of the engine target rotational speed, on a controlled basis, in the direction of the idle speed n_motLL.

At a point in time T31 following the point in time T30, the frictional-locking shifting element E is subjected to a rapid filling pulse during a rapid filling phase, and to a filling equalization pressure during a subsequent filling equalization phase, whereas, in the present case, the filling equalization ends at a point in time T32. Subsequently, the actuating pressure p_E is raised over a first pressure ramp from the point in time T32, by which the synchronization transmission ratio or the seventh transmission ratio "7" corresponding to the first transmission ratio "1" is engaged in the transmission 4. With a further increasing actuating pressure p_E of the frictional-locking shifting element E, the turbine rotational speed n_t increases in the direction of the progression n_ab*i_zielgang_sas and matches this at the point in time T33, at which the shifting element E has its full transfer capacity. At the point in time T33, the actuating pressure p_E of the frictional-locking shifting element E is in turn lowered to the level of the pressure threshold pf_min+Hys plus the offset value, in order to transfer the additional positive-locking shifting element F, to the desired extent, into an operating mode favorable for its switching on. Thereby, a differential rotational speed between the shifting element halves of the additional positive-locking shifting element F is transferred into a differential rotational speed window favorable for switching on, and the additional positive-locking shifting element F is, at a point in time T34, subjected to the actuating pressure p_F required for switching on, and is transferred into its closed operating state.

At a point in time T35 shortly after this, it is detected that the additional positive-locking shifting element F is present in the closed operating state, since, at the point in time T35, the progression of the turbine rotational speed n_t corresponds to the progression n_ab*i_zielgang_sas, which, as is generally known, is adjusted with a first transmission ratio "1" engaged in a transmission 4. For this reason, at the point in time T35, the actuating pressure p_E of the positive-locking shifting element E is lowered to zero in the manner shown, and the frictional-locking shifting element E is fully opened, by which the coasting mode is deactivated and the vehicle drive train 1 features the requested operating state.

The procedure in accordance with exemplary aspects of the invention is particularly suitable for gear set concepts in conjunction with shifting elements that are correspondingly designed and arranged in the gear set for which, through the opening of a frictional-locking shifting element, the output of a vehicle drive train can freely circulate from the gear set of the transmission. With the embodiment of the automatic transmission 4 that is considered in the present case, this is the shifting element E. Through the additional shifting elements or the brakes D and C, as the case may be, one shifting element half of the positive-locking shifting element A or its rotational speed can be adjusted to zero. In addition, the rotational speed of the additional shifting element half of the shifting element A and the transmission input shaft 6 can be adjusted to zero through the closing of the shifting element B upon an activated coasting operating state of the vehicle drive train 1. Through this active blocking of the gear set 5, a change to the pressure level of the actuating pressures of the shifting elements can be dynamically carried out during the gear tracking described above, and can be adjusted as with overlapping gearshifts that are conventionally carried out.

If the shifting elements B, C or D are subjected to a pressure level, which is required for the blocking of the gear set 5, above the filling pressure, the blocking of the gear set 5 is maintained and the turbine rotational speed n_t is equal to zero. Thus, over the entire operating range of the transmission 4, a rapid gear tracking can be carried out, and a filling of the shifting elements B, C, or D by an electrically driven auxiliary pump of the transmission 4 is not required. If a restart of the drive unit 2 is requested by a corresponding request to deactivate the coasting operating state, the shifting elements of the transmission 4 that are not required for the presentation of the requested operating state of the vehicle drive train can be switched off in a simple manner by reducing the respective actuating pressure.

The gear tracking described in particular in FIG. 5 and FIG. 6, during the coasting activated operating state of the vehicle drive train 1, in the area of the transmission 4, can also be carried out in the reverse direction with an increasing vehicle speed or with an increasing output rotational speed n_ab. Such an increase in the output rotational speed occurs, for example, during the downhill travel of a vehicle designed with a vehicle drive train that can be operated in accordance with exemplary aspects of the invention. Furthermore, it is also possible that the vehicle speed increases above an additional drive of a vehicle that is independent of the drive unit, such as (for example) an electric vehicle axle or the like.

Independent of the event increasing the output rotational speed, initially upon a transition into the coasting operating state of the vehicle drive train with lower transmission ratios "1" through "8" engaged in the transmission 4 for forward travel to the extent described above, through the closing of the shifting elements B, C and D, the gear set 5 is initially transferred into the partially blocked operating state, and, subsequently, there is a monitoring as to whether, upon an exit from the coasting operating state at the current operating point of the vehicle drive train for presenting the operating state of the vehicle drive train 1 that is then requested, a transmission ratio is to be engaged in the transmission 4 that is higher than that at the point in time at which the coasting operating state of the vehicle drive train 1 was activated. If this is the case, the transmission is actuated through the corresponding actuation of the shifting elements A through F to the extent required for it, and is prepared for the transmission ratio to be engaged as a function of the present operating point of the vehicle drive train in the area of the transmission 4 to the effect that, upon an exit from the coasting operating state, the requested operating state of the vehicle drive train can be presented within short operating times.

Figure 7:
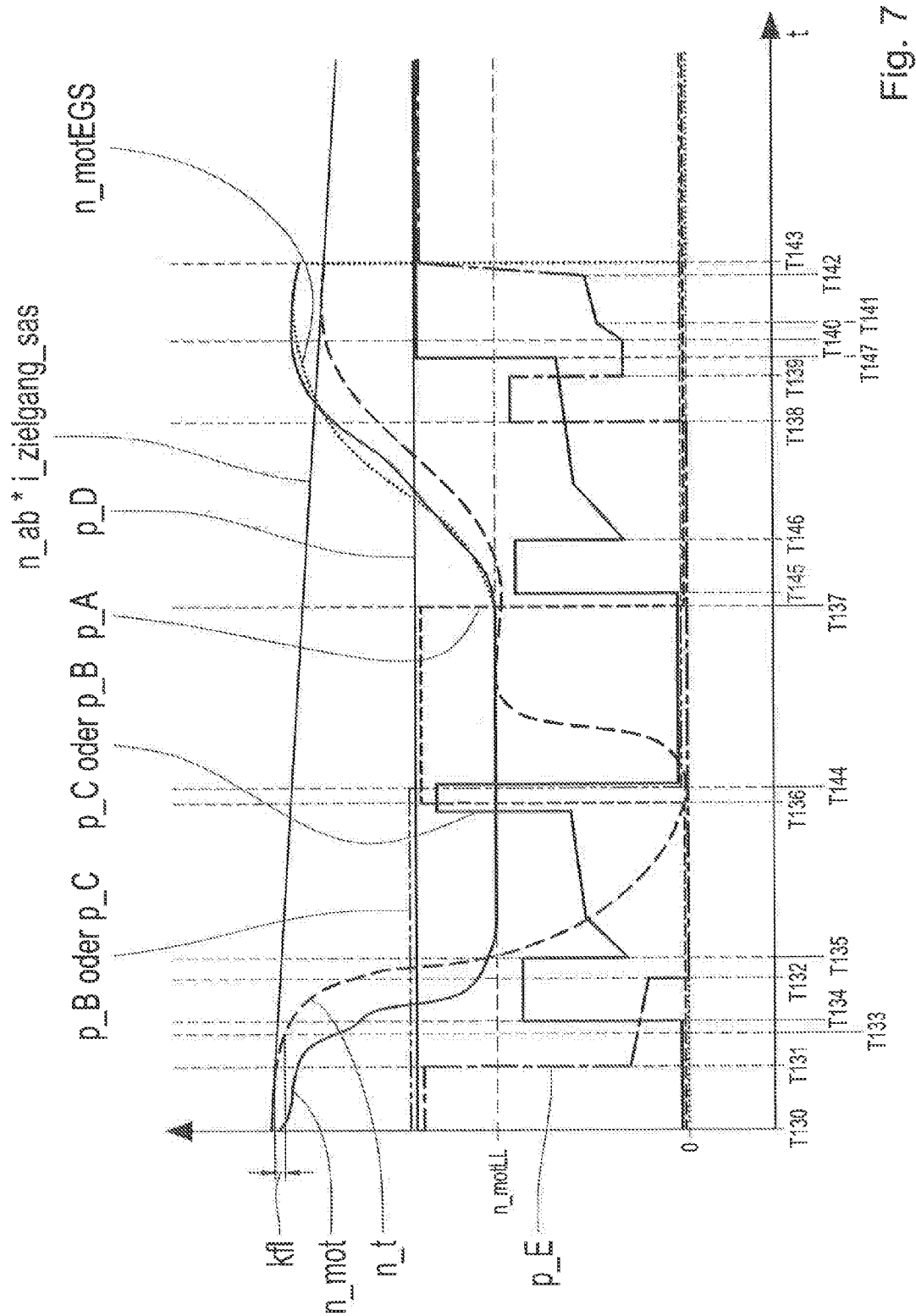
FIG. 7 several progressions of various operating parameters of the vehicle drive train in accordance with FIG. 1 over time t, which is transferred into a coasting operating state in accordance with a request, which is in turn deactivated at a later point in time.

FIG. 7 through FIG. 11 each show several progressions of different operating variables of the vehicle drive train 1 over time t, whereas, at a point in time T130 characterized more specifically in FIG. 7, the vehicle drive train 1 is in turn in a driving operating state at which the eighth transmission ratio "8" or the ninth transmission ratio "9" is engaged in the transmission 4 for forward travel and a rotational speed n_mot of the drive unit 2 is greater than an idle speed n_motLL of the drive unit 2. At the point in time T130, a request to present a coasting operating state of the vehicle drive train 1 is issued, during which the drive unit 2 is switched on and the power flow between the drive unit 2 and the output 3 is interrupted in the area of the transmission 4. From the point in time T130, the rotational speed n_mot of the drive unit 2 is guided, to the shown extent, increasingly in the direction of the idle speed n_motLL. For activating the coasting operating state of the vehicle drive train 1, from the point in time T131, through a corresponding lowering of the actuating pressure p_E in the manner shown in FIG. 7 up to a point in time T132, the frictional-locking shifting element E is transferred into its open operating state, and, thereby, the power flow between the drive unit 2 and the output 3 is separated in the area of the transmission 4.

The lowering of the transfer capacity of the frictional-locking shifting element E causes the fact that, from a point in time T133, which is between the points in time T131 and T132, the rotational speed n_t of the transmission input shaft 6 deviates from the product of the rotational speed n_ab of the output 3 and the transmission ratio i_zielgang_sas engaged in the present case in the transmission at the point in time T130. If the deviation between the turbine rotational speed n_t and the product of the rotational speed n_ab times the transmission ratio i_zielgang_sas exceeds a threshold value kfl, in the present case, the separated power flow between the drive unit 2 and the output 3 in the area of the transmission 4 is detected. In the present case, this is the case at a point in time T134, which is between the points in time T133 and T132.

At the point in time T134, with a ninth transmission ratio "9" for forward travel engaged in the transmission 4, the actuating pressure p_C of the frictional-locking shifting element C is, in the manner shown in FIG. 7 in ideal form, increased stepwise to the level of the rapid filling pressure and is left at such level up to a point in time T135. Subsequently, at the point in time T135, the actuating pressure p_C is lowered to an intermediate pressure level and raised in a ramp-like manner over two consecutive pressure ramps up to a point in time T138, at which the frictional-locking shifting element C features a slip-free operating state. At the point in time T136, the actuating pressure p_C is raised to a level at which the frictional-locking shifting element C is fully closed.

If, at the point in time T130, the eighth transmission ratio "8" is engaged in the transmission 4 for forward travel, between the points in time T134 and T136, instead of the actuating pressure p_C, the actuating pressure p_B of the frictional-locking shifting element B is adjusted in the last-described manner, in order to transfer the frictional-locking shifting element B, in addition to the frictional-locking shifting elements C and D, into the closed operating state.

In the closed operating state of the frictional-locking shifting elements C, D and B, the gear set 5 of the transmission 4 features a partially blocked operating state, in which the transmission input shaft 6 is held in a torque-proof manner and the transmission output shaft 9 connected to the output 3 is rotatable. In such operating state of the transmission 4, the raising of the actuating pressure p_A of the positive-locking shifting element A takes place, by which the positive-locking shifting element is transferred into its closed operating state. Simultaneously, the drive unit 2 is operated at the idle speed n_motLL.

At a point in time T144, the closed operating state of the shifting element A is detected, which is why, at the point in time T144, both the actuating pressure p_B of the frictional-locking shifting element B and the actuating pressure p_C of the frictional-locking shifting element C is lowered to zero to the shown extent, by which, at the point in time T144, the coasting operating state of the vehicle drive train 1 requested at the point in time T130 is activated to the desired extent.

In the present case, the coasting operating state is requested by a request on the driver's side, for example by an accelerator release and an actuation of the service brake that is preferably on the drivers side. Additionally or alternatively, it is also possible that the coasting operating state is requested by a higher-level driving strategy, if a performance request on the drivers side does not take place and it is also determined that a driving route that is specified, for example, by a navigation system, can be driven through, at least in sections, in coasting mode and with low fuel consumption.

In the present case, in the manner shown in FIG. 7, the vehicle drive train 1 remains in the coasting operating state until a point in time T137. At the point in time T137, for example, the driver once again actuates the accelerator pedal, and requests a corresponding performance on the part of the drive unit 2. Such a performance request on the drivers side causes the fact that the rotational speed n_mot of the drive unit 2 increases from the point in time T137. In order to prevent an uncontrolled increase in the engine rotational speed n_mot, the drive unit 2 is operated in rotational speed control mode from the point in time T137, and a specification of the engine target rotational speed on the transmission side corresponding to the progression n_motEGS is carried out. Through the activation of the specification of the engine target rotational speed, from the point in time T137, the engine rotational speed n_mot is raised in the direction of a level that is above the rotational speed n_t of the transmission input shaft 6 that arises from the product of the output rotational speed n_ab and the transmission ratio i_zielgang_sas to be engaged in the transmission 4 at the point in time T137.

Since the vehicle drive train 1 is in an operating state at the point in time T137, at which, upon a deactivated coasting operating state in the transmission 4, the transmission ratio engaged in the transmission 4 at the point in time T130 (that is, the ninth transmission ratio "9" or the eighth transmission ratio "8" for forward travel), at the point in time T137, the actuating pressure p_A of the positive-locking shifting element A is reduced, and the positive-locking shifting element A is transferred into its open operating state at the point in time T137. At a point in time T145 following the point in time T137, the open operating state of the positive-locking shifting element A is detected, and the frictional-locking shifting element C or B, as the case may be, is pre-filled by a rapid filling pulse continuing up to a point in time T146. At the point in time T146, the actuating pressure p_C or p_B, as the case may be, is guided to an intermediate pressure level, and is raised in a ramp-like manner to an additional intermediate pressure level over two successive pressure ramps up to a point in time T147, at which the frictional-locking shifting element C or B features a slip-free operating state. At the point in time T147, the actuating pressure p_C or p_B is raised to the closing pressure level, at which the frictional-locking shifting element C or B is fully closed.

With an increasing rotational speed n_mot of the drive unit 2, the turbine rotational speed n_t also increases, and follows the progression of the rotational speed n_mot of the drive unit 2. From a point in time T138, the actuating pressure p_E of the frictional-locking shifting element E is, in the manner shown in FIG. 7, prepared for switching on during a rapid filling phase continuing up to a point in time T139 and a filling equalization phase that is subsequent to this and continues up to a point in time T140.

At the point in time T140, the frictional-locking shifting element E features an operating state, in which the transfer capacity of the frictional-locking shifting element E is essentially equal to zero, and a further raising the actuating pressure p_E has the consequence of an immediate increase in the transfer capacity of the frictional-locking shifting element E. From the point in time T140, the actuating pressure is raised over a pressure ramp p_E continuing up to a point in time T141. In the present case, at the point in time T140, the actuating pressure p_E of the frictional-locking shifting element E is raised over the first pressure ramp subsequent to the filling equalization phase, if the progression of the rotational speed n_mot of the drive unit 2 for the presently considered traction mode of the vehicle drive train 1 has reached or even exceeded the progression n_ab*i_zielgang_sas and a differential rotational speed Nd_Syn between the shifting element halves of the shifting element E is near the synchronous rotational speed or is less than or equal to a threshold value, as the case may be.

In contrast to this, the actuating pressure p_E of the shifting element E to be switched on, to an extent that is not shown in more detail, in the coasting mode of the vehicle drive train 1, is raised from the point in time T140 over the first pressure ramp subsequent to the filling equalization phase, if the progression of the rotational speed n_mot of the drive unit 2 is below the progression n_ab*i_zielgang_sas or matches this, and a differential rotational speed Nd_Syn between the shifting element halves of the shifting element E is near the synchronous rotational speed or is less than or equal to a threshold value, as the case may be.

Subsequent to this, the actuating pressure p_E of the frictional-locking shifting element E is further increased over an additional pressure ramp, the gradient of which is less than the gradient of the pressure ramp present between the points in time T140 and T141. At the end of the second pressure ramp (that is, in the present case, at the point in time T142), the frictional-locking shifting element E is present in a slip-free operating state and the turbine rotational speed n_t corresponds to the product of the output rotational speed n_ab and the transmission ratio i_zielgang_sas that is requested at the point in time T137 and is to be engaged in the transmission 4, which in the present case corresponds either to the ninth transmission ratio "9" or the eighth transmission ratio "8."

Here as well, the engine rotational speed n_mot is guided by the specification of the engine target rotational speed on the transmission side to a level above the progression n_ab*i_zielgang_sas, in order to, during the establishment of the power flow between the drive unit 2 and the output 3, avoid, in the area of the transmission 4, any undesired rotational speed crossing between the rotational speed n_mot of the drive unit 2 and the turbine rotational speed n_t arising from the transmission ratio to be engaged in the transmission 4 and the output rotational speed n_ab.

At the point in time T143, the actuating pressure p_E of the frictional-locking shifting element E is the closing pressure level, and the operating state of the vehicle drive train 1 requested at the point in time T137 is established to the desired extent at the point in time T143. After the point in time T143, at which the coasting operating state of the vehicle drive train 1 is terminated, sequential gearshifts that may be requested can be carried out in the transmission 4 to the desired extent.

The procedure described in FIG. 7 (that is, transferring the positive-locking shifting element A into its closed operating state already at the point in time T136) offers advantages with respect to the spontaneity of the vehicle drive train 1, if a request to deactivate the coasting operating state of the vehicle drive train 1 requests an operating state of the vehicle drive train 1 at which, in the area of the transmission 4, one of the transmission ratios "7" through "1" is to be engaged for forward travel, for the presentation of which the positive-locking shifting element A is be transferred into or held in its closed operating state, since, at the point in time T137, it is already in the closed operating state.

Thus, in a simple manner, it is avoided that, upon highly probable coasting exit by a load request on the driver's side, a downshift is required, during which the positive-locking shifting element A is transferred into its closed operating state. Thus, long shifting times and low performance after a coasting exit are avoided, on the basis of a claw downshift to be carried out, in accordance with the request, during a coasting exit. During the synchronization of the positive-locking shifting element A to be switched on, the converter lock-up clutch 8 is opened, in order to avoid any stalling of the drive unit 2 on the basis of the transmission input shaft 6 held in a torque-proof manner. Subsequently, during the activated coasting operating state, the control of the converter lock-up clutch carried 8 out prior to the request to activate the coasting operating state is once again released.

Alternatively, it may also be provided that the vehicle drive train in the area between the drive unit and the transmission is designed only with a frictional-locking shifting element or a frictional-locking clutch, which is controlled and/or regulated to an extent corresponding to the actuation of the converter lock-up clutch, in order to synchronize the positive-locking shifting element A to be switched on to the desired extent and simultaneously prevent the stalling of the drive unit 2.

In order to, during a coasting entry, ensure the engagement of the positive-locking shifting element A, the option exists of changing the simultaneous actuation of the frictional-locking shifting elements B, C and D provided for closing the positive-locking shifting element A by opening the frictional-locking shifting element B, in order to disband a tooth-on-tooth position present in the area of the positive-locking shifting element A, since a large torque can be imparted to the positive-locking shifting element A by opening the frictional-locking shifting element B.

The option also exists of, in the area of the drive unit 2, providing an engine intervention, by which the rotational speed n_mot of the drive unit 2 is raised starting from the idle speed n_motLL, in order to impart a disturbance torque disbanding the tooth-on-tooth position in the area of the positive-locking shifting element A. Additionally or alternatively, there is also the option of briefly raising the transfer capacity of the converter lock-up clutch 8, in order to disband the tooth-on-tooth position in the area of the positive-locking shifting element A by shifting the partial blockage of the gear set 5.

In contrast to this, it is also possible that the positive-locking shifting element A is partially closed through the actuation in the closing direction, but has not reached its desired end position and thus its fully closed operating state. If a torque hindering the complete closure of the positive-locking shifting element A applies at the positive-locking shifting element A, the shifting elements B, C and A continue to be actuated in the closing direction during the closing process of the shifting element A, while the frictional-locking shifting element D is transferred into its closed operating state, by which the torque applied at positive-locking shifting element A is reduced to an extent favorable for the closing process, and a so-called "claw unburdening" is carried out.

Such torques impairing the closing process of the positive-locking shifting element A arise, among other things, from the drag torques internal to the transmission and other influences that burden the positive-locking shifting element, during its closing process, with such a high torque that a complete insertion movement is no longer possible.

The procedure described above in FIG. 7, transferring the positive-locking shifting element A into its closed operating state already during the coasting entry, upon a coasting entry starting from the transmission ratios "9" or "8," at vehicle speeds less than a threshold value, offers significant improvements with respect to the spontaneity of the vehicle drive train, since, upon a coasting exit in the transmission 4, a smaller gear is to be engaged in any event, and the coasting exit will be connected to a downshift in any case. However, at higher vehicle speeds, this procedure can also be disruptive and disadvantageous, since the positive-locking shifting element A for presenting an operating state of the vehicle drive train 1 requested by a coasting exit cannot be transferred into a closed operating state. Therefore, a speed-dependent definition of the strategy for claw conditioning is provided, in order to limit the preconditioning, described in FIG. 7, of the positive-locking shifting element A during the activated coasting operating state of the vehicle drive train in operating ranges in which the preconditioning effects an improvement in spontaneity.

This means, upon a coasting entry starting from operating states, at which the transmission ratio "9" or "8" is to be engaged in the transmission 4 for forward travel, the positive-locking shifting element A is not transferred into its closed operating state, if the vehicle speed is greater than the threshold value and a present request to deactivate the coasting operating state is to present an operating state of the vehicle drive train 1, in which the eighth transmission ratio "8" or the ninth transmission ratio "9" is to be engaged in the transmission 4 for forward travel, for the presentation of which the positive-locking shifting element A is to be transferred into or held in the open operating state. At that point, at the point in time T136, the positive-locking shifting element A is left in its open operating state, and, in contrast to the operating state of the vehicle drive train 1 in accordance with FIG. 7, at the point in time T137, is not even to be transferred into its open operating state.

Compared to the procedure illustrated in FIG. 7, this procedure has the advantage that, at the point in time T136 in the transmission 4, through the partially blocked operating state of the gear set 5, tooth-on-tooth positions that may be present in the area of the positive-locking shifting element A are not even to be disbanded through a corresponding variation of the transfer capacity of one of the three simultaneously closed shifting elements C, D or B, and, in the area of the positive-locking shifting element A, a differential rotational speed favorable for its switching on will be established between the shifting element halves of the positive-locking shifting element A. In addition, at the point in time T137, at which the positive-locking shifting element A is transferred into its open operating state during the progression of operating states underlying FIG. 7, any tension conditions in the area of the positive-locking shifting element A are not increased by the corresponding actuation of the transfer capacity of the shifting element C or B that is also to be switched off at that point, before the positive-locking shifting element A can be transferred into its open operating state for the presentation of the ninth transmission ratio "9" or the eighth transmission ratio "8" for forward travel.

In addition, the actuation of the frictional-locking shifting element E, which is to be transferred into its closed operating state for the establishment of the frictional connection between the drive unit 2 and the output 3, already from the point in time T137, at which the request to deactivate the coasting operating state of the vehicle drive train 1 is issued, can be transferred into its closed state with a higher degree of spontaneity than is possible during the progression of operating states of the vehicle drive train 1 underlying FIG. 7.

If the vehicle drive train 1 is in coasting mode, and the transmission 4 is correspondingly operated over long operating times of the second variant of the shifting logic, such that the positive-locking shifting element A is already switched on and the shifting element E is additionally held in the closed operating state, excessive drag torques are permanently generated during a constant driving mode in the transmission 4. Therefore, after the expiration of a defined operating time, the transmission 4 is operated in accordance with the first variant of the shifting logic. Thereby, a decision criterion, as to whether, with an activated coasting operating state of the vehicle drive train 1, the transmission 4 is permanently operated according to a first variant or the second variant of the shifting logic, constitutes the current gradient of the rotational speed n_ab of the output 3.

If, with an output rotational speed n_ab, at which, upon an exit, the eighth transmission ratio "8" or the ninth transmission ratio "9" is to be engaged in the transmission 4, the vehicle drive train 1 is in the coasting operating state, and the transmission 4 is actuated according to the first variant or the second variant of the shifting logic, and both the positive-locking shifting element A and the frictional-locking shifting element E are present in the closed operating state, upon a request to present a neutral operating state of the transmission 4, at which the positive-locking shifting element is to be held in or is to be transferred into the open operating state, prior to the presentation of the neutral operating state on the software side, a gear jump in the direction of the seventh transmission ratio "7" is carried out. Thus, in a simple manner, the neutral operating state of the transmission 4 is implemented, in accordance with the request, with a simultaneously engaged positive-locking shifting element A.

This offers the advantage that the new shifting logic, during which, in the coasting operating state of the vehicle drive train, the positive-locking shifting element A is preconditioned, in the case of a requested gear disengagement process, which is assigned the highest priority, without a new shifting process being able to be implemented and additional hardware resources not being required. By this procedure, with little effort, existing shifting processes can continue to be carried out and gear disengagement processes can be realized with a high degree of spontaneity, since, at that point, the frictional connection in the area of the transmission 4 is already completely degraded, before the positive-locking shifting element A is transferred into its open operating state.

Figure 8:
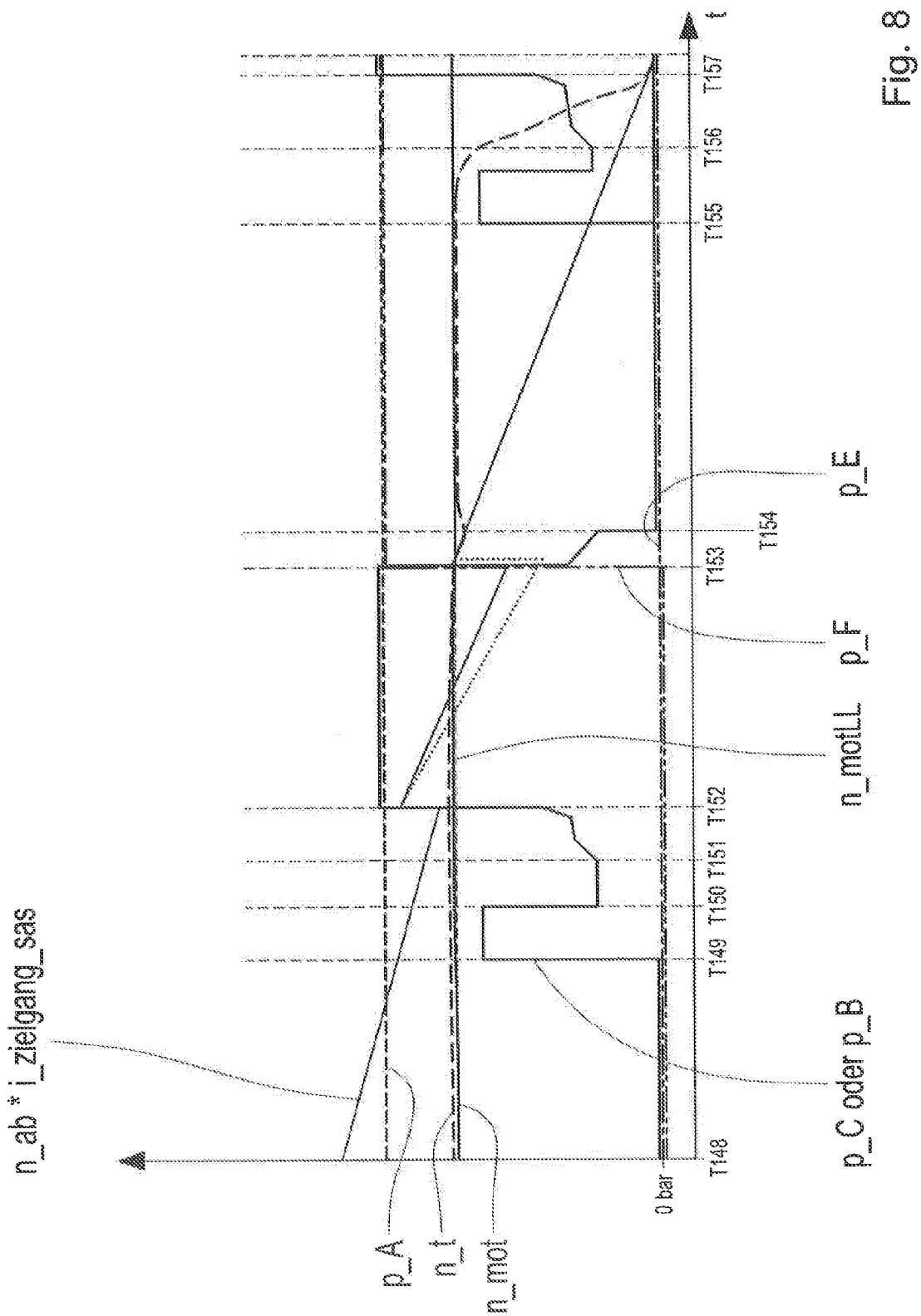
FIG. 8 the progressions of the operating parameters of the vehicle drive train, with an activated coasting operating state, which is deactivated just prior to vehicle standstill, whereas a synchronization point of a positive-locking shifting element to be switched on, upon a constant rotational speed of a drive unit of the vehicle drive train in conjunction with a special gear tracking, is reached.

FIG. 8 shows the progressions of the operating parameters of the vehicle drive train 1 in accordance with FIG. 7 during a progression of operating states of the vehicle drive train 1 after the point in time T136, at which the vehicle drive train 1 is already present in the coasting operating state. At a point in time T148, the transmission 4 is in an operating state at which, in the transmission 4, only the positive-locking shifting element A is closed, while all additional shifting elements B through F are open. Up to a point in time T149, a higher-level driving strategy detects that, upon a possible exit from the coasting operating state of the vehicle drive train 1 in the transmission 4, the seventh transmission ratio "7" is to be engaged for forward travel. At the point in time T149, with an activated coasting operating state of the vehicle drive train 1, as a function of the current progression of operating states of the vehicle drive train 1, the driving strategy determines that, upon an exit from the coasting operating state, the sixth transmission ratio "6," or, upon a progression of operating states that deviates from this, the fifth transmission ratio "5," is to be engaged in the transmission 4 for forward travel.

On the basis of the determination of the driving strategy, that, from the point in time T149, the sixth transmission ratio "6" or the fifth transmission ratio "5" is to be engaged in the transmission 4 for forward travel, for the increase in the spontaneity of the transmission 4, either the actuating pressure p_C of the frictional-locking shifting element C or the actuating pressure p_B of the frictional-locking shifting element B, at the point in time T149, is raised to the rapid filling pressure level of the shifting element C or B, as the case may be, and, at a subsequent point in time T150, is lowered to the level of the filling equalization pressure and, up to a point in time T151, which, in the present case, constitutes the end of the filling equalization phase of the shifting element C or B, as the case may be, is left at such pressure level. Subsequent to this, the actuating pressure p_C or p_B of the shifting element C or B, as the case may be, is raised over three consecutive pressure ramps up to a point in time T152 to a pressure level at which the frictional-locking shifting element C or B, as the case may be, is present in the closed operating state, whereas, at the point in time T152, the actuating pressure p_C or p_B, as the case may be, is raised to the closing pressure level. With an increasing operating time t, the output rotational speed n_ab and thus the progression of the product n_ab*i_zielgang_sas is steadily lowered to the shown extent.

If the transmission 4 correspondingly uses standard coasting logic, after the point in time T152, it is determined by the higher-level driving strategy that, in addition to the positive-locking shifting element A, the additional positive-locking shifting element F is also to be transferred into its closed operating state, in order to, upon a coasting exit, engage one of the transmission ratios "1" through "4" of the first transmission ratio sub-range in the transmission 4 with a high degree of spontaneity.

With simultaneously closed shifting elements A and B, the differential rotational speed dnF between the shifting element halves of the additional positive-locking shifting element F can be determined by the formulaic relationship set forth in the following:

$$dnF = X*n\_t + Y*n\_ab$$

Thereby, the variables X and Y represent factors that exist as a function of the respective transmission ratios of the individual gear sets of the transmission 4. With simultaneously switched-on shifting elements A and B, with the considered embodiment of the transmission 4 in accordance with FIG. 1, the variable X features a value equal to −1.1, while Y is equal to −2.1. In contrast to this, with simultaneously switched-on shifting elements A and C, X is equal to −0.739, while Y in turn is equal to −2.1.

In the present case, by the formulaic relationship, at the point in time T153, a differential rotational speed value that is more favorable for closing the additional positive-locking shifting element F is determined between the shifting element halves of the additional positive-locking shifting element F, and the additional positive-locking shifting element F is transferred into its closed operating state through the corresponding raising of the actuating pressure p_F of the additional positive-locking shifting element F. Simultaneously, from the point in time T153, the actuating pressure p_C or p_B, as the case may be, of the frictional-locking shifting element C or B, as the case may be, is lowered to the shown extent and, up to the point in time T154, is lowered to zero. The switching on of the additional positive-locking shifting element F and the subsequent switching off of the frictional-locking shifting element C or B, as the case may be, causes the fact that the turbine rotational speed n_t is initially adjusted to the progression of the product n_ab*i_zielgang_sas and, from the point in time T154, falls back in the direction of the engine rotational speed n_mot.

Thus, the switch from the second transmission ratio sub-range in the direction of the first transmission ratio sub-range of the transmission 4 is realized in a simple manner, without additional measures, upon a coasting operating state of the vehicle drive train 1 that is still activated. With an increasing operating time t, starting from the operating state of the vehicle drive train 1 present at the point in time T154, an additional coasting operating state can be carried out with decreasing output rotational speed n_ab without further actuation of the transmission 4 and can also be deactivated with a high degree of spontaneity, since an optionally requested build-up of a frictional connection in the area of the transmission 4 between the drive unit 2 and the output 3 can then be realized by switching on the frictional-locking shifting element B, C or D, without an additional actuation of the positive-locking shifting elements A and F, within short operation times.

In the present case, at a point in time T155, from which the actuating pressure p_C or p_B, as the case may be, of the frictional-locking shifting element C or B, as the case may be, such a request is issued to the shown extent over a rapid filling phase, and a subsequent filling equalization phase is initially adjusted up to a point in time T156 for a switching on of the shifting element C or B. Subsequently, at the point in time T156, the actuating pressure p_C or p_B, as the case may be, is raised, for example, over three consecutive pressure ramps up to a point in time T157, to a level at which the frictional-locking shifting element C or B, as the case may be, is present in a slip-free operating state, and, at the point in time T157, the actuating pressure p_C or p_B, as the case may be, is raised to the closing pressure level of the frictional-locking shifting element C or B, as the case may be.

Alternatively, it is also possible that, from the point in time T155, a vehicle designed with the vehicle drive train 1 is coasting in the direction of its standstill, and the vehicle drive train is operated during vehicle standstill or close to vehicle standstill in accordance with an engine start-stop function, and the two positive-locking shifting elements A and F are switched on in the transmission 4, and the additional shifting elements C, D, B and E are in the open state. The drive unit 2 decoupled from the output 3 is switched off during vehicle standstill, and is switched on upon a corresponding request to start the vehicle, and the shifting element D, C, B or E to be switched on for the presentation of the requested start-up transmission ratio "1", "2", "3" or "4" for forward travel is transferred into the closed operating state.

The gear tracking described above of the additional positive-locking shifting element F takes place at nearly constant rotational speeds n_mot and n_t of the drive unit 2 and the transmission input shaft 6, with a simultaneously changing rotational speed n_ab of the output 3, whereby the additional positive-locking shifting element F is transferred into its synchronous state. In order to avoid reaction torques in the vehicle drive train 1 that are perceptible on the driver's side, after closing the additional positive-locking shifting element F the previously actuated shifting element C or B is switched off.

The use of the additional positive-locking shifting element F as a force-fitting clutch is possible based on the nearly load-free operating state of the additional positive-locking shifting element F, which in turn arises from the low torque transferred by the hydrodynamic torque converter 7 with a simultaneously open converter lock-up clutch 8. During the determination of the synchronization point of the additional positive-locking shifting element F to be switched on, the transfer capacity of the converter lock-up clutch 8 is adjusted such that the rotational speeds n_mot and n_t of the drive unit 2 and the transmission input shaft 6 match, and in order to transfer the additional positive-locking shifting element F into an operating state favorable for switching on.

Figure 9:
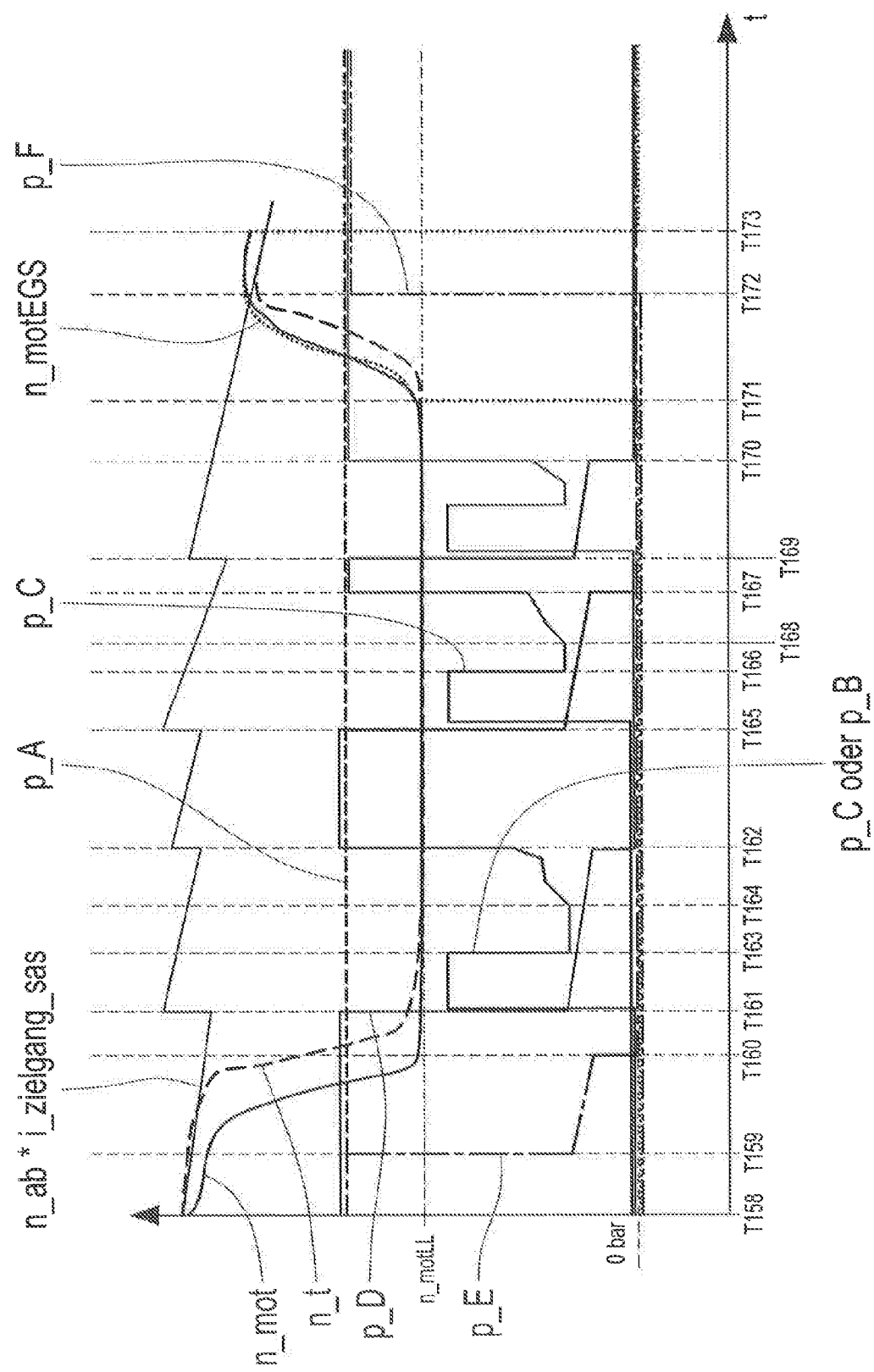
FIG. 9 the progressions of the operating parameters of the vehicle drive train, with an activated coasting operating state, which is deactivated prior to vehicle standstill, whereas a synchronization point of a positive-locking shifting element to be switched on is established by a targeted engine intervention.

FIG. 9 shows the progressions of the operating parameters of the vehicle drive train 1 in accordance with FIG. 7 and FIG. 8 during a progression of operating states of the vehicle drive train 1, to which, at a point in time T158, the seventh transmission ratio "7" is engaged in the area of the transmission 4 for forward travel, and the drive unit 2 is switched on. At the point in time T158, the rotational speed n_mot of the drive unit 2 is greater than the idle speed n_motLL of the drive unit 2, and a request to present the coasting operating state of the vehicle drive train 1 is issued, during which the drive unit 2 is switched on and the power flow between the drive unit 2 and the output 3 is interrupted in the area of the transmission 4. From a point in time T159, the frictional-locking shifting element E is transferred into its open operating state to the same extent as from a point in time T131, which in the present case features the frictional-locking shifting element E at the point in time T160. The engine rotational speed n_mot is lowered in the direction of the idle speed n_motLL, and also reaches this at the point in time T160. On the basis of the open frictional-locking shifting element E, the frictional connection between the drive unit 2 and the output 3 is separated in the area of the transmission 4, which is why the turbine rotational speed n_t is also lowered in the direction of the idle speed n_mot.

With an increasing operating time t, the higher-level driving strategy detects that, at a point in time T161, the vehicle drive train 1 is present in an operating state in which, upon a request to deactivate the coasting operating state in the area of the transmission 4, the sixth transmission ratio "6" or the fifth transmission ratio "5" is to be engaged for forward travel. For this reason, at the point in time T161, the actuating pressure p_D of the frictional-locking shifting element D is lowered stepwise by the closing pressure level to an intermediate pressure level, and subsequently reduced steadily along a pressure ramp up to a point in time T162 and lowered to zero at the point in time T162. Simultaneously, at the point in time T161, the actuating pressure p_C or p_B, as the case may be, of the frictional-locking shifting element C or B, as the case may be, is raised to the rapid filling pressure level, and, at a subsequent point in time T163, is lowered to the level of the filling equalization pressure, at which the actuating pressure p_C or p_B, as the case may be, is left at such level up to a point in time T164.

The point in time T164 constitutes the end of the filling equalization phase of the frictional-locking shifting element C or B, as the case may be. From the point in time T164, the actuating pressure p_C or p_B, as the case may be, of the frictional-locking shifting element C or B, as the case may be, is in turn raised, for example in the present case, over three consecutive pressure ramps up to the point in time T162 to a pressure level at which the frictional-locking shifting element C or B, as the case may be, is present in a slip-free operating state. At the point in time T162, the actuating pressure p_C or p_B, as the case may be, is raised to the closing pressure level, by which the frictional-locking shifting element C or B, in addition to the positive-locking shifting element A, is present in the closed operating state. Starting from the point in time T162, on the software side, a switch from the operating state of the transmission 4 prepared for the switching on of the fifth transmission ratio "5" for forward travel takes place in the transmission 4 in the direction of the operating state of the transmission 4 prepared for the switching on of the fourth transmission ratio "4," without a change to the clutch logic being carried out for this.

At the point in time T165, it is detected by the higher-level driving strategy that, upon an exit from the coasting mode of the vehicle drive train 1 in the area of the transmission 4, the second transmission ratio "2" is to be engaged for forward travel, which is why, at the point in time T165, the actuating pressure p_B of the frictional-locking shifting element B is lowered to an intermediate pressure level, at which the frictional-locking shifting element B is transferred into a slip mode. Simultaneously, the actuating pressure p_C of the frictional-locking shifting element C is raised to the level of the rapid filling pressure and is left at such level up to a point in time T166. Starting from the point in time T165, up to the point in time T167, the actuating pressure p_B of the frictional-locking shifting element B is steadily reduced along a pressure ramp. After the completion of the filling equalization phase, which in the present case ends at the point in time T168, the actuating pressure p_C is, during two subsequent pressure ramps up to the point in time T167, raised to a pressure level at which the frictional-locking shifting element C is present in a slip-free operating state. For this reason, the actuating pressure p_C is raised to the closing pressure level at the point in time T167, while the actuating pressure p_B is lowered to zero at the point in time T167.

At a point in time T169, the higher-level driving strategy determines an operating state of the vehicle drive train at which, upon a deactivation of the coasting operating state, the first transmission ratio "1" is to be engaged in the transmission 4 for forward travel. Therefore, at the point in time T169, the frictional-locking shifting element p_C is switched off to the same extent as the frictional-locking shifting element B was previously switched off between the points in time T165 and T170, and, over a rapid filling phase and a subsequent filling equalization phase and over a pressure ramp, the frictional-locking shifting element D is transferred, between the points in time T169 and T170, into its slip-free operating state and, at the point in time T170, into its fully closed operating state.

Thus, at the point in time T170, both the shifting element A and the shifting element D are closed in the transmission 4. At a point in time T171 following the point in time T170, a request to deactivate the coasting operating state and to couple the drive unit 2 is issued. From the point in time T171, the drive unit 2 in turn is in rotational speed control mode, and the engine rotational speed n_mot is once again accordingly raised by the EGS specification of the engine target rotational speed, until, at the point in time T172, the engine rotational speed n_mot is equal to the progression of the product n_ab*i_zielgang_sas. In this operating state, the additional positive-locking shifting element F is present in its synchronous operating state, which is why the actuating pressure p_F of the additional positive-locking shifting element F is raised to the level presented in FIG. 5, and the additional positive-locking shifting element F is transferred into its closed operating state to the requested level, by which the first transmission ratio "1" is engaged in the transmission 4 for forward travel. In the present case, the rotational speed control mode of the drive unit 2 is terminated at the point in time T173, by which the coasting operating state of the vehicle drive train is 1 deactivated, and sequential gearshifts can be carried out in the transmission 4 with the assistance of conventional shifting processes, as a function of the operating state.

The point in time of switching on of the additional positive-locking shifting element F to be switched on is calculated as a function of a so-called "shifting time allowance calculation," from the gradients of the rotational speed n_mot of the drive unit 2, whereas the switching on of the positive-locking shifting element F is started at a point in time at which the engine rotational speed n_mot is greater than or equal to the progression of the product n_ab*i_zielgang_sas, and the differential rotational speed in the area of the open additional positive-locking shifting element F is smaller than a threshold value. With the progression of operating states described in FIG. 9, the claw shifting element F can be transferred into its synchronous operating state in a simple manner by varying the engine rotational speed n_mot.

If, during the process described in FIG. 8 for switching on the additional positive-locking shifting element F, the output rotational speed changes with such a gradient that the synchronization point of the additional positive-locking shifting element F, with the current operating state of the transmission 4, cannot be reached or adjusted to the required extent, it is provided that the clutch logic changes at an early stage and, in addition to the positive-locking shifting element A, instead of the shifting element B, the frictional-locking shifting element C or the frictional-locking shifting element D are to be preliminarily engaged in the transmission 4, in order to, with a drive unit 2 simultaneously operated at the idle speed level, reach a claw differential speed of at least approximately zero in the area of the additional positive-locking shifting element F to be switched on.

With the process described in FIG. 8, while waiting for the operating state of the vehicle drive train at which the turbine synchronous rotational speed of the target synchronization gear matches the engine idle speed, through an adjustment to the synchronization gear and an accompanying selection of a suitable rotational speed window, within which the positive-locking shifting element F is present in its synchronous operating state, the rolling of the vehicle and an occurrence of a brief effect on the output 3 of such rotational speed window being missed is avoided.

Figure 10:
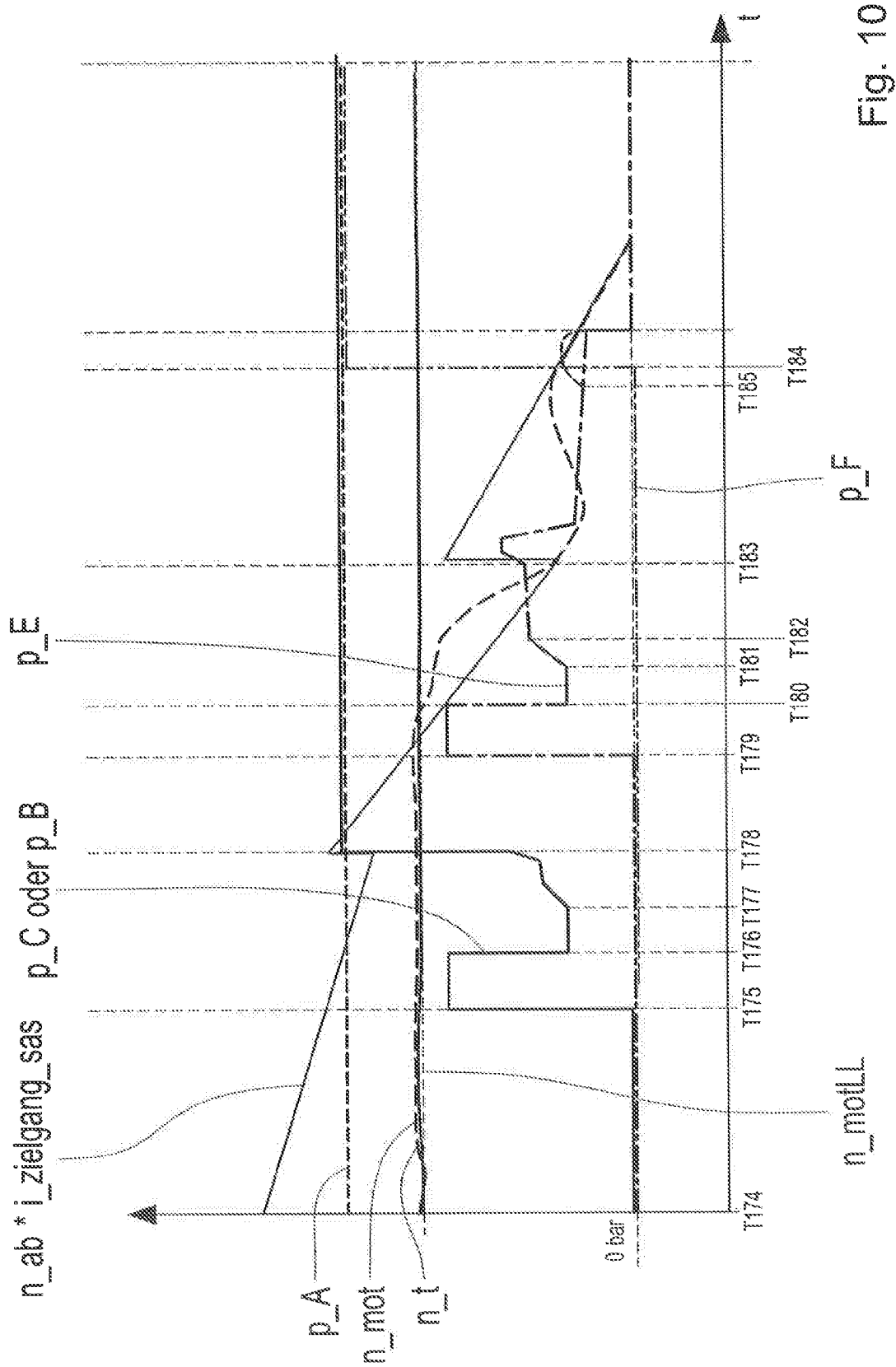
FIG. 10 the progressions of the operating parameters of the vehicle drive train, with an activated coasting operating state, which is deactivated through the sharp deceleration of a vehicle designed with the vehicle drive train.
Figure 11:
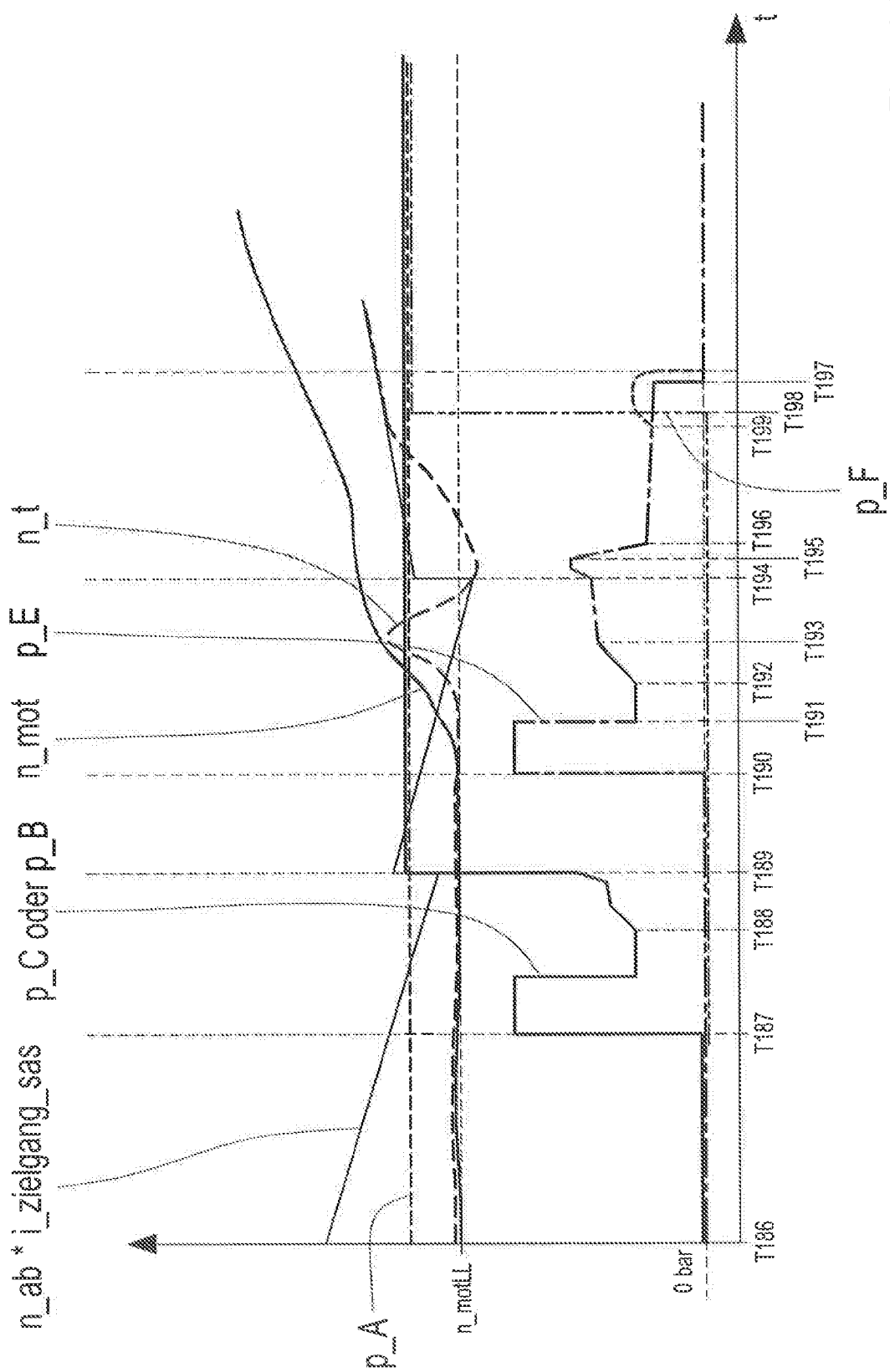
FIG. 11 the progressions of the operating parameters of the vehicle drive train, with an activated coasting operating state, which is deactivated on the basis of a performance request on the driver's side.

If, however, based on the present progression of the rotational speed n_ab of the output 3 and/or the progression of the engine rotational speed n_mot of the drive unit 2, the synchronization point of the positive-locking shifting element cannot be reached to the extent described in FIG. 8 and FIG. 9, or the synchronization point of the additional positive-locking shifting element F to be switched on can be reached only after the expiration of undesired long operating times by one of the two procedures in accordance with FIG. 8 or FIG. 9, the procedures described in more detail below with reference to the views in FIG. 10 and FIG. 11 are carried out.

At a point in time T174, the coasting operating state of the vehicle drive train 1 is activated, and only the positive-locking shifting element A is closed. The engine rotational speed n_mot matches the idle speed n_motLL. On the basis of the frictional connection between the drive unit 2 and the output 3 interrupted in the area of the transmission 4, the turbine rotational speed n_t is equal to the engine rotational speed n_mot. The progression of the product n_ab*i_zielgang_sas is above the idle speed n_motLL, and is lowered with defined gradients. At the point in time T175, the higher-level driving strategy detects that, upon a termination of coasting, the sixth transmission ratio "6" or the fifth transmission ratio "5" is to be engaged in the transmission 4 for forward travel.

For this reason, at the point in time T175, the actuating pressure p_C or p_B, as the case may be, of the frictional-locking shifting element C or B, as the case may be, is adjusted over a rapid filling phase continuing up to a point in time T176 and a filling equalization phase that is subsequent to it and ends at the point in time T177, for the switching on of the shifting element C or B. From the point in time T177, the actuating pressure p_C or p_B, as the case may be, is raised over three consecutive pressure ramps, up to the point in time T178, to the pressure level at which the frictional-locking shifting element C or B, as the case may be, is present in a slip-free operating state. Subsequently, at the point in time T178, the actuating pressure p_C or p_B, as the case may be, is guided into its closing pressure level, and the frictional-locking shifting element C or B, as the case may be, is present in the fully closed operating state. From the point in time T178, the output rotational speed n_ab, and thus the progression of the product n_ab*i_zielgang_sas, are lowered on the basis of a strong deceleration of the vehicle, which results, for example from an actuation on the driver's side of the service brake, with large gradients.

As a function of the currently selected clutch logic, by the formulaic relationship set forth above, the differential rotational speed of the positive-locking shifting element F to be switched on is determined, and it is thereby calculated that neither with the procedure described in FIG. 8, nor with the procedure described in FIG. 9, is the additional positive-locking shifting element F to be transferred into its closed operating state. For this reason, at the point in time T179, the actuating pressure p_E of the positive-locking shifting element E is raised to the level of the rapid filling pressure and, at the point in time T180, is lowered to the filling equalization pressure level. In the present case, for example, the filling equalization phase of the frictional-locking shifting element E ends at the point in time T181. Subsequent to this, the actuating pressure p_E is raised during a first pressure ramp with large gradients to an intermediate pressure level, and is further raised during an additional pressure ramp subsequent to this from the point in time T182, the gradient of which is smaller than the gradient of the first pressure ramp ending at the point in time T182.

At the point in time T183, the frictional-locking shifting element E features a transfer capacity, for which, on the basis of the positive-locking shifting element A already present in the closed operating state and the frictional-locking shifting element C or B in the transmission 4 that is also switched on, the sixth transmission ratio "6" or the fifth transmission ratio "5" is engaged, at least partially, for forward travel. Starting from this operating state of the vehicle drive train 1, at which the turbine rotational speed n_t, at least briefly, corresponds to the progression of the product n_ab*i_zielgang_sas, through the corresponding adjustment of the actuating pressure p_E of the frictional-locking shifting element E, the transfer capacity is varied in such a manner that the progression of the turbine rotational speed n_t and the progression of the product n_ab*i_zielgang_sas correspond to each other, at least approximately, over a long operating time, and the additional positive-locking shifting element F to be switched on features its synchronous operating state at the point in time T184. For this reason, the actuating pressure p_F of the additional positive-locking shifting element F is raised at the point in time T184, and a downshift is carried out in the transmission 4, starting from the sixth transmission ratio "6" or starting from the fifth transmission ratio "5" for forward travel in the direction of the third transmission ratio "3" or in the direction of the second transmission "2," by which the additional positive-locking shifting element F is transferred into the requested closed operating state.

In order to switch on the additional positive-locking shifting element F to the extent required for a high degree of driving comfort, the option exists of, from a point in time T185, slightly raising the actuating pressure p_E of the frictional-locking shifting element E to the extent shown in FIG. 6 according to the dotted line, and increasing the transfer capacity of the frictional-locking shifting element E. With this measure, the gradient of the turbine rotational speed n_t is reduced, and the differential rotational speed of the positive-locking shifting element F is maintained, over a long period of time, within a differential rotational speed window required for the switching on of the additional positive-locking shifting element F.

The synchronization point of the additional positive-locking shifting element F to be switched on is, if applicable, not reached to the level described in FIG. 8 and FIG. 9 on the basis of a load request on the driver's side. In order to, nevertheless, transfer the positive-locking shifting element F, to the requested extent, into its switched-on operating state with a high degree of spontaneity, the procedure described below in FIG. 11 is carried out upon a corresponding load request on the driver's side.

At the point in time T186, the coasting operating state of the vehicle drive train 1 is in turn activated, and only the positive-locking shifting element A is present in the closed operating state. The turbine rotational speed n_t and the engine rotational speed n_mot correspond to each other on the basis of the frictional connection between the drive unit 2 and the output 3 that is interrupted in the area of the transmission 4. The engine rotational speed n_mot is equal to the idle speed n_motLL, while the output rotational speed n_ab features a level that the product of the output rotational speed n_ab and the transmission ratio i_zielgang_sas is greater than the engine idle speed n_motLL.

In turn, at the point in time T187, as a function of the current progression of operating states of the vehicle drive train 1, the higher-level driving strategy determines that, upon a request to deactivate the coasting operating state in the transmission 4, the sixth transmission ratio "6" or the fifth transmission ratio "5" or the third transmission ratio "3," as the case may be, is to be engaged in the transmission 4 for forward travel. This leads to the fact that the actuating pressure p_C or p_B, as the case may be, of the frictional-locking shifting element C or B, as the case may be, is adjusted during a rapid filling and a subsequent filling equalization phase, which in the present case ends at the point in time T188, for the switching on of the frictional-locking shifting element C or B, as the case may be. From the point in time T188, the actuating pressure p_C or p_B, as the case may be, is raised during three consecutive pressure ramps, up to the point in time T189, to a pressure level at which the frictional-locking shifting element C or B, as the case may be, is present in a slip-free operating state.

At the point in time T189, the actuating pressure p_C or p_B, as the case may be, is raised to the closing pressure level, and the frictional-locking shifting element C or B, as the case may be, in addition to the shifting element A, is transferred into its closed operating state. At a point in time T190 following the point in time T189, a load request on the driver's side takes place, which causes an increase in the engine rotational speed n_mot starting from the idle speed n_motLL. As a function of the gradients of the engine rotational speed n_mot, it is determined that a switching on of the additional positive-locking shifting element F cannot be carried out without further measures, since the progression of the engine rotational speed n_mot intersects the progression of the product n_ab*i_zielgang_sas under large angles, and an actuation of the additional positive-locking shifting element F in the closing direction does not have the consequence of the desired switching on of the positive-locking shifting element F.

For this reason, at the point in time T190, the actuating pressure p_E of the frictional-locking shifting element E is raised to the level of the rapid filling pressure and, at the point in time T191, is lowered to the filling equalization level. At the point in time T192, the filling equalization phase is completed and, up to a first pressure ramp ending at the point in time T193 and over a second pressure ramp extending up to a point in time T194, the gradient of which is less than the gradient of the first pressure ramp ending at the point in time T193, the actuating pressure p_E is raised to a pressure level at which the frictional-locking shifting element E features a transfer capacity that the sixth transmission ratio "6" or the fifth transmission ratio "5" is at least partially engaged in the transmission 4. Subsequent to this, the actuating pressure p_E of the frictional-locking shifting element E is reduced from a point in time T195 along a steep pressure ramp, which ends at the point in time T196. From the point in time T196, the actuating pressure p_E is slightly reduced along an additional pressure ramp with shallow gradients, up to a point in time T197. This actuation of the frictional-locking shifting element E in turn causes the fact that, up to a point in time T198 prior to the point in time T197, the turbine rotational speed n_t is adjusted to the progression of the product n_ab*i_zielgang_sas, and that the additional positive-locking shifting element F to be switched on is present in its synchronization point and can be transferred into its closed operating state by raising the actuating pressure p_F.

In order to, in turn, comfortably switch on the additional positive-locking shifting element F, it is possible to, from a point in time T199, temporarily and slightly raise the actuating pressure p_F to the extent described in FIG. 10, in order to adjust or flatten the gradients of the progression of the turbine rotational speed n_t to an extent favorable for the switching-on process of the additional positive-locking shifting element F.

Figure 12:
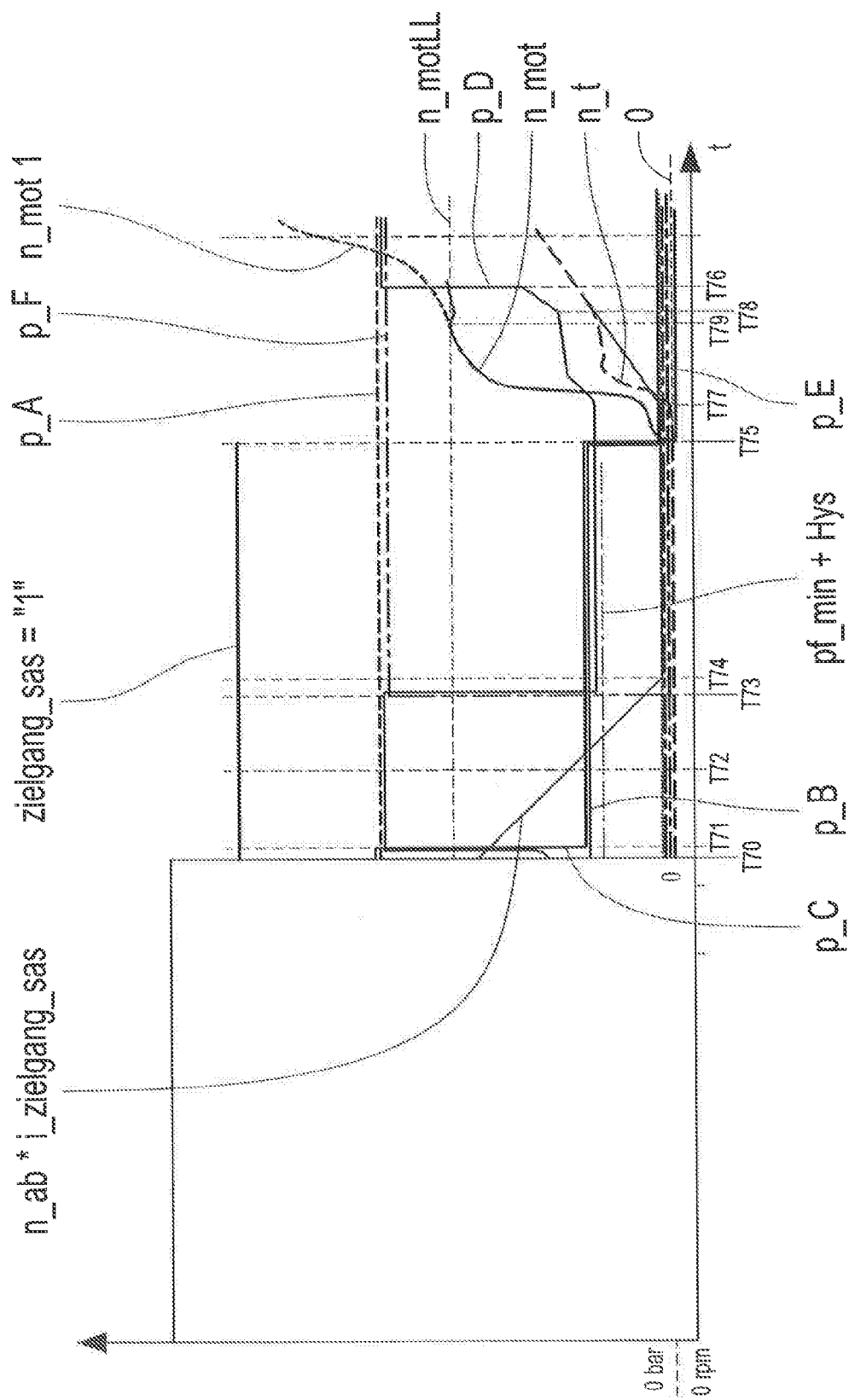
FIG. 12 several progressions of various operating parameters of the vehicle drive train in accordance with FIG. 1 over time t, which are adjusted during the carrying out of a variant of the method in accordance with exemplary aspects of the invention over time t.

FIG. 12 shows several progressions of different operating variables of the vehicle drive train 1 over time t. At a point in time T70 more specifically characterized in FIG. 12, the vehicle drive train is in a coasting operating state, at which the rotational speed n_mot of the drive unit 2 is equal to zero and the power flow between the drive unit 2 and the output 3 is interrupted in the area of the transmission 4. The progression of the product of the rotational speed n_ab of the output 3 and the transmission ratio i_zielgang_sas, which corresponds to a transmission ratio determined as a function of the current operating state by a higher-level driving strategy and is to be engaged in the transmission 4 upon a coasting exit, or the same of the transmission ratio engaged in the power flow, established in the area of the transmission 4, between the drive unit 2 and the output 3 currently in the area of the transmission 4, is greater than 0 and less than the idle speed n_motLL of the drive unit 2. Thereby, the progression of the product n_ab*i_zielgang_sas drops with steep gradients in the direction of 0 over operating time t, to the extent more specifically shown in FIG. 12.

In the transmission 4, at the point in time T70, the positive-locking shifting element A is initially closed, whereas the positive-locking shifting element A is, for this purpose, actuated in the closing direction with an actuating pressure p_A featuring the closing pressure level. In addition, at the point in time T70 the frictional-locking shifting element C is present in the closed operating state, and, for this purpose, is also actuated in the closing direction with an actuating pressure p_C featuring the closing pressure level. The additional frictional-locking shifting element E is fully opened, since the actuating pressure p_E that can be applied at the frictional-locking shifting element E is equal to zero. In addition, the frictional-locking shifting element B is subjected to an actuating pressure p_B, which features a pressure level that is above the pressure value pf_min+Hys plus an offset value depending on a hysteresis by one offset value, which presents an actuation threshold above which the frictional-locking shifting elements B, C, and D feature, with an activated coasting operating state, a slip-free operating state. The additional frictional-locking shifting element F is also subjected to an actuating pressure p_F, which is why the additional frictional-locking shifting element F is also open.

On the basis of the switched-off drive unit 2 and the power flow interrupted in the area of the transmission 4, the turbine rotational speed n_t equal to zero. This operating state of the transmission 4 arises from the fact that, in addition to the frictional-locking shifting elements B and C, the frictional-locking shifting element D is subjected to an actuating pressure p_D, which is above the pressure value pf_min+Hys.

At a point in time T71, a pressure ramp of the actuating pressure p_D of the frictional-locking shifting element D ends, and the frictional-locking shifting element D is present in a slip-free operating state. In order to, at the point in time T71, transfer the transmission 4 into an operating state in which, in addition to the positive-locking shifting element A, the frictional-locking shifting element D is fully closed, the actuating pressure p_D is raised stepwise, starting from the intermediate pressure level at the point in time T71, to the closing pressure level. Essentially simultaneously, the actuating pressure p_C of the frictional-locking shifting element C is lowered from the closing pressure level to a pressure level that is above the pressure value pf_min+Hys by one offset value, at which the frictional-locking shifting element C, as before, features a slip-free operating state. With an increasing operating time t, the higher-level driving strategy detects that the output rotational speed n_ab is lowered in the direction of zero and the vehicle is transferred into a standstill.

In order to start the vehicle designed with the vehicle drive train 1, upon a corresponding request on the driver's side, from the vehicle standstill with the desired high degree of spontaneity, a request to activate an engine start-stop function is issued at a point in time T72, by which, simultaneously, the coasting mode function of the vehicle drive train 1 is deactivated, and a request zielgang_sas="1" is issued, which is to prepare the transmission 4 for the switching on of the first transmission ratio "1" for forward travel. The activation of the engine start-stop function causes the fact that, as a function of the gradients of the progression of the product n_ab*i_zielgang_sas, a synchronization point of the additional positive-locking shifting element F is determined, which, on the basis of the activated engine start-stop function, in addition to the positive-locking shifting element A, is to be transferred into its closed operating state.

In the present case, it is determined that the additional positive-locking shifting element F reaches its synchronization point required for switching on at the point in time T73, which is why, at the point in time T73, the actuating pressure p_F of the frictional-locking shifting element F is raised stepwise to the closing pressure level. The actuating pressure p_D of the frictional-locking shifting element D is lowered at the point in time T73 to a pressure level, which is above the pressure value pf_min+Hys by one offset value. At a point in time T74, the progression of the product n_ab*i_zielgang_sas is equal to zero and the vehicle is at a standstill. Simultaneously, at the point in time T74, the closed operating state of the frictional-locking shifting element F is detected. Up to a point in time T75, upon an activated engine start-stop function, the vehicle is at vehicle standstill, and the drive unit 2 is in the switched-off operating state. For this reason, the shifting elements A through F are actuated with or subjected to the pressure level of the actuating pressures p_A through p_F present at the point in time T74. At the point in time T75, a request to switch on the drive unit 2 and to couple the drive unit 2 to the output 3 is issued. For this reason, the engine rotational speed n_mot increases in the direction of the idle speed n_motLL to the extent shown.

As a function of the transmission ratio "1", "2" or "3" to be engaged in the transmission 4 for forward travel, either the actuating pressure p_D, p_C or p_B of the frictional-locking shifting element D, C or B, to the extent shown in FIG. 3, from the point in time T75 up to a point in time T76, is initially raised to an intermediate pressure level, at which the frictional-locking shifting element D, C or B is present in the closed operating state. Upon reaching the intermediate pressure level at the point in time T76, the actuating pressure p_D, p_C or p_B is raised stepwise to the closing pressure level, by which, in addition to the two positive-locking shifting elements A and F, the frictional-locking shifting element D, C or B is also switched on in the transmission 4, and transmission ratio "1", "2" or "3" is engaged in the transmission.

In order not to impair the starting process of the drive unit 2, at the point in time T75, as a function of transmission ratio "1", "2" or "3" to be engaged in the transmission 4, the actuating pressures p_B and p_C, p_B and p_D or p_C and p_D are lowered from the pressure level above the pressure value pf_min+Hys to zero, by which the partial blocking state of the gear set 5 of the transmission 4, in which the transmission input shaft 6 is rotatably held, is canceled. With a progressively increasing engine rotational speed n_mot, from the point in time T75 the turbine rotational speed n_t also increases over the operating time t. In addition, the progression of the product n_ab*i_zielgang_sas increases from a point in time T77, whereas the turbine rotational speed n_t is above the progression of the product n_ab*i_zielgang_sas. The deviation between the turbine rotational speed n_t and the progression of the product n_ab*i_zielgang_sas results from a slip modulation in the area of the frictional-locking shifting element D, C or B to be switched on, through which an improvement to the drive train comfort during the engine start of the drive unit 2 is achieved. At a point in time T78, the turbine rotational speed n_t is equal to the progression of the product n_ab*i_zielgang_sas, since the frictional-locking shifting element D, C or B to be switched on has already reached its slip-free operating state.

As a function of the present request on the driver's side, from a point in time T79, the engine rotational speed n_mot remains at the level of the idle speed n_motLL or progressively increases, for example, according to the progression of the engine rotational speed n_mot1 shown with dashes.

Figure 13:
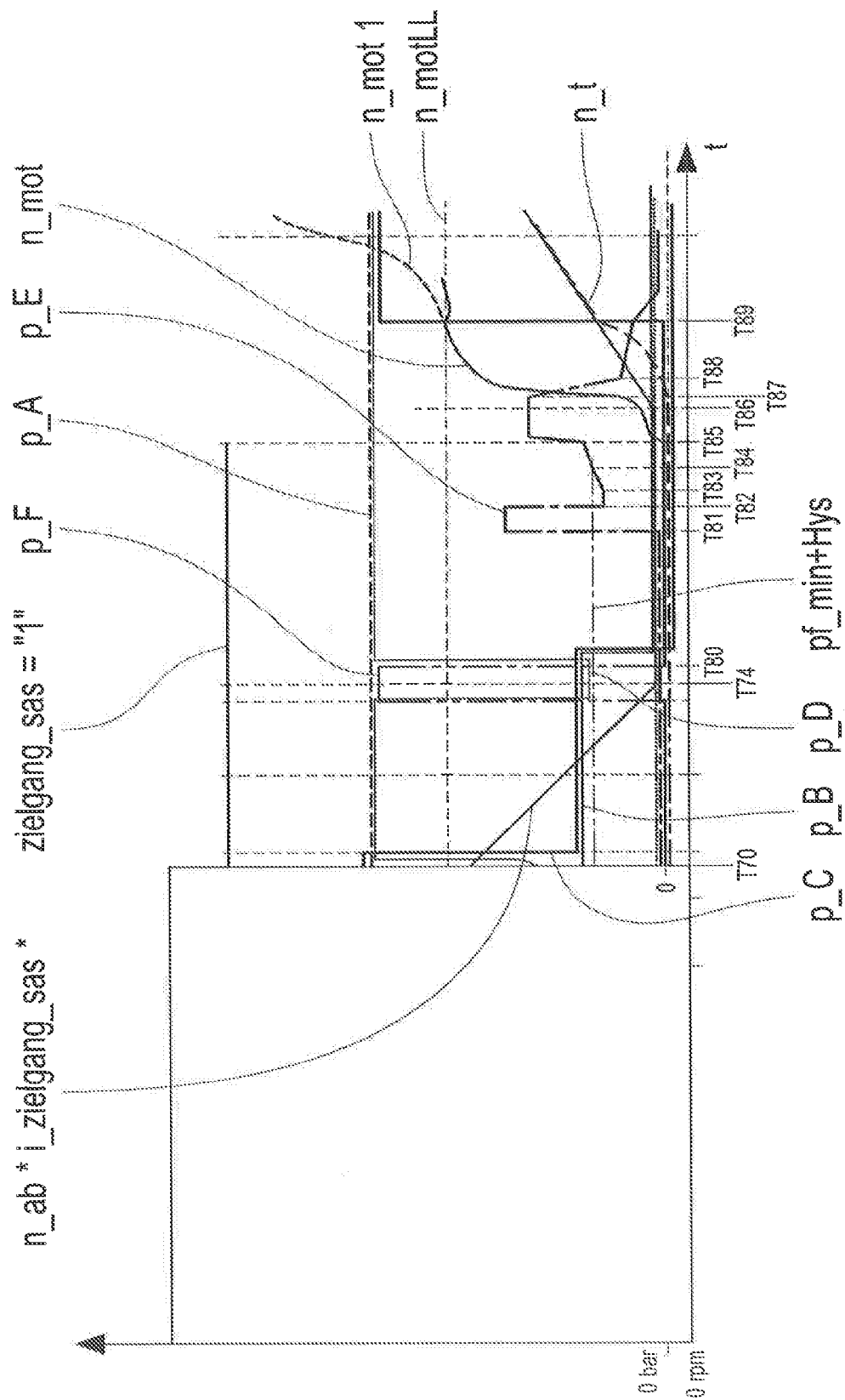
FIG. 13 several progressions of various operating parameters of the vehicle drive train in accordance with FIG. 1, which are adjusted during the carrying out of an additional variant of the method in accordance with exemplary aspects of the invention over time t.

FIG. 13 shows the progressions of the operating parameters of the vehicle drive train 1 shown in FIG. 12, starting from the point in time T70 during a progression of operating states of the vehicle drive train 1, during which, at the point in time T74, it is determined that the positive-locking shifting element F is not transferred into its closed operating state to the desired extent by raising the actuating pressure p_F. For this reason, at a further point in time T80 following the point in time T74, the actuating pressure p_F of the positive-locking shifting element F is again lowered to zero. Independent of this, from the point in time T74, the engine start-stop function is activated and the coasting mode function of the vehicle drive train 1 is deactivated.

As a function of the transmission ratio "1," "2" or "3" for forward travel to be engaged in the transmission 4 upon a restart of the drive unit 2, at the point in time T80, either the actuating pressure p_D, p_C or p_B of the frictional-locking shifting element D, C or B is raised from the pressure level above the pressure value pf_min+Hys to the closing pressure level, while the actuating pressures p_B and p_C, p_B and p_D or p_C and p_D of the frictional-locking shifting elements B and C or B and D or C and D are lowered to zero.

Since, from the point in time T74, the vehicle designed with the vehicle drive train 1 is at a standstill and the progression of the product n_ab*i_zielgang_sas is equal to zero, from the point in time T73, the synchronization point of the positive-locking shifting element F to be switched on to the extent shown in FIG. 12 can no longer be reached, and the positive-locking shifting element F cannot be transferred into its closed operating state to the desired extent.

In order to, upon a restart of the drive unit 2, engage the transmission ratio "1," "2" or "3" to be engaged in the transmission 4 with a high degree of spontaneity, already prior to a request for the switching on of the drive unit 2 and the coupling of the drive unit 2 to the output 3, the actuating pressure p_E of the frictional-locking shifting element E, at a point in time T81, is raised from the opening pressure level to the pressure level of the rapid filling pressure. At a point in time T82, the rapid filling phase of the frictional-locking shifting element E ends, which is why the actuating pressure p_E is lowered to the pressure level of the filling equalization pressure and, up to the end of the filling equalization pressure (in the present case, up to a point in time T83), is left constant at this pressure level. Subsequent to this, the actuating pressure p_E is further raised over a first pressure ramp continuing up to a point in time T84 to an intermediate pressure level, and in turn subsequent to this along a second pressure ramp, the gradient of which is less than the gradient of the first pressure ramp ending at the point in time T84. At a point in time T85, which simultaneously presents the end of the second pressure ramp, a request to switch on and couple the drive unit 2 is issued, which is why, from the point in time T85, the engine rotational speed n_mot increases to the extent shown in the direction of the idle speed n_motLL.

So that the positive-locking shifting element F to be switched on can be transferred into its closed operating state, from the point in time T85, the actuating pressure p_E is raised with steep gradients to an additional intermediate pressure level, by which the transfer capacity of the frictional-locking shifting element E increases. The increase in transfer capacity of the frictional-locking shifting element E causes the fact that, from a point in time T86, both the progression of the product n_ab*i_zielgang_sas and the turbine rotational speed n_t increase. From a point in time T87, the actuating pressure p_E of the frictional-locking shifting element E is reduced to the extent shown with steep gradients, in order to reduce a differential rotational speed is reduced in the area between shifting element halves of the frictional-locking shifting element F. Since the progression of the turbine rotational speed n_t increasingly approaches the progression of the product n_ab*i_zielgang_sas over the operating time t, from a point in time T88, the actuating pressure p_E of the frictional-locking shifting element E is further reduced along an additional pressure ramp, the gradient of which is smaller than the gradient of the pressure ramps provided between the points in time T87 and T88.

At a point in time T89, the turbine rotational speed n_t essentially corresponds to the progression of the product n_ab*i_zielgang_sas, and it is detected that the positive-locking shifting element F is in an operating state favorable for switching on. This leads to the fact that, at the point in time T89, the actuating pressure p_F is raised stepwise, to the shown extent, to the closing pressure level, while the actuating pressure p_E of the frictional-locking shifting element E is lowered in the direction of zero and the frictional-locking shifting element E is transferred into its fully open operating state.

On the basis of the actuation of the frictional-locking shifting element E described between the points in time T81 and T89, for synchronizing the positive-locking shifting element F to be switched on in the transmission 4 as a function of the operating state of the transmission 4 present at the point in time T74, either the fifth transmission ratio "5," the sixth transmission ratio "6" or the seventh transmission ratio "7" is at least partially engaged for synchronizing the positive-locking shifting element F, and subsequently a downshift in the transmission 4, starting from the seventh transmission ratio "7," the sixth transmission ratio "6" or the fifth transmission ratio "5" is carried out in the direction of the transmission ratio "1", "2" or "3" to be engaged in the transmission 4, while the positive-locking shifting element F, in addition to the additional positive-locking shifting element A and the frictional-locking shifting element D, C or B that is already switched on at the point in time T80, is switched on.

Figure 14:
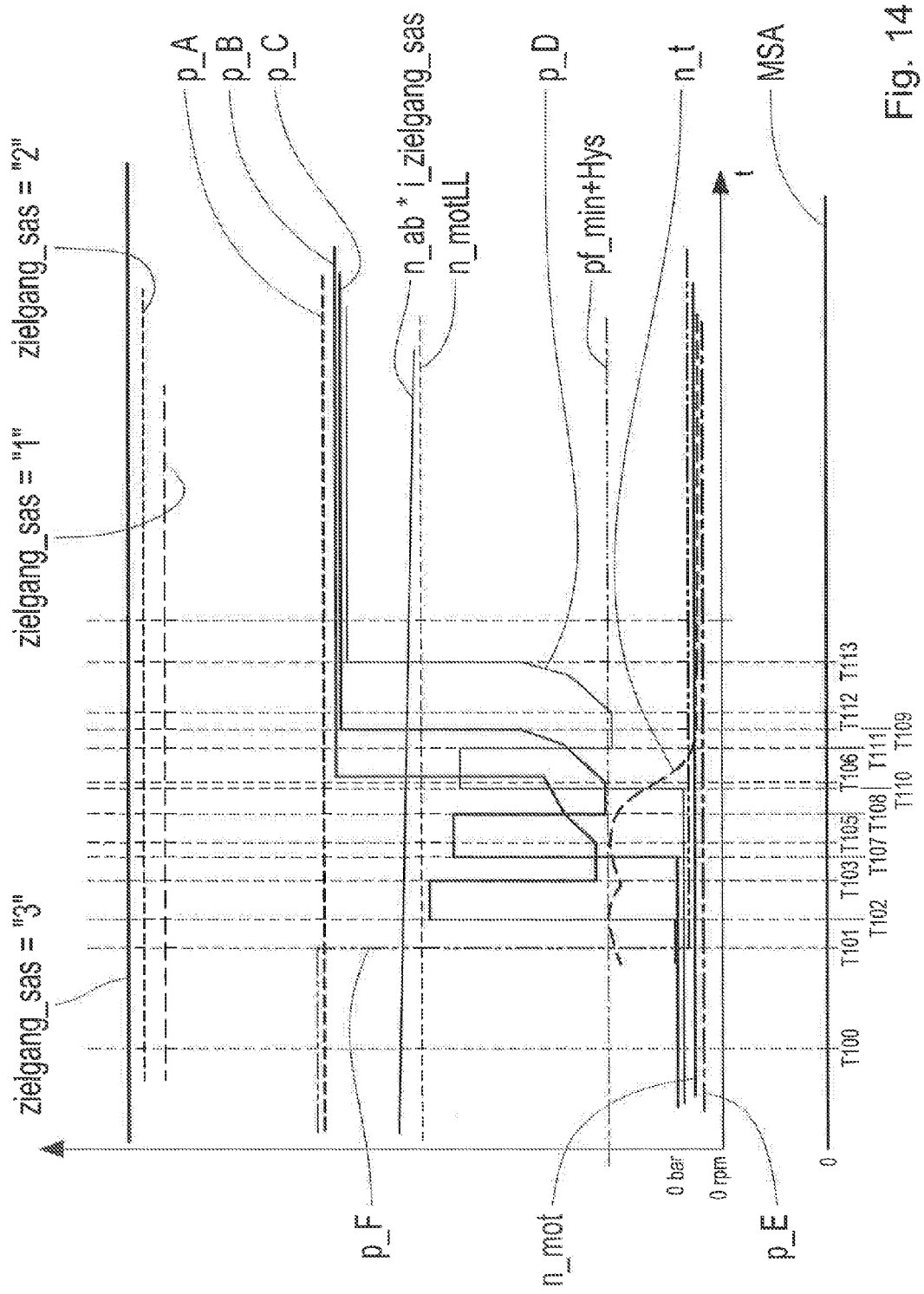
FIG. 14 several progressions of various operating parameters of the vehicle drive train of FIG. 1 over time t, which are adjusted during the carrying out of a variant of the method in accordance with exemplary aspects of the invention over time t.

FIG. 14 in turn shows several progressions of different operating variables of the vehicle drive train 1 over time t, whereas, at a point in time T100 characterized in more detail in FIG. 14, the vehicle drive train 1 is in an operating state at which the two positive-locking shifting elements A and F are closed in the transmission 4, while the additional frictional-locking shifting elements B, C, D and E are present in the open operating state, and the drive unit 2 is switched off. During the considered progression of operating states of the vehicle drive train 1, the progression MSF features the value of zero, since the engine stop release is activated.

This operating state of the vehicle drive train 1 is established on the basis of an activation of an engine start-stop function, through which the drive unit 2 is decoupled from the output 3 during vehicle standstill through opening the frictional-locking shifting elements B through E, and the two positive-locking shifting elements A and F are held in the closed operating state, in order to present one of the transmission ratios "1" through "4" for a start-up process to be presented of a vehicle designed with the vehicle drive train 1 with a high degree of spontaneity, since, through the switching on of the shifting element D, the shifting element C, the shifting element B or the shifting element E, one of such transmission ratios can be engaged in the transmission 4 within short operating times. On the basis of the fact that the output rotational speed n_ab of the output 3 is greater than zero, the progression, shown in FIG. 14, of the product n_ab*i_zielgang_sas is adjusted, whereas the variable i_zielgang_sas in turn corresponds to the transmission ratio to be engaged in the transmission 4 upon an exit from the engine start-stop function.

On the basis of drag torques internal to the transmission, the rotational speed n_t of the transmission input shaft 6 is greater than zero. At a point in time T101, it is detected in the area of a higher-level driving strategy that the clutch logic currently selected by the activated engine start-stop function, on the basis of the determined relationship between the turbine rotational speed n_t and the output rotational speed n_ab of the output 3, causes undesirable high drag torques in the area of the transmission. For this reason, a request to present a coasting mode function of the vehicle drive train 1 is issued, during which, as a function of the current operating state of the vehicle drive train 1, the positive-locking shifting element F is initially to be transferred into its open operating state.

For this purpose, at the point in time T101, an actuating pressure p_F of the positive-locking shifting element F is lowered stepwise by the closing pressure level to zero. At a point in time T102 shortly after this, with a simultaneous closed positive-locking shifting element A, the open operating state of the positive-locking shifting element F is detected, and, additionally upon an activated coasting mode function, an operating state of the vehicle drive train 1 is determined, at which, upon a deactivation of the coasting mode function, the third transmission ratio "3" is to be engaged in the transmission 4 for forward travel. Therefore, at the point in time T102, an actuating pressure p_B of the frictional-locking shifting element B is raised to a rapid pressure filling level, and is constantly left at such pressure level up to a point in time T103. At the point in time T103, the actuating pressure p_B of the frictional-locking shifting element B is lowered stepwise to the pressure level of the filling equalization pressure and, up to the end of the filling equalization phase, in the present case up to a point in time T105, is in turn left constant at such pressure level.

Subsequently, the actuating pressure p_B is raised over two consecutive pressure ramps, up to a point in time T106, to an intermediate pressure level, at which the frictional-locking shifting element B is in its slip-free operating state. Upon reaching this operating state of the frictional-locking shifting element B, the actuating pressure p_B of the frictional-locking shifting element B is raised to the closing pressure level, by which the frictional-locking shifting element B is fully closed.

In order to, at the point in time T101, transfer the positive-locking shifting element F into its open operating state to the desired extent, with one embodiment of the transmission 4, with which the positive-locking shifting element F is subjected to hydraulic pressure in order to open, the option exists of raising the system pressure of the transmission and of transferring an optionally installed electric auxiliary oil supply into a higher capacity point if the actuating pressure p_F to be applied at the positive-locking shifting element F to be opened and acting in the opening direction is dependent on the system pressure or the electric auxiliary oil supply designed as an electric auxiliary pump.

During the filling equalization phase of the frictional-locking shifting element B, at a point in time T107, which in the present case is between the points in time T103 and T105, the actuating pressure p_C of the frictional-locking shifting element C is raised to the rapid filling pressure level, and is left at such pressure level until the end of the rapid filling phase at the point in time T108. At the point in time T108, the actuating pressure p_C of the frictional-locking shifting element C is lowered to the filling equalization pressure level and left at such pressure level until the point in time T106, at which the frictional-locking shifting element B is transferred into its closed operating state. From the point in time T106, the actuating pressure p_C of the frictional-locking shifting element C is also transferred into its slip-free operating state over two consecutive pressure ramps, and through the raising of the actuating pressure p_C, is transferred into its fully closed operating state at the point in time T109.

In addition, during the filling equalization phase of the frictional-locking shifting element C, at a point in time T110 between the points in time T108 and T106, the actuating pressure p_D of the frictional-locking shifting element D is raised to the rapid filling pressure level, and the actuating pressure p_D of the frictional-locking shifting element D is lowered to the filling equalization pressure level at a point in time T111, which is between the points in time T106 and T109. The filling equalization phase of the frictional-locking shifting element D is terminated at a point in time T112 and, at the point in time T112, the actuating pressure p_D is raised over two pressure ramps, up to the point in time T113, to an intermediate pressure level, at which the frictional-locking shifting element D is also present in a slip-free operating state. Upon reaching this operating state, the actuating pressure p_D of the frictional-locking shifting element D is in turn raised to the closing pressure level, whereby, in addition to the shifting elements A, B and C, the frictional-locking shifting element D is also in its fully closed operating state. In the closed operating state of the frictional-locking shifting elements C, D and E, the gear set 5 of the transmission 4 features the partially blocked operating state, in which the transmission input shaft 6 is held in a torque-proof manner and the transmission output shaft 9 connected to the output 3 is rotatable. For this reason, the turbine rotational n_t speed, starting from the point in time T105, is continuously lowered in the direction of zero.

Since, at the point in time T113, the frictional-locking shifting element D is also transferred into its closed operating state, the coasting operating state of the vehicle drive train 1 requested at the point in time T101 is activated to the desired extent at the point in time T113.

In contrast to the filling sequence described above of the frictional-locking shifting elements B, C and D, starting from an operating state of the vehicle drive train 1 at the point in time T101, at which, upon an exit from the coasting mode function in the transmission 4 as a target gear of the request zielgang_sas according to the second transmission ratio "2" for forward travel for the establishment of the power flow between the drive unit 2 and the output 3, starting from the positive-locking shifting elements A and F present in the closed operating state, from the point in time T102, the frictional-locking shifting element C is initially transferred, to the extent corresponding to the actuation of the frictional-locking shifting element B, into its closed operating state, and, already during the filling equalization phase of the frictional-locking shifting element C, the frictional-locking shifting element D (instead of the frictional-locking shifting element C) is prepared for switching on to the described extent from the point in time T107. Subsequent to this, instead of the frictional-locking shifting element D, from the point in time T111 until the point in time T113, the frictional-locking shifting element B is finally transferred into its closed operating state.

In contrast to this, upon the presence of an operating state of the vehicle drive train 1 at the point in time T101, at which, upon a deactivation of the coasting operating state in the transmission 4, the first transmission ratio "1" is to be engaged for forward travel, initially the shifting element D, then the shifting element C and in turn, subsequently thereto, the shifting element B are each transferred into their closed operating states, in order to achieve the advantages described below upon an exit from the coasting operating state of the vehicle drive train 1 during the activation of the coasting mode function between the points in time T101 and T113.

In the event that, despite a corresponding actuation at the point in time T102, the positive-locking shifting element F is not present in its open operating state or, in the area of the transmission 4, such high drag torques are determined by the higher-level driving strategy that an opening, described in FIG. 3, of the positive-locking shifting element is prevented, the procedure more specifically illustrated in FIG. 4 below is carried out, in order to transfer the positive-locking shifting element F, to the desired extent, into its open operating state.

Figure 15:
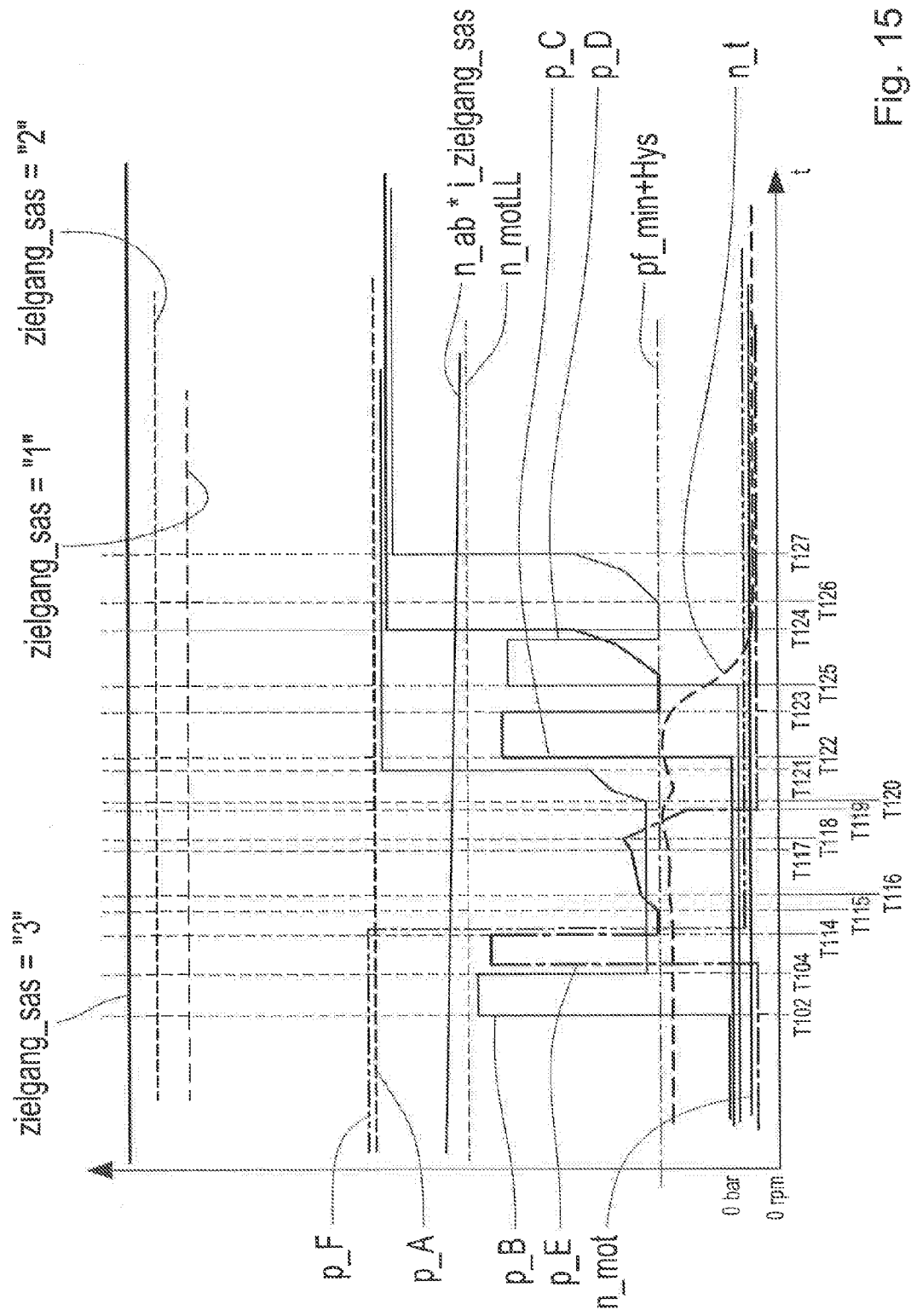
FIG. 15 several progressions of various operating parameters of the vehicle drive train in accordance with FIG. 1, which are adjusted during the carrying out of an additional variant of the method in accordance with exemplary aspects of the invention over time t.

At the point in time T102 of the vehicle drive train 1, the progressions, described in FIG. 15, of the operating parameters of the vehicle drive train 1 in accordance with FIG. 1 are based on a progression of operating states, with the exception of the fact that, in the area of the transmission 4, higher drag torques apply at positive-locking shifting element F than apply in the operating state of the vehicle drive train 1 at the point in time T102 in accordance with FIG. 14. For this reason, for the activation of the coasting operating state, from the point in time T102 in accordance with FIG. 15, the frictional-locking shifting element B is, up to a point in time 104, initially subjected to a rapid filing pulse through the corresponding raising of the actuating pressure p_B in the manner shown in FIG. 4, and, at the point in time 104, is lowered to the level of the filling equalization pressure. Furthermore, at the point in time T104, the frictional-locking shifting element E is, up to a point in time T114, subjected to a rapid filling pulse by raising its actuating pressure p_E and, during a filling equalization phase that is subsequent to this and continues up to a point in time T115, actuated with an actuating pressure p_E featuring a filling equalization pressure level, and is thus prepared for switching on. At the point in time T115, the frictional-locking shifting element E features an operating state, in which the transfer capacity of the frictional-locking shifting element E is essentially equal to zero, and a raising of the actuating force has the consequence of an immediate increase in the transfer capacity of the frictional-locking shifting element E.

In addition, the actuating pressure of the positive-locking shifting element F to be switched off is lowered to zero shortly after the point in time T114. From the point in time T115, the actuating pressure p_E is raised along a first pressure ramp ending at the point in time T116. Following this, the actuating pressure p_E of the frictional-locking shifting element E is further steadily raised over a subsequent additional pressure ramp, which, in the present case, ends at the point in time T117 and features a smaller gradient than the pressure ramp provided between the points in time T115 and T116. Subsequent to this, the actuating pressure p_E is raised, to a greater extent, along an additional pressure ramp, the gradient of which in turn is greater than the gradient of the pressure ramp between the points in time T116 and T117, until ultimately, at a point in time T118, the open operating state of the positive-locking shifting element is determined. The gradual raising of the transfer capacity of the frictional-locking shifting element E causes an unburdening of the frictional-locking shifting element F or a lowering of the torque applied to the frictional-locking shifting element F, which counteracts the desired opening of the frictional-locking shifting element F. At the point in time T118, through the raising of the transfer capacity of the frictional-locking shifting element E, the torque applied at the positive-locking shifting element F is reduced to such an extent that the positive-locking shifting element F is transferred into its open operating state.

Upon the detection of the open operating state of the frictional-locking shifting element F, the actuating pressure p_E of the frictional-locking shifting element E, from the point in time T118, is lowered, to the shown extent, along a pressure ramp with large gradients up to a point in time T119 to an intermediate pressure level, which is below the filling equalization pressure level, by which the frictional-locking shifting element E is present in the open operating state no later than the point in time T119. At the point in time T119, the actuating pressure p_E is once again lowered to zero, by which the frictional-locking shifting element E is transferred into its completely deactivated operating state.

Shortly thereafter, at a point in time T120, starting from the filling equalization pressure level, the actuating pressure p_B of the frictional-locking shifting element B is raised, to the extent more specifically described in FIG. 14, along the two pressure ramps to the intermediate pressure level, at which the frictional-locking shifting element B is present in a slip-free operating state. In order to completely switch on the frictional-locking shifting element B, at the point in time T121, the actuating pressure p_B is raised stepwise to the closing pressure level, by which the frictional-locking shifting element B is completely engaged. In the switched-on operating state of the frictional-locking shifting element B, the frictional-locking shifting element C, starting from a point in time T122, is initially subjected to a rapid filling pulse and prepared for switching on during a filling equalization phase that is in turn subsequent to this and continues up to a point in time T123. At the point in time T124, the frictional-locking shifting element C features its slip-free operating state, which is why, to the extent described above, the actuating pressure is raised back to the closing pressure level at the point in time T124.

Prior to the end of the filling equalization phase of the frictional-locking shifting element C, starting from a point in time T125, the frictional-locking shifting element D is also subjected to a rapid filling pulse and prepared for switching on during a filling equalization phase that is subsequent to this and continues up to a point in time T126. At the point in time T127, the frictional-locking shifting element D also features its slip-free operating state, which is why the actuating pressure p_D of the frictional-locking shifting element D is raised to the closing pressure level at the point in time T127, by which the vehicle drive train 1 is present in its requested coasting operating state at the point in time T127.

If, at the point in time T102, it is detected by the higher-level driving strategy that, upon a termination of the activation of the coasting operating state, instead of the third transmission ratio "3," the second transmission ratio "2" is to be engaged for forward travel, instead of the actuating pressure p_B of the frictional-locking shifting element B, at the point in time T102, the actuating pressure p_C of the frictional-locking shifting element C is adjusted in the manner described in FIG. 4. After the completion of the rapid filling phase of the frictional-locking shifting element C, the actuating pressure p_E of the frictional-locking shifting element E is accordingly adjusted for the unburdening of the positive-locking shifting element F. Furthermore, at the point in time T122, the actuating pressure p_D of the frictional-locking shifting element D is adjusted to the extent described above, and subsequently, at the point in time T125, the actuating pressure p_B of the frictional-locking shifting element B is adjusted to the extent described above, in order to transfer the shifting elements C and D, respectively, into their fully closed operating states at the points in time T124 and T127.

If, in contrast to this, at the point in time T102, an operating state of the vehicle drive train 1 is determined, starting from which, upon a termination of the activation of the coasting mode function in the transmission 4, the first transmission ratio "1" to be engaged for forward travel, from the point in time T102, the frictional-locking shifting element D is actuated, to the extent described above in FIG. 4, instead of the frictional-locking shifting element B or the frictional-locking shifting element C, before the frictional-locking shifting element E is guided into the power flow of the transmission 4 for the unburdening of the positive-locking shifting element F. Subsequent to this, the frictional-locking shifting element C is in turn guided in the direction of its fully closed operating state and, during the switching-on process of the frictional-locking shifting element C, from the point in time T125, the frictional-locking shifting element B is also guided in the direction of its fully closed operating state, in order to ultimately activate the coasting operating state of the vehicle drive train 1 to the desired extent at the point in time T127.

In addition, the procedures described in more detail below can be retrieved by the higher-level driving strategy, in order to operate or actuate the vehicle drive train 1, and in particular the transmission 4, upon the presence of a request to activate the coasting operating state of the vehicle drive train 1 during the activation process in such a manner that a coasting exit triggered by current changes to the operating state of the vehicle drive train 1 can be realized with a high degree of spontaneity and simultaneously with a high degree of driving comfort.

If, prior to the point in time T101, there is a corresponding request to deactivate the coasting mode function during a progression of operating states of the vehicle drive train 1 in accordance with FIG. 3, the two positive-locking shifting elements F and A are left in the switched-on operating state and, as a function of the transmission ratio to be engaged in the area of the transmission 4, the frictional-locking shifting element to be switched on is switched on within short operating times, with the desired high degree of spontaneity and simultaneously with a high degree of driving comfort.

In contrast to this, the shifting elements B, C or D along with the frictional-locking shifting element E, which were already actuated prior to the point in time T114 to the extent described in FIG. 15, are once again emptied and the positive-locking shifting elements F and A are left in the switched-on operating state, if, prior to the point in time T114, a request to deactivate the coasting mode function is issued, and, subsequently, the respective frictional-locking shifting element to be switched on for the presentation of the requested operating state of the vehicle drive train 1 is engaged, or, with an activated engine start-stop function, the frictional-locking shifting element is held in the open operating state.

If the request to deactivate the coasting mode function is issued at a point in time at which the positive-locking shifting element F is already actuated in the opening direction and, based on its actuation, has been transferred into its open operating state, one of the transmission ratios "5," "6" or "7" is initially engaged in the transmission 4 for forward travel, for the presentation of which the additional positive-locking shifting element F is to be held in the open operating state or is to be transferred into it.

If, during the activation of the coasting operating state of the vehicle drive train 1, on the basis of the current operating state of the vehicle drive train 1, the transmission 4 is actuated in such a manner that, upon a coasting exit, the third transmission ratio "3" for forward travel can be engaged in the transmission 4 with a high degree of spontaneity, solely by the switching on of the positive-locking shifting element F, upon the presence of a request to deactivate the coasting mode function, the fifth transmission ratio "5" is initially engaged in the transmission 4, and, subsequently, the positive-locking shifting element F is transferred into its closed operating state during a downshift in the direction of the third transmission ratio "3" in accordance with a conventional shifting process. Simultaneously, the frictional-locking shifting element E is switched off during the downshift from the fifth transmission ratio "5" in the direction of the third transmission ratio "3." As a function of the requested operating state, the frictional-locking shifting element B is held in the closed operating state or is transferred into its open operating state. The latter is the case, for example, if the engine start-stop function is activated and a decoupled operating state of the switched-off drive unit 2 is requested.

Thus, during vehicle standstill, the frictional-locking shifting element B is transferred into its closed operating state, and the two additional frictional-locking shifting elements C and D are transferred into their open operating states, if they are already filled or closed. If the shifting elements are C and D are not yet filled or closed, the filling process of the frictional-locking shifting elements C and D will no longer be started. In addition to the frictional-locking shifting element B, the frictional-locking shifting element E is to be transferred into its closed operating state, in order to engage the fifth transmission ratio "5" to the required extent and subsequently synchronize the positive-locking shifting element to be switched on during the downshift, starting from the fifth transmission ratio "5" in the direction of the third transmission ratio "3" and transfer it into the closed operating state.

In contrast to this, the frictional-locking shifting element C is closed or held in its closed operating state, while the frictional-locking shifting elements D and B are transferred into their open operating states or are held in them if the request to deactivate the coasting mode function is issued at an operating state of the vehicle drive train 1, starting from which the second transmission ratio "2" is to be engaged in the transmission 4 for forward travel. In contrast to the coasting exit, described above, in the direction of the third transmission ratio "3" for forward travel, upon a coasting exit in the direction of the second transmission ratio "2" for forward travel, instead of the synchronization gear "5" in the transmission presented for the positive-locking shifting element F to be switched on, the sixth transmission ratio "6" is initially engaged as a synchronization gear, and, subsequently, the positive-locking shifting element F, upon a downshift starting from the sixth transmission ratio "6," is synchronized in the direction of the second transmission ratio "2" and is thereby transferred into its closed operating state.

If, on the other hand, upon a coasting exit, the first transmission ratio "1" is to be engaged in the transmission 4 for forward travel, the frictional-locking shifting element D is to be closed or is to be held in its closed operating state, while the other two frictional-locking shifting elements C and B are to be open or are to be held in their open operating states. Subsequent to this, the additional frictional-locking shifting element E is transferred into its closed operating state, in order to initially engage the seventh transmission ratio "7" in the transmission 4, which constitutes the so-called "synchronization gear" for the positive-locking shifting element F to be switched on. Starting from the seventh transmission ratio "7" for forward travel that is then engaged in the area of the transmission 4, a downshift in the direction of the first transmission ratio "1" for forward travel is carried out by switching off the frictional-locking shifting element E and by closing the positive-locking shifting element F, by which the operating state of the vehicle drive train 1 to be established by the requested coasting exit is present.

In addition, through the higher-level driving strategy, upon a request for a coasting exit through a load request during the filling sequence of the frictional-locking shifting elements B, E, C and D described above, an additional procedure can be selected, through which, as function of (if applicable) a new specification of the target gear and the point in time when, during the filling sequence of the frictional-locking shifting elements B, E, C and D, the change to the target gear takes place, a termination of the filling sequence or the clutch B, E, C and D that is to be closed next, as the case may be, is selected in such a manner that, starting from the prepared operating state of the transmission 3, a greater downshift gear jump is possible.

Thus, upon a requested coasting exit and a change to the target gear starting from the third transmission ratio "3" in the direction of the second transmission ratio "2," the frictional-locking shifting element C is transferred into its closed operating state, and the frictional-locking shifting elements B and D are open, or their filling is not undertaken. Subsequently, the frictional-locking shifting element E for the engagement of the synchronization gear or the sixth transmission ratio "6," as the case may be, is in turn closed, and the positive-locking shifting element F to be switched on is switched on during the downshift in the direction of the second transmission ratio "2."

If, based on a load request, there is a coasting increase with a change to the target gear starting from the third transmission ratio "3" in the direction of the first transmission ratio "1" for forward travel, the frictional-locking shifting element D is transferred into its closed operating state or is left in it, while the frictional-locking shifting elements B and C are transferred into their fully open operating state or are left in it. In addition, the frictional-locking shifting element E is closed, in order to engage the synchronization gear for the positive-locking shifting element F to be closed or the seventh transmission ratio "7," as the case may be, in the transmission 4, and to subsequently transfer and close the positive-locking shifting element F into its synchronized operating state during the downshift in the direction of the first transmission ratio "1."

Figure 16:
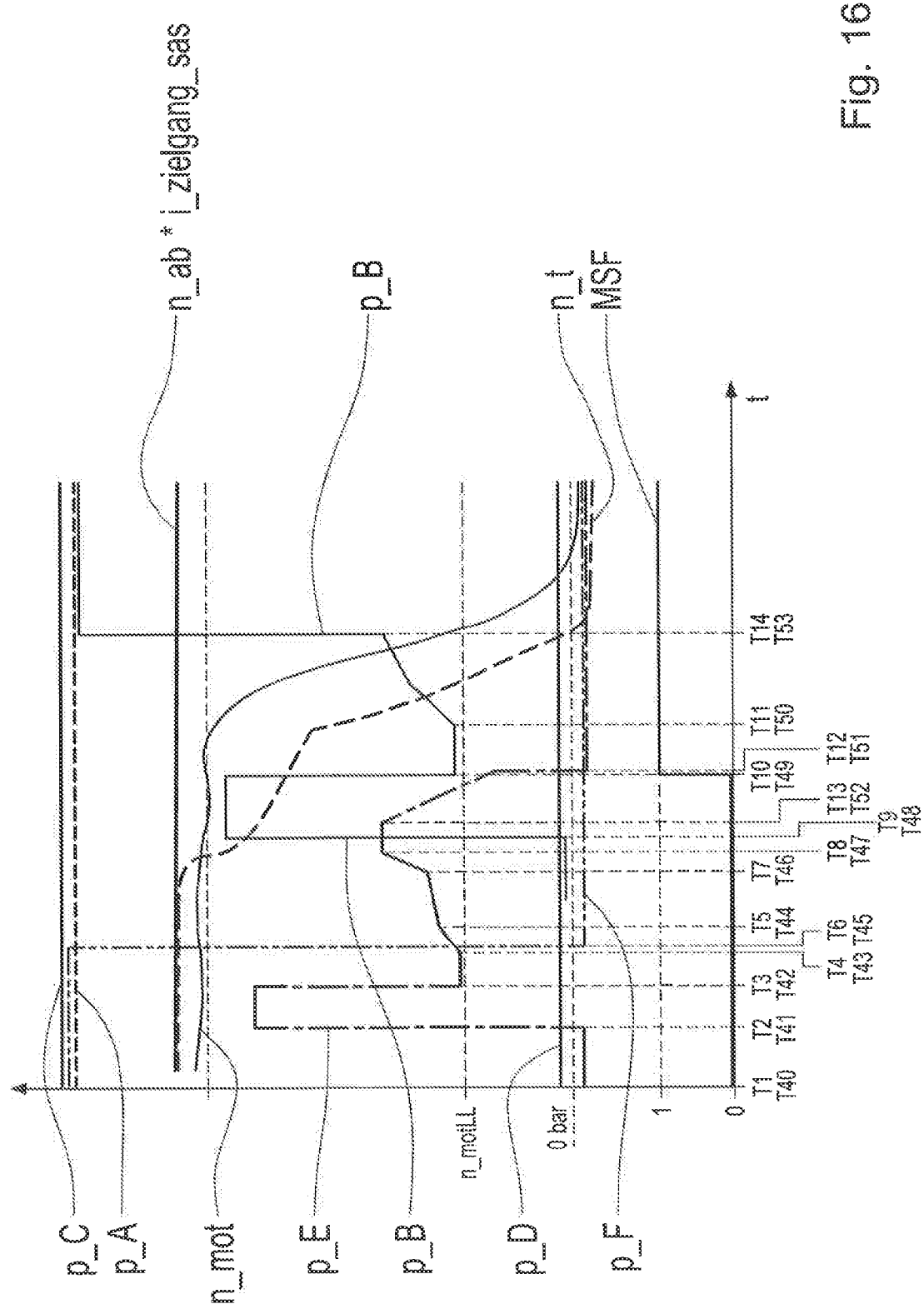
FIG. 16 several progressions of various operating parameters of the vehicle drive train in accordance with FIG. 1 over time t, which are adjusted during the carrying out of a variant of the method in accordance with exemplary aspects of the invention over time t.

FIG. 16 shows several progressions of different operating variables of the vehicle drive train 1 over time t, whereas, at the point in time T40 more specifically characterized in FIG. 16, the vehicle drive train 1 is in an operating state at which the second transmission "2" is engaged in the transmission 4 and the rotational speed n_mot of the drive unit 2 is greater than the idle speed n_motLL of the drive unit 2. At the point in time T40, a check is made as to whether the drive unit 2 is to be transferred into a switched-off operating state by an engine start-stop function or by a coasting mode function. On the basis of the previous progression of operating states of the vehicle drive train 1, at the point in time T40, a request to present the coasting operating state of the vehicle drive train 1 is issued, during which the drive unit 2 is switched off and the power flow between the drive unit 2 and the output 3 is interrupted in the area of the transmission 4.

Thereby, the request to activate the coasting operating state is issued starting from an operating state of the vehicle drive train 1, at which the drive unit 2 is switched on and is connected to the output 3 by the transmission 4. Furthermore, the rotational speed n_ab of the output 3 is greater than zero, whereas the vehicle designed with the vehicle drive train 1 is in an operating state close to standstill. As explained above, in addition to the two positive-locking shifting elements A and F, the frictional-locking shifting element C is switched on, and the second transmission ratio "2" is engaged in the transmission 4 for forward travel, while the shifting elements B, D and E are each in the open operating state. For this purpose, the shifting elements A to F are subjected to the actuating pressures p_A through p_F, respectively, required for them.

For activating the coasting operating state, from a point in time T41, through a corresponding raising of the actuating pressure p_E in the manner shown in FIG. 16, the frictional-locking shifting element E is subjected to a rapid filling pulse up to a point in time T42, and, during a filling equalization phase that is subsequent to this and continues up to a point in time T43, is actuated with an actuating pressure p_E featuring a filling equalization pressure level and is thus prepared for switching on. At the point in time T43, the frictional-locking shifting element E features an operating state, in which the transfer capacity of the frictional-locking shifting element E is essentially equal to zero, and a raising of the actuating force has the consequence of an immediate increase in the transfer capacity of the frictional-locking shifting element E.

In addition, from the point in time T40, the rotational speed n_mot of the drive unit 2 is guided, to the shown extent, increasingly in the direction of the idle speed n_motLL. The raising of the transfer capacity of the frictional-locking shifting element E, from the point in time T43, along a pressure ramp that continues up to a point in time T44 causes the fact that the positive-locking shifting element F is transferred into an at least approximately load-free operating state and, at a point in time T45, which is between the points in time T43 and T44, through an adjustment to the actuating pressure p_F of the positive-locking shifting element F, is lowered stepwise from a pressure value corresponding to the closed operating state of the positive-locking shifting element F to a pressure value corresponding to the open operating state of the positive-locking shifting element F. The switching on of the frictional-locking shifting element E causes the fact that the positive-locking shifting element F is transferred into at least a load-free operating state. The positive-locking shifting element F reaches such operating state at the switched-off point in time T45.

From the point in time T44, the actuating pressure p_E of the frictional-locking shifting element E is raised along an additional pressure ramp, the gradient of which is smaller than the pressure ramp provided between the points in time T43 and T44, up to a point in time T46. Starting from the pressure level of the actuating pressure p_E present at the point in time T46, the actuating pressure p_E is raised along a third pressure ramp, the gradient of which is in turn greater than the gradients of the two preceding pressure ramps, to a higher pressure level, up to a point in time T47. At the point in time T47, it is detected that a rotational speed n_t of the transmission input shaft 6, which is also referred to below as the turbine rotational speed, deviates from a product of the rotational speed n_ab of the output 3 and the transmission ratio i_zielgang_sas engaged in the present case in the transmission 4 at the point in time T40. If the deviation between the turbine rotational speed n_t and the product of the rotational speed n_ab of the output 3 and the transmission ratio i_zielgang_sas exceeds the threshold value kfl, in the present case, the separated power flow between the drive unit 2 and the output 3 in the area of the transmission 4 is detected. In the present case, this is the case at a point in time T47.

At the point in time T47, through the shifting elements C and A present in the closed operating state and through the at least partially switched-on frictional-locking shifting element E, the sixth transmission ratio "6" is at least partially engaged in the transmission 4. Since, with an activated coasting operating state, it is detected that, in the current operating point of the vehicle drive train 1, upon leaving the coasting operating state in the transmission 4, instead of the sixth transmission ratio "6" for forward travel, with an increasing operating time t, the third transmission ratio "3" for forward travel is to be engaged in the transmission, and, for the presentation of an operation of the vehicle drive train 1 that is as optimized as possible for efficiency, the power flow in the transmission 4 between the switched-off drive unit 2 and the output 3 is to be separated, at a point in time T48 following the point in time T47, the frictional-locking shifting element B, in the manner shown in FIG. 16, is prepared for switching on or closing, as the case may be, over a rapid filling phase that continues up to a point in time T49 and a subsequent filling equalization phase, which ends at a point in time T50.

At a point in time T51 following the point in time T49, the request to shut off the drive unit 2 is issued, which is why the rotational speed n_mot of the drive unit 2 is lowered in the direction of zero. The request corresponding to this arises from the progression MSF, which at the point in time T51 jumps from the value of 0 to the value of 1 and thus activates the engine stop release. Thus, at the point in time T45, the coasting operating state requested at the point in time T40 is activated to the desired extent.

Shortly after the point in time T47, at which the open operating state of the positive-locking shifting element F is detected, from a point in time T52, which is between the points in time T48 and T49, the frictional-locking shifting element E, in the manner shown in FIG. 16, is initially lowered over a pressure ramp continuing up to the point in time T51, and is subsequently reduced stepwise to zero at the point in time T51, by which the frictional-locking shifting element E is transferred into its fully open operating state, and the power flow between the drive unit 2 and the output 3 is separated in the area of the transmission 4.

At the point in time T50, the frictional-locking shifting element B is present in an operating state at which the transfer capacity of the frictional-locking shifting element B is essentially equal to zero, and a raising of the actuating force of the frictional-locking shifting element B or the actuating pressure p_B, as the case may be, causes an immediate increase in the transfer capacity of the frictional-locking shifting element B. From the point in time T50, the actuating pressure p_B of the frictional-locking shifting element B is raised, in the manner shown, over two consecutive pressure ramps up to a point in time T53, at which the frictional-locking shifting element B is present in a slip-free operating state. For this reason, the actuating pressure p_B of the frictional-locking shifting element B at the point in time T53 is raised stepwise to the closing pressure level at which the frictional-locking shifting element B is fully closed. Thus, at the point in time T53, the three shifting elements A, B and C are closed, which is why the gear set 5 of the transmission 4 is present in a partially blocked operating state, in which the transmission input shaft 6 is held in a torque-proof manner and is rotatable with the transmission output shaft 9 connected to the output 3.

With the progression of operating states of the vehicle drive train 1 more specifically described above, the coasting operating state or coasting mode function is activated, for example, starting from an operating state of a vehicle that is near standstill, if it is simultaneously detected that a progression of the rotational speed of the output 3 has a positive gradient and, nevertheless, the drive unit 2 is to be transferred into its switched-off operating state. This is the case, for example, if a performance request on the driver's side is not undertaken upon the simultaneous downhill travel of a vehicle, or a vehicle is designed with an electrically driven vehicle axle, and it is detected that the current performance request on the driver's side can be realized solely by this.

Upon detecting that a request to activate the coasting operating state is present, an actuation of the frictional-locking clutch or the frictional-locking shifting element E unburdening the positive-locking shifting element F to be switched off takes place. During the filling process of the frictional-locking shifting element E and the accompanying build-up phase of the unburdening torque in the area of the positive-locking shifting element E, the actuation of the positive-locking shifting element F to be disengaged in the opening direction is issued.

If the positive-locking shifting element F is placed in a nearly torque-free state through the unburdening torque built up in the area of the frictional-locking shifting element E, the positive-locking shifting element F is opened, without generating a discharge shock in the vehicle drive train 1. If the open operating state of the positive-locking shifting element F, for example, by a corresponding position-detection system in the area of the positive-locking shifting element F or a correspondingly determined rotational speed response in terms of the transmission 4, the unburdening torque built up in the area of the frictional-locking shifting element E is reduced through lowering the actuating pressure p_E and the resulting pressure drop in the area of the unburdening clutch or in the area of the frictional-locking shifting element E, and thus the output 3 is decoupled from the drive unit 2, and the transmission output is therefore set in a traction-free state.

In such operating state of the vehicle drive train 1 that is then present, the vehicle that is so designed initially costs with a switched-on drive unit 2. In order to operate the vehicle drive train 1 with a switched-off drive unit 2, as a function of the current operating state of the vehicle drive train 1, frictional-locking shifting elements of the transmission 4 are filled and are transferred into their closed operating states. Since the transmission output shaft 9 and the output 3 connected to it in a torque-proof manner are already able to rotate freely, the fillings of the frictional-locking shifting elements of the transmission 4 to be switched on and transferred into the closed operating state can be carried out in short operating times.

Starting from this operating state of the vehicle drive train, with an activated coasting mode function, it is also possible that the transmission 4 is correspondingly actuated as a function of the present progression of operating states of the vehicle drive train, in order to reach an operating state to be established upon the leaving of the coasting operating state in the area of the transmission, with a high degree of spontaneity. For this purpose, the shifting elements A through F are each actuated as a function of the present operating point of the vehicle drive train 1 and with a simultaneously activated coasting operating function, whereas the actuation of the shifting elements A through F is carried out to a large extent as a function of the rotational speed of the output 3 of the vehicle speed, in order to present a gear tracking required for a high degree of spontaneity.

Figure 17:
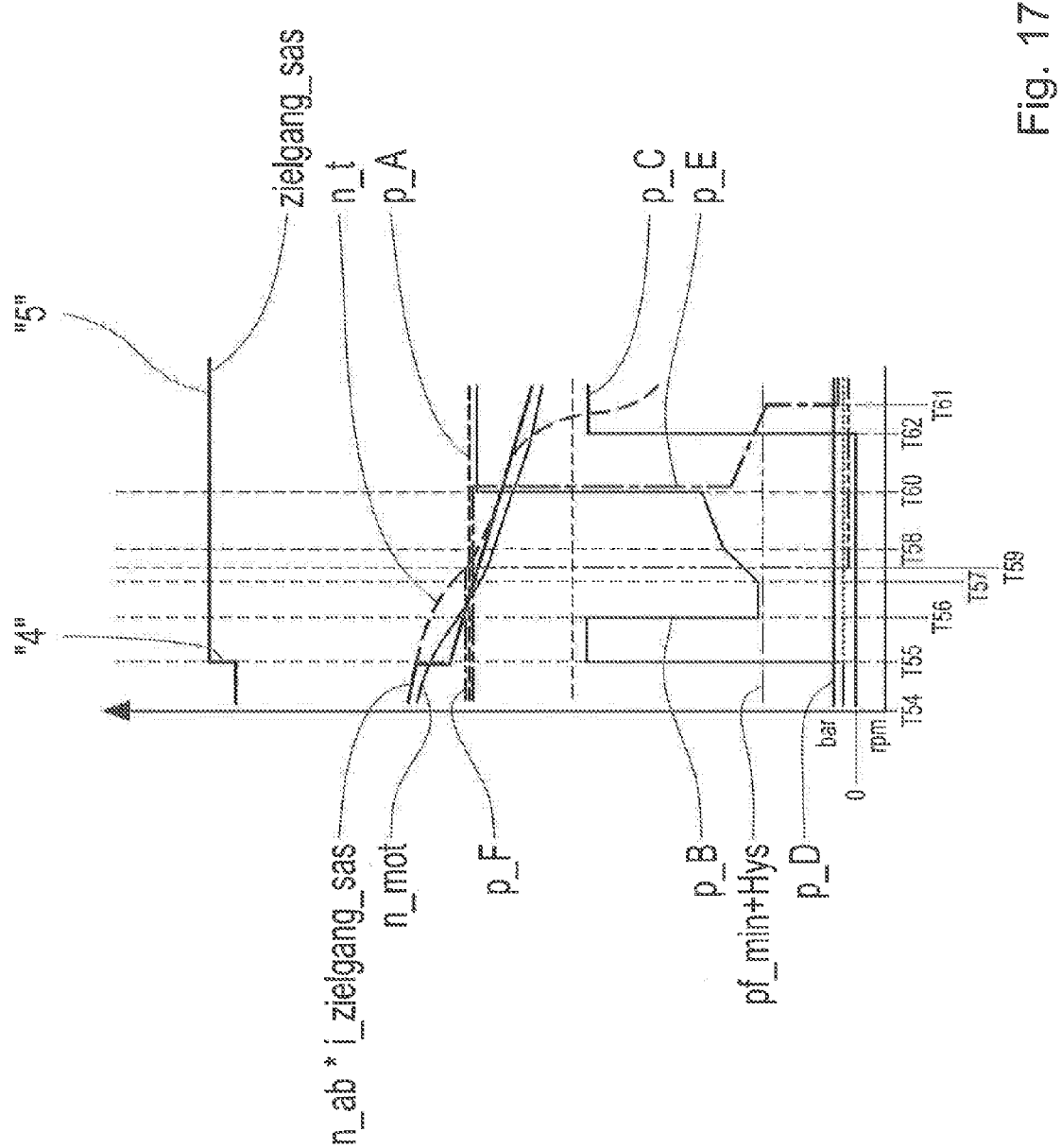
FIG. 17 several progressions of various operating parameters of the vehicle drive train in accordance with FIG. 1, which are adjusted during the carrying out of an additional variant of the method in accordance with exemplary aspects of the invention over time t.

FIG. 17 shows the progressions of the operating parameters of the vehicle drive train 1 shown in FIG. 16 starting from an operating state at a point in time T54, at which the power flow is established between the drive unit 2 and the output 3 in the area of the transmission 4, and the fourth transmission ratio "4" is engaged in the transmission 4 for forward travel. As can be seen from the shifting diagram of FIG. 2, in addition to the two positive-locking shifting elements A and F, the frictional-locking shifting element E is to be closed for the presentation of the fourth speed "4" in the transmission 4 for forward travel. The rotational speed n_mot of the drive unit 2 and the progression of the product n_ab*i_zielgang_sas are above the idle speed n_motLL. Up to a point in time T55, the progression of the product n_ab*i_zielgang_sas is equal to the progression of the turbine rotational speed n_t.

On the basis of the progression of operating states current at the point in time T54, a request to activate the coasting mode function of the vehicle drive train 1 is issued on the part of the higher-level driving strategy. For the presentation of the coasting mode, the positive-locking shifting element F is to be switched off. Since, at the positive-locking shifting element F, a torque counteracting the opening process of the positive-locking shifting element F applies, at the point in time T55, the actuating pressure p_B of the frictional-locking shifting element B is raised stepwise from zero to the rapid filling pressure level, and is held constant at such pressure level until a point in time T56.

At the point in time T56, the actuating pressure p_B is lowered to the filling equalization pressure level and in turn is held at this pressure level up to a point in time T57. From the point in time T57, the actuating pressure p_B, starting from the filling equalization pressure level, is raised along a first pressure ramp, which, in the present case, ends present at a point in time T58, with defined gradients. At the point in time T57, the frictional-locking shifting element B to be switched on features an operating state, at which the transfer capacity of the frictional-locking shifting element B is equal to zero, and an increase in the actuating pressure p_B acting in the closing direction of the frictional-locking shifting element B has the consequence of an immediate increase in the transfer capacity of the frictional-locking shifting element B. On the basis of the last-described change to the operating state of the frictional-locking shifting element B, from the point in time T57, the switched-off, positive-locking shifting element F is increasingly unburdened. At a point in time T59 between the points in time T57 and T58, the positive-locking shifting element F to be switched off features an unburdening operating state such that, at the point in time T59, the positive-locking shifting element F, through a stepwise reduction in the actuating pressure p_F applied in the closing direction at the positive-locking shifting element F to be switched off, starting from the closing pressure level, is transferred to zero, in accordance with the request, into its open operating state.

From the point in time T58, the pressure ramp is followed by an additional pressure ramp of the actuating pressure p_B of the frictional-locking shifting element B to be switched on, the gradient of which is smaller than the gradient of the first pressure ramp ending at the point in time T58. The second pressure ramp ends at a point in time T60, at which the frictional-locking shifting element B to be switched on is essentially present in the closed operating state. For this reason, at the point in time T60, the actuating pressure p_B is raised stepwise to the closing pressure level, and the frictional-locking shifting element B is transferred into its fully closed operating state. At the point in time T60, the actuating pressure p_E of the frictional-locking shifting element E is lowered stepwise from the closing pressure level to an intermediate pressure level above the pressure threshold pf_min+HYS. Subsequent to this, the actuating pressure p_E is guided along a pressure ramp, which in the present case ends at a point in time T61, to an intermediate pressure level below the pressure threshold pf_min+HYS, and, at the point in time T61, is reduced stepwise to zero, by which the frictional-locking shifting element E is transferred into its fully open operating state.

By the procedure carried out between the points in time T54 and T61, the positive-locking shifting element F switched on by the point in time T59, through at least the partial engagement of the fifth transmission ratio "5" in the transmission 4, for the presentation of which the positive-locking shifting element F in the open operating state is to be transferred and the transfer capacity of the frictional-locking shifting element B is to be varied, is initially transferred into an at least approximately load-free operating state. Upon reaching the at least approximately load-free operating state at the point in time T59, the positive-locking shifting element F opens to the extent described above, by which the request to present the coasting operating state with a high degree of spontaneity can be realized.

As a function of the current progression of operating states of the vehicle drive train 1, at a point in time T62, which in the present case is between the points in time T60 and T61, the higher-level driving strategy determines that, upon a coasting exit, the third transmission ratio "3" is to be engaged in the transmission 4 for forward travel. For this reason, at the point in time T62, the actuating pressure p_C of the frictional-locking shifting element C is raised stepwise to the pressure level of the rapid filling pressure, and is constantly held at such level until the end of the rapid filling phase. Subsequent to this, the actuating pressure p_C of the frictional-locking shifting element C is raised, to an extent that is not shown in more detail, initially to the pressure level of the filling equalization pressure and subsequently, during two consecutive pressure ramps with different gradients, to the intermediate pressure level, at which the frictional-locking shifting element C is present in a slip-free operating state. Upon reaching this operating state of the frictional-locking shifting element C, the actuating pressure is raised to the closing pressure level and the frictional-locking shifting element C is fully closed.

Modifications and variations can be made to the embodiments illustrated or described herein without departing from the scope and spirit of the invention as set forth in the appended claims.

REFERENCE SIGNS

1 Vehicle drive train
2 Drive unit
3 Output
4 Transmission
5 Gear set
6 Transmission input shaft
7 Hydrodynamic torque converter
8 Converter lock-up clutch
9 Transmission output shaft
10 Fixed-housing component
"1" to "9" Transmission ratio for forward travel
"R" Transmission ratio for reverse travel
A to F Shifting element
HR1 to HR4 Ring gear
zielgang_sas Transmission ratio currently engaged in the transmission
i_zielgang_sas Transmission ratio
kfl Threshold value
MSF Progression
n_ab Rotational speed of the output
n_mot, n_mot1 Rotational speed of the drive unit
n_motEGS Progression of the EGS specification of the engine target rotational speed
n_motLL Idle speed
n_t Turbine rotational speed
p_A Actuating pressure of the shifting element A
p_B Actuating pressure of the shifting element B
p_C Actuating pressure of the shifting element C
p_D Actuating pressure of the shifting element D
p_E Actuating pressure of the shifting element E
p_F Actuating pressure of the shifting element F
P1 to P4 Planetary gear set
pf_min+Hys Pressure threshold
PR1 to PR4 Planetary gear
S1 to S4 Sun gear
ST1 to ST4 Planetary carrier
t Time
T0 to T199 Discrete point in time

The invention claimed is:

1. A method for operating a vehicle drive train, the vehicle drive train having a drive unit, an output and a transmission for power flow between the drive unit and the output, the transmission having at least one positive-locking shifting element and a plurality of frictional-locking shifting elements operable for presentation of transmission ratios of the transmission, a portion of the transmission ratios presentable through the positive-locking shifting element, the method comprising:

operating the vehicle drive train with the drive unit switched on, with the drive unit connected to the output by the transmission, and with the positive-locking shifting element open;

in response to a coasting operating state request for the vehicle drive train and a rotational speed of a transmission output being greater than a threshold, switching off the drive unit and interrupting the power flow between the drive unit and the output by opening at least one of the plurality of frictional-locking shifting elements; and closing the positive-locking shifting element during the coasting operating state and no later than a leave coasting operating state request, wherein the vehicle drive train is operable with the drive unit switched on, with the drive unit connected to the output by the transmission at one of the transmission ratios presentable through the positive-locking shifting element after closing the positive-locking shifting element.

2. The method of claim 1, wherein closing the positive-locking shifting element comprises closing the positive-locking shifting element in response to the coasting operating state request before or after switching off the drive unit.

3. The method of claim 1, further comprising, prior to closing the positive-locking shifting element, transferring a gear set of the transmission into an at least partially blocked operating state by actuating of at least two of the plurality of frictional-locking shifting elements, a transmission input shaft held in a torque-proof manner and a transmission output shaft connected to the output rotatable in the at least partially blocked operating state of the gear set.

4. The method of claim 3, wherein the gear set of the transmission is held in the at least partially blocked operating state at least until a rotational speed of the drive unit is less than a threshold value.

5. The method of claim 4, further comprising varying a transfer capacity of the at least two of the plurality of frictional-locking shifting elements in order to generate a differential rotational speed between shifting element halves of the positive-locking shifting element prior to closing the positive-locking shifting element.

6. The method of claim 3, further comprising closing the plurality of frictional-locking shifting elements when the power flow between the drive unit and the output is interrupted at the transmission, the closed frictional-locking shifting elements permitting rotation of the transmission output shaft.

7. The method of claim 3, further comprising, with an activated coasting operating state of the vehicle drive train, reducing actuating forces of the plurality of frictional-locking shifting elements to a level at which the plurality of frictional-locking shifting elements have a slip-free operating state and from which the plurality of frictional-locking shifting elements are switchable on or off within short operating times.

8. The method of claim 1, further comprising closing a converter lock-up clutch provided between the transmission and the drive unit for bridging a hydrodynamic torque converter during the coasting operating state when the drive unit is switched off.

9. The method of claim 1, further comprising opening the positive-locking shifting element or keeping the positive-locking shifting element open in response to a deactivate coasting operating state request, wherein the vehicle drive train is operable with the drive unit switched on, with the drive unit connected to the output by the transmission, and with the positive-locking shifting element open during the deactivated coasting operating state.

10. The method of claim 1, further comprising raising actuating forces of the frictional-locking shifting elements to be closed after leaving of the coasting operating state of the vehicle drive train while the other frictional-locking shifting elements are open.

11. The method of claim 1, further comprising detecting an interruption of the power flow between the drive unit and the output at the transmission when a deviation between a rotational speed of a transmission input shaft and a product arising from a rotational speed of a transmission output shaft and the transmission ratio engaged in the transmission is greater than a limit value.

12. The method of claim 1, further comprising:

determining the current operating state of the vehicle drive train and the transmission ratio to be engaged upon leaving the coasting operating state; and holding at least the frictional-locking shifting elements that are to be switched on to present the transmission ratio to be engaged upon leaving the coasting operating state in an operating state prepared for switching on the frictional-locking shifting elements.

13. The method of claim 1, further comprising:

engaging a synchronization transmission ratio in the transmission, the positive-locking shifting element being closed and at least one additional positive-locking shifting element being open at the synchronization transmission ratio; and in response to a deactivate coasting operating state request, shifting the transmission from the synchronization transmission ratio to a requested transmission ratio, the positive-locking shifting element being closed and the at least one additional positive-locking shifting element being closed in the requested transmission ratio, wherein shifting the transmission from the synchronization transmission ratio to the requested transmission ratio comprises switched off one of the plurality of frictional-locking shifting elements and closing the at least one additional positive-locking shifting element.

14. The method of claim 1, wherein the one of the plurality of frictional-locking shifting elements opened for interrupting the power flow between the drive unit and the output is only closed when a blocking state of a gear set of the transmission is canceled.

15. The method of claim 1, further comprising:

in response to a deactivate coasting operating state request, checking whether a transmission ratio engaged during the activated coasting operating state corresponds to a requested transmission ratio to be engaged as a function of the event requesting deactivation of the coasting operating state; and in response to determination of a deviation, engaging the requested transmission ratio.

16. The method of claim 1, further comprising restarting the drive unit upon leaving the coasting operating state and with a rotational speed on the side of the transmission under a specified speed, wherein the power flow between the drive unit and the output through the transmission is only established when a rotational speed of the drive unit exceeds the synchronous rotational speed of the transmission input shaft corresponding to the rotational speed of the transmission output shaft, the rotational speed of the transmission output shaft adjusted when the requested transmission ratio is engaged in the transmission.

* * * * *